(12) United States Patent
Goizueta

(10) Patent No.: US 12,460,741 B2
(45) Date of Patent: Nov. 4, 2025

(54) SAFETY VALVE FOR RETURNABLE BOTTLE, BOTTLE COLLAR AND PROCESS FOR PLUGGING A RETURNABLE BOTTLE

(71) Applicant: SIDES R&D URUGUAY S.A., Montevideo (UY)

(72) Inventor: Héctor Oscar Goizueta, Monte Grande (AR)

(73) Assignee: SIDES R&D URUGUAY S.A., Montevideo (UY)

( * ) Notice: Subject to any disclaimer, the term of this patent is extended or adjusted under 35 U.S.C. 154(b) by 127 days.

(21) Appl. No.: 18/515,519

(22) Filed: Nov. 21, 2023

(65) Prior Publication Data

US 2025/0012375 A1    Jan. 9, 2025

(30) Foreign Application Priority Data

Nov. 22, 2022 (UY) .......................................... 40036

(51) Int. Cl.
    *F16K 35/08*     (2006.01)

(52) U.S. Cl.
    CPC .................................. *F16K 35/08* (2013.01)

(58) Field of Classification Search
    CPC ......... F16K 35/08; B65D 49/00; B65D 49/02; B65D 49/04

USPC .......................................................... 222/165
See application file for complete search history.

(56) References Cited

FOREIGN PATENT DOCUMENTS

| | | | | |
|---|---|---|---|---|
| AR | 056057 A1 | 9/2007 | | |
| EP | 0706952 A1 | 4/1996 | | |
| EP | 2925666 B1 | 9/2016 | | |
| EP | 4414286 A2 * | 8/2024 | ............. | F16K 35/08 |
| ES | 2358483 T3 * | 5/2011 | ............. | G01F 11/46 |
| GB | 2329892 A | 4/1999 | | |
| GB | 2366287 A | 3/2002 | | |
| WO | WO-2021185993 A1 * | 9/2021 | ............. | B05B 15/65 |

* cited by examiner

*Primary Examiner* — Samir Abdosh
(74) *Attorney, Agent, or Firm* — Rothwell, Figg, Ernst & Manbeck, P.C.

(57) ABSTRACT

The present invention relates to a security valve designed to be used in returnable bottles, a bottle collar to be applied thereto and a process for plugging a returnable bottle. The bottles may be of the type that is used in dispensers or may be returnable with manual discharge or by other means.
The contents of the bottles may be for human ingestion or any other non-drinkable liquids such as chemicals, caustics, or liquid fuels.
The security valve includes four implementation versions: a) with an automatic actuator; b) with manual actuator; c) an actuator-fee valve and d) a compact valve.

79 Claims, 67 Drawing Sheets

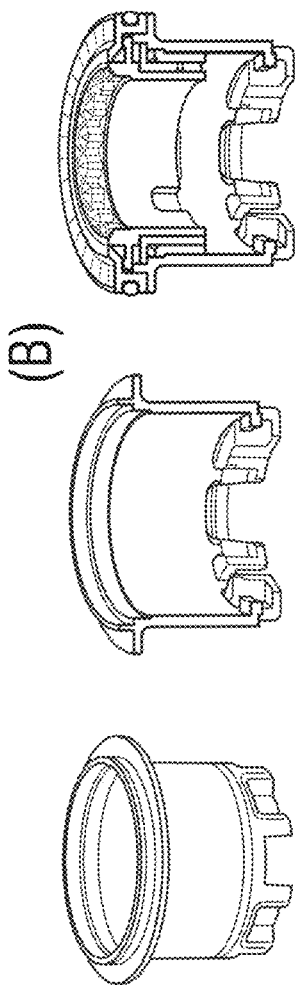
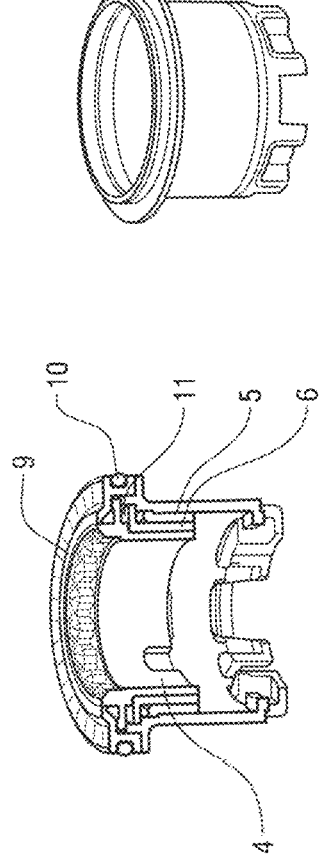
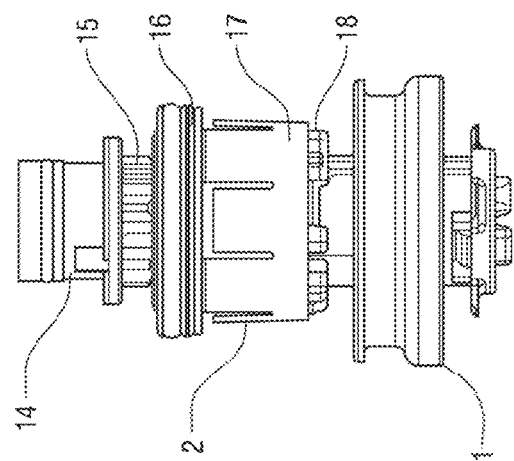
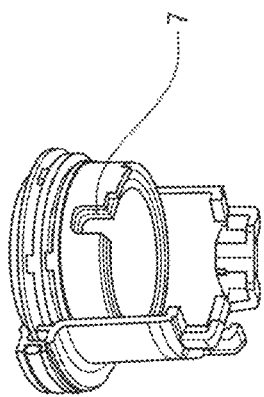

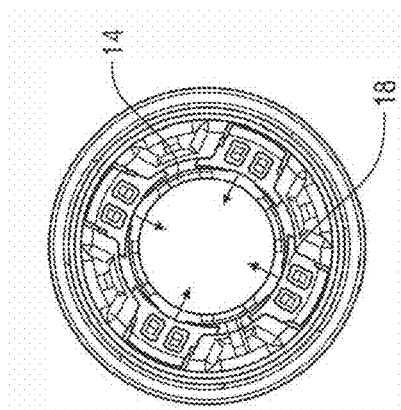
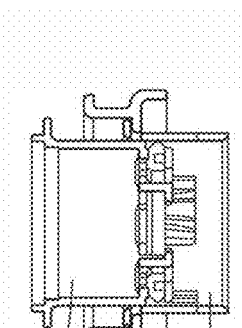
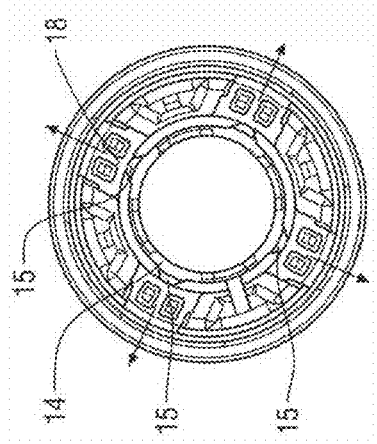
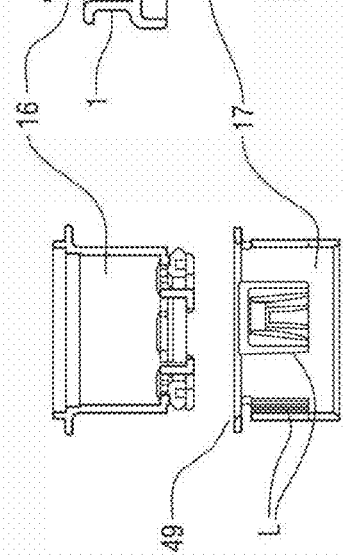
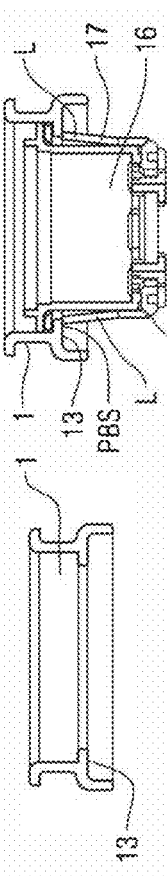
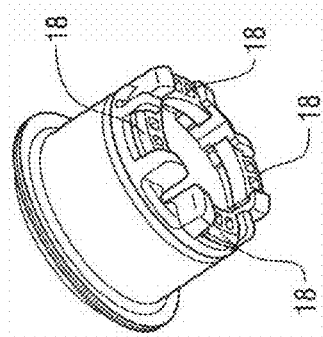
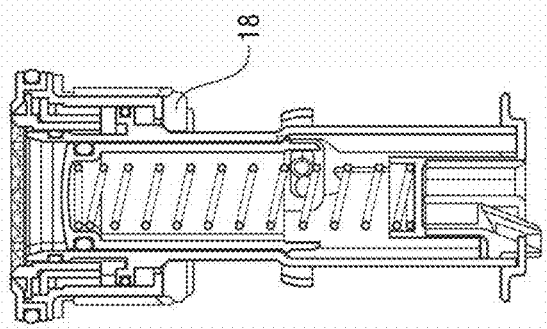
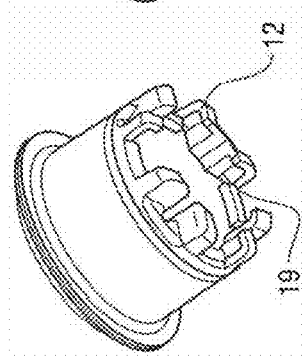
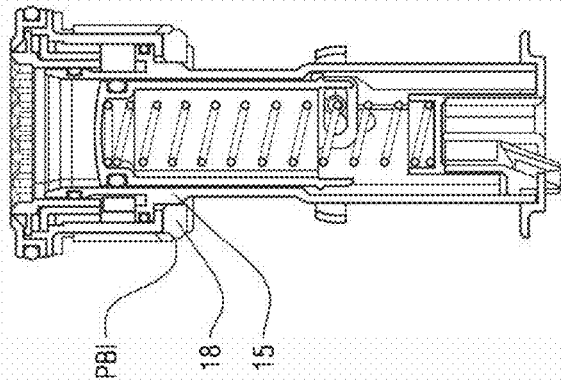

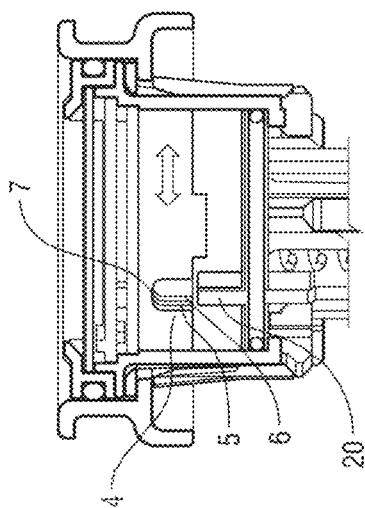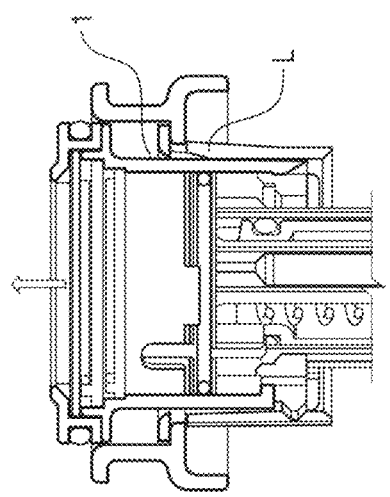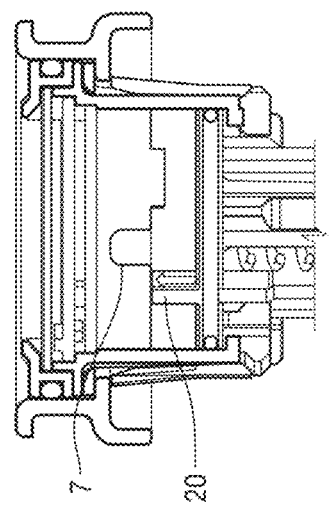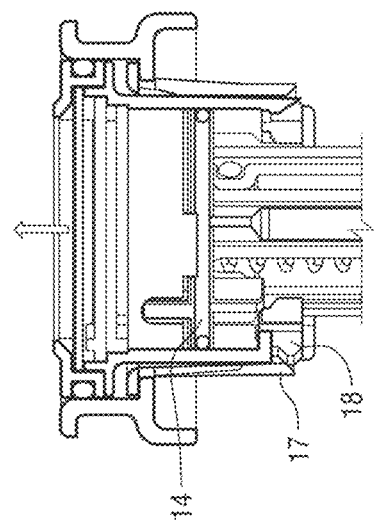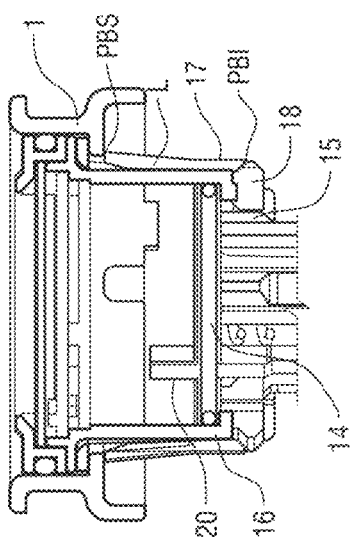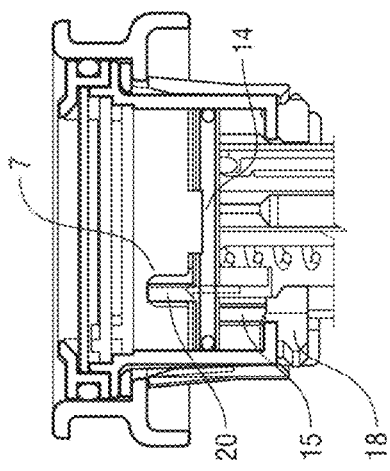

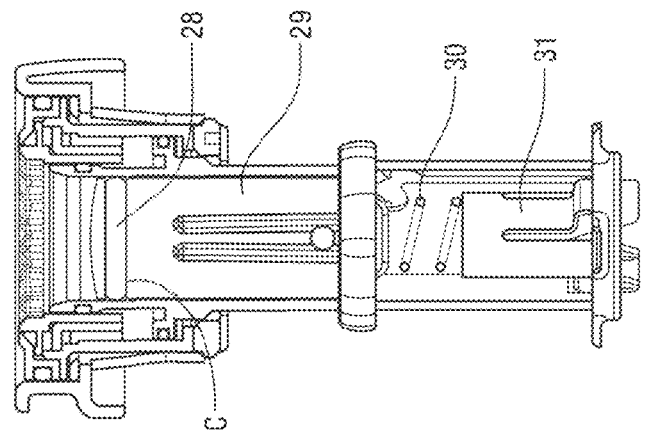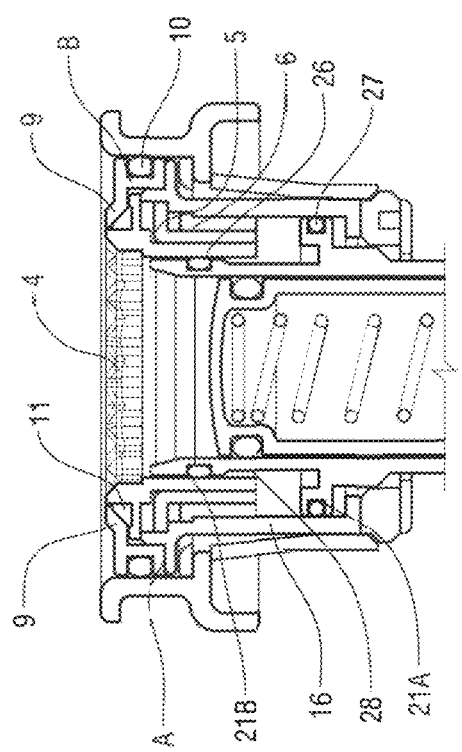

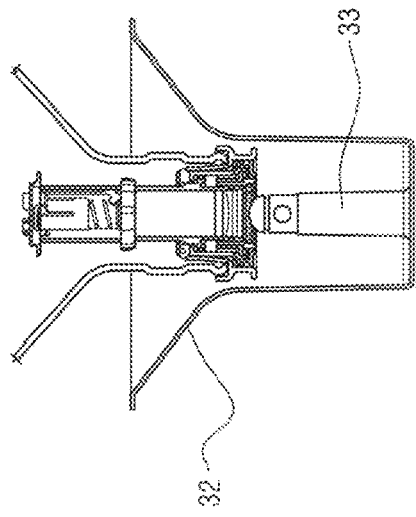
FIG. 20
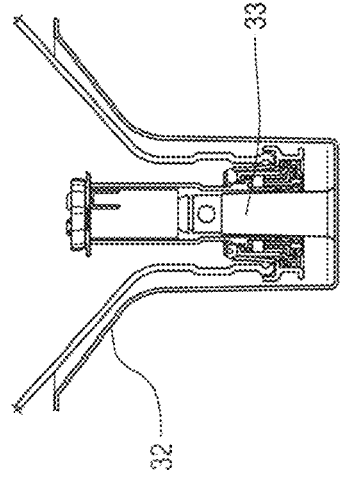
FIG. 22
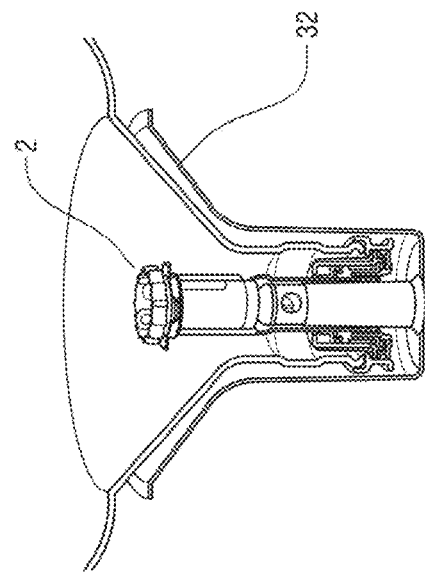
FIG. 21
FIG. 23A

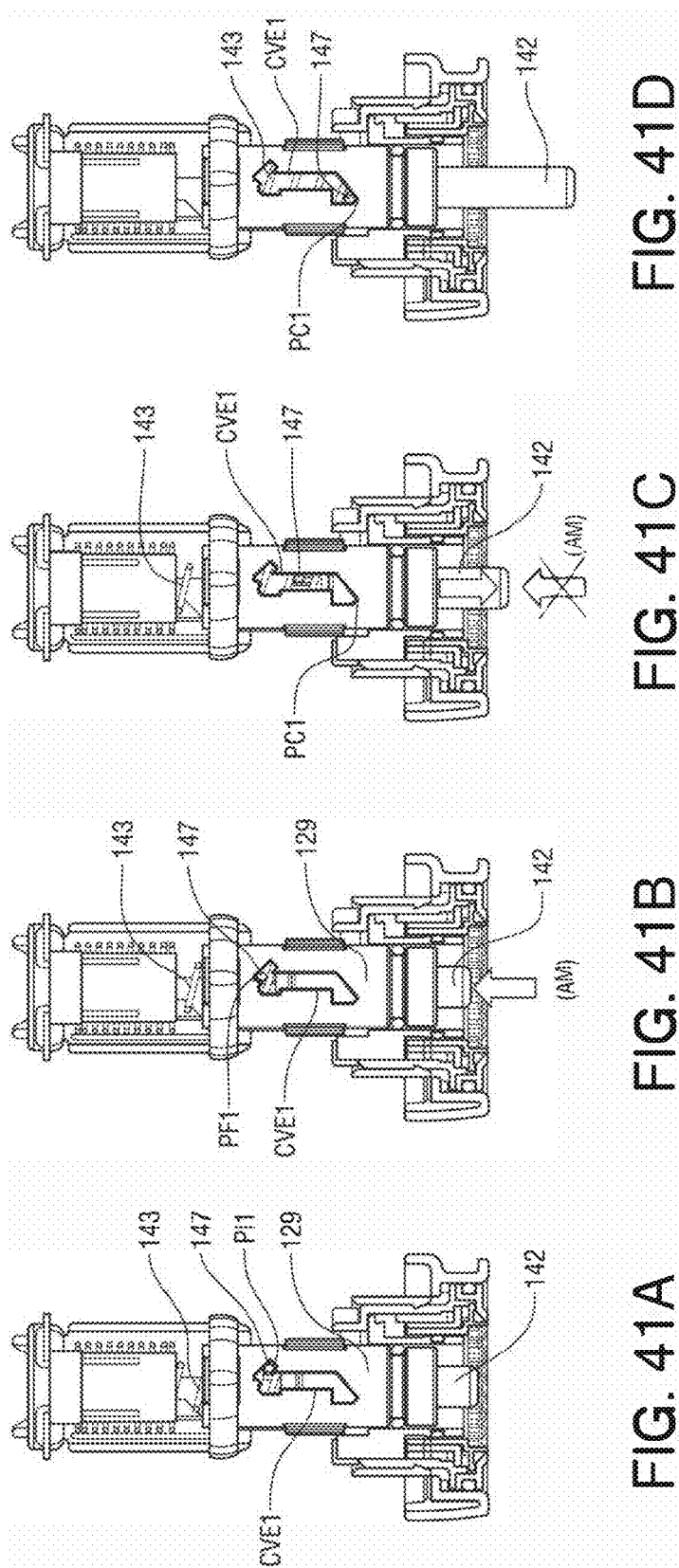

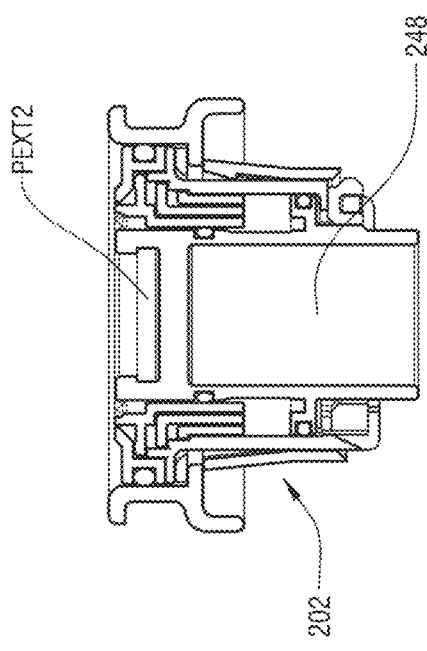
FIG. 48
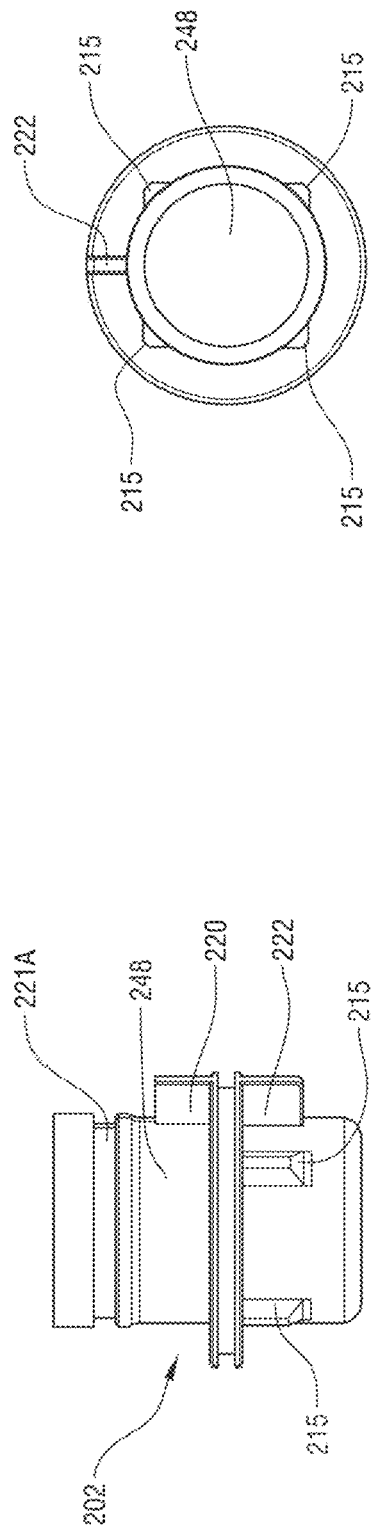
FIG. 49B
FIG. 49A

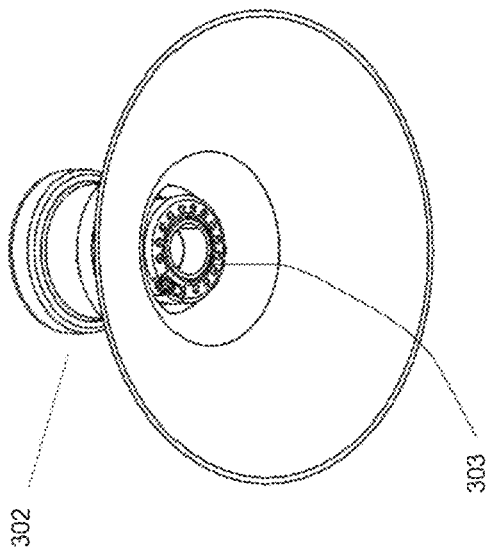
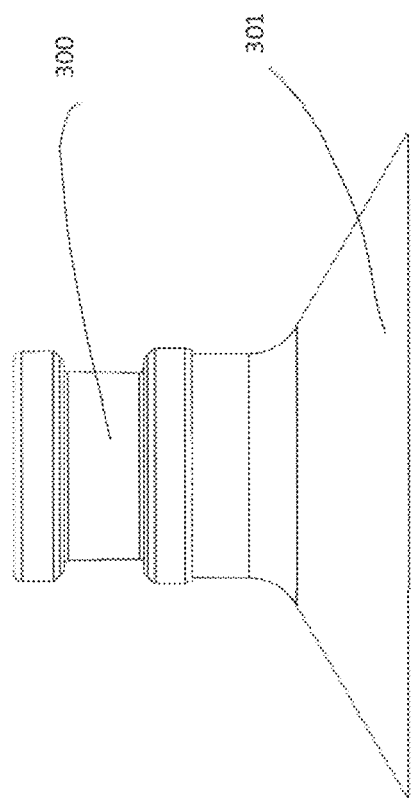
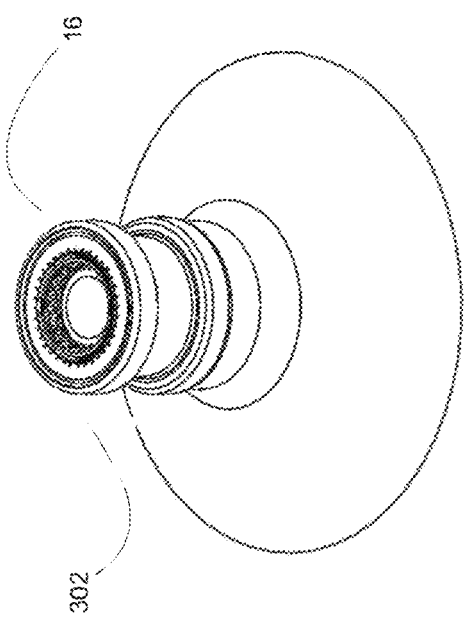
FIG. 62A
FIG. 62B
FIG. 62C

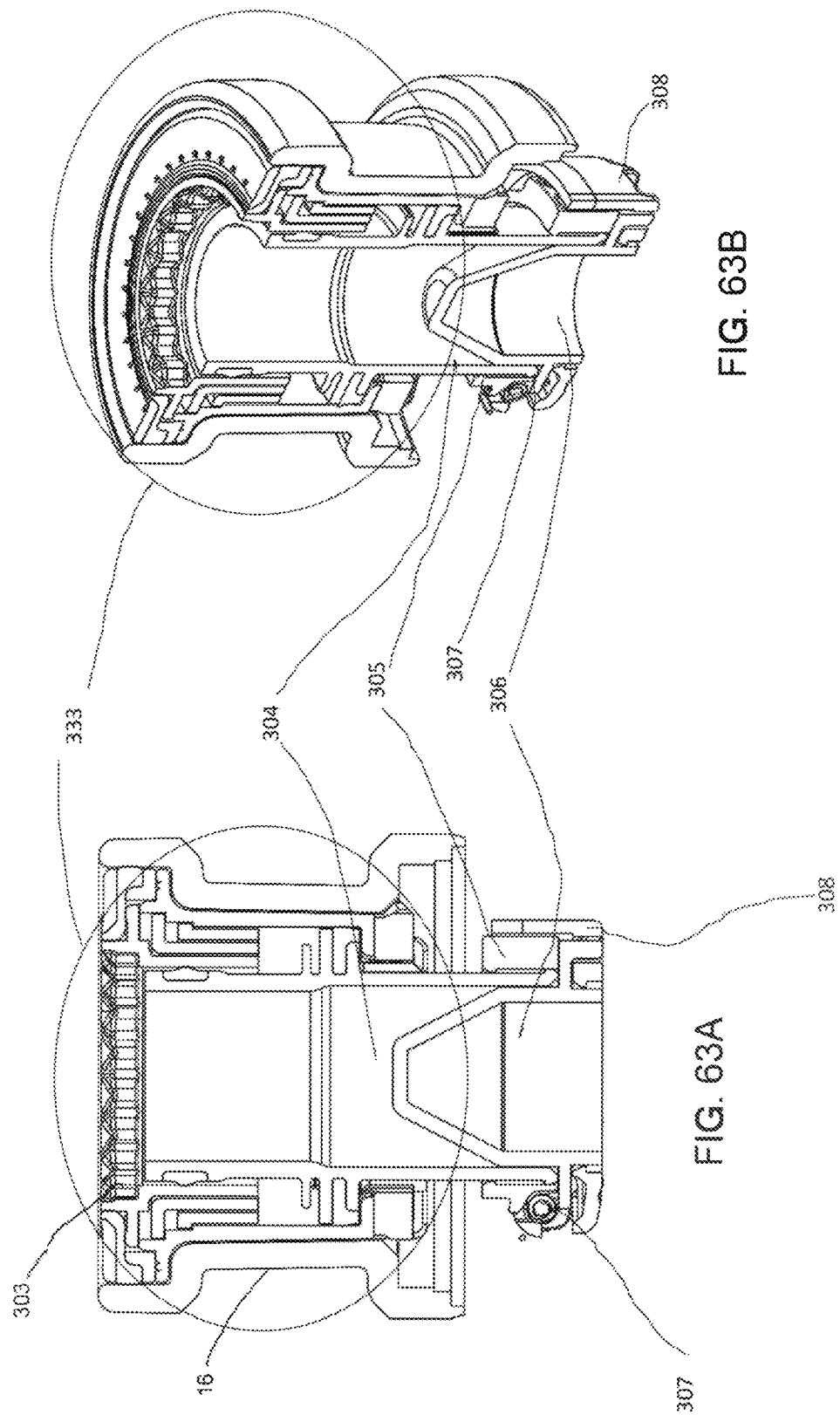

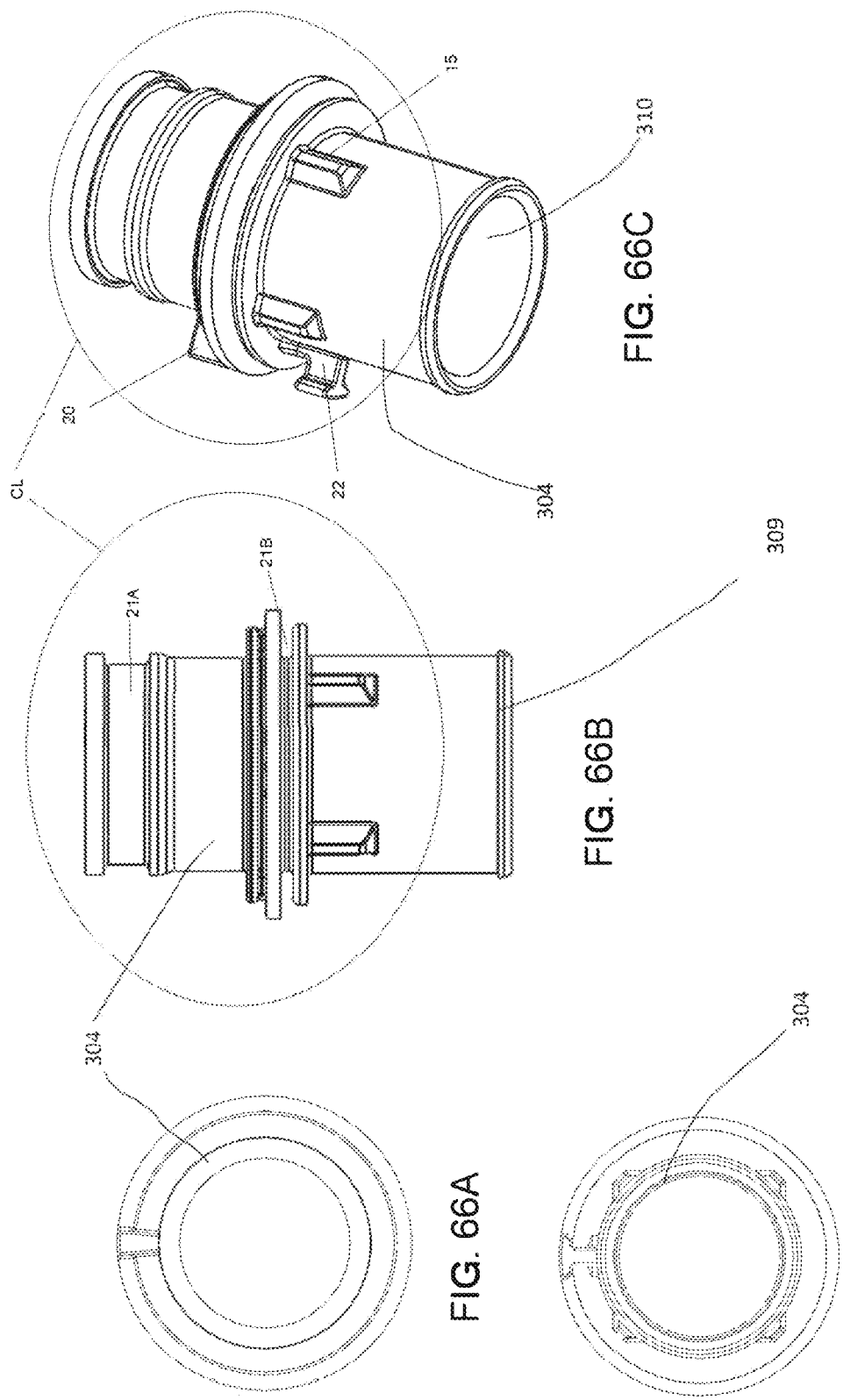

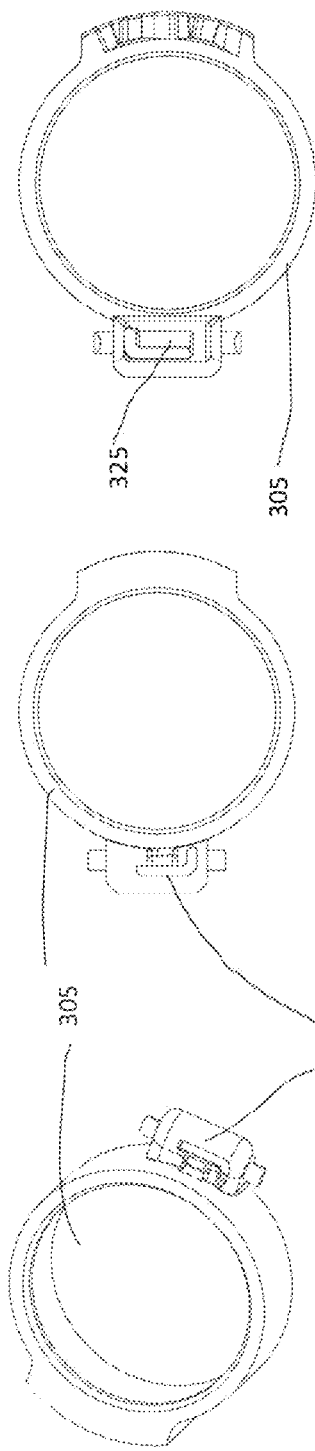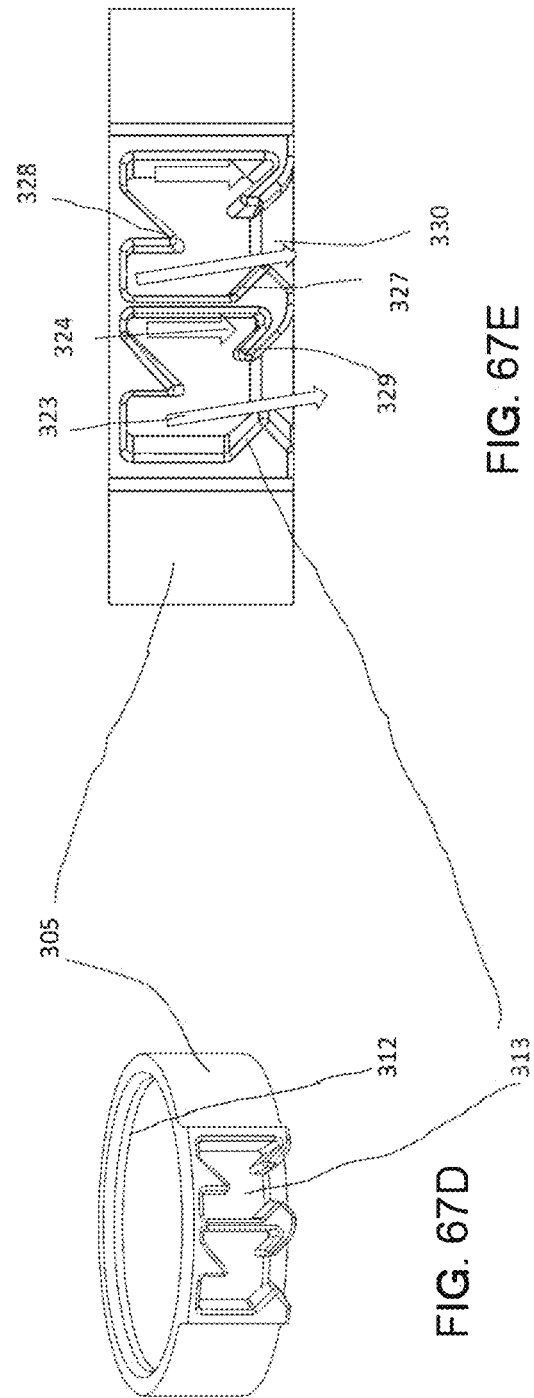

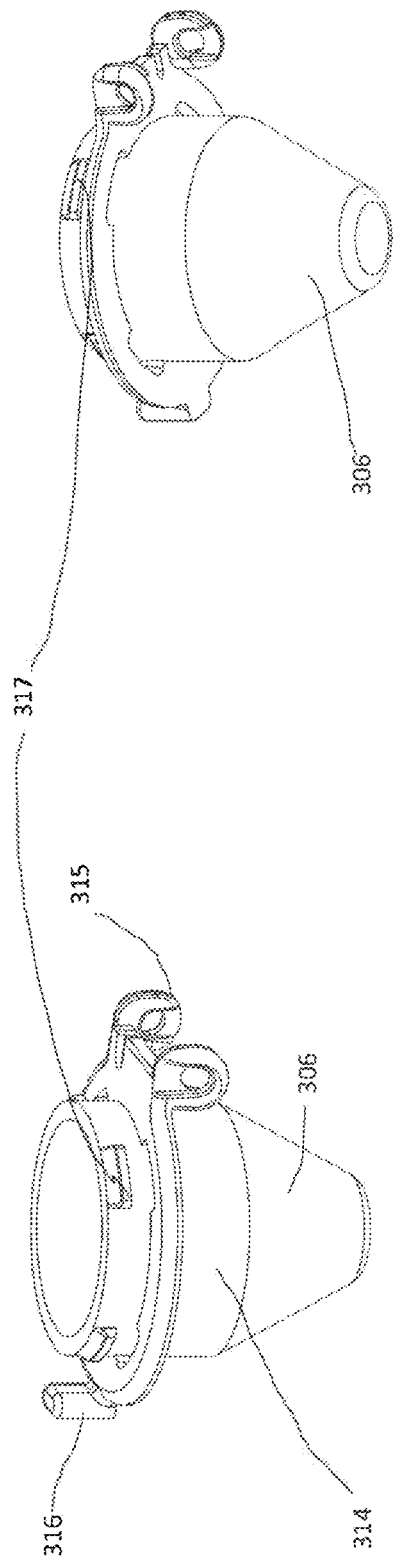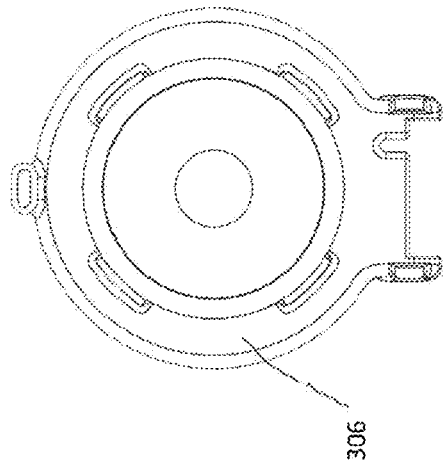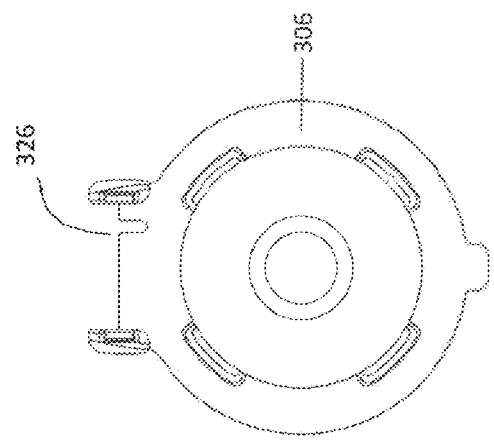
FIG. 68A
FIG. 68B
FIG. 68C
FIG. 68D

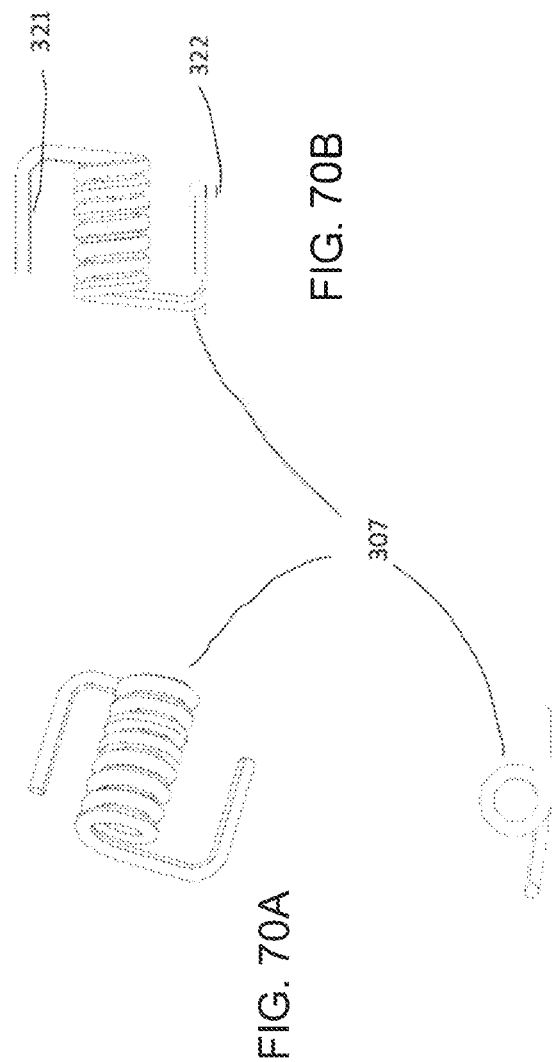

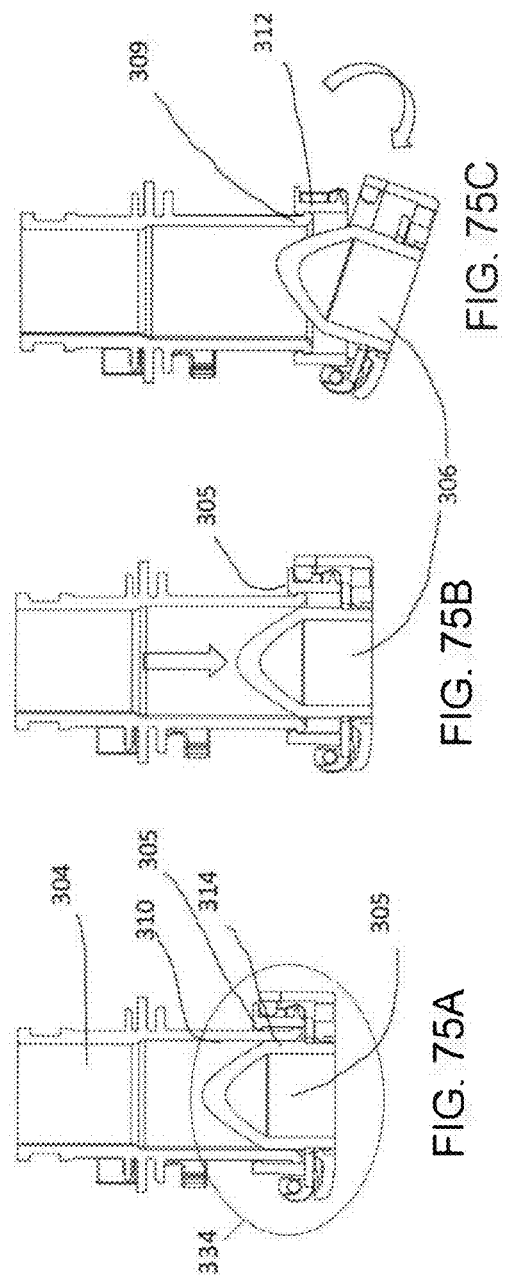
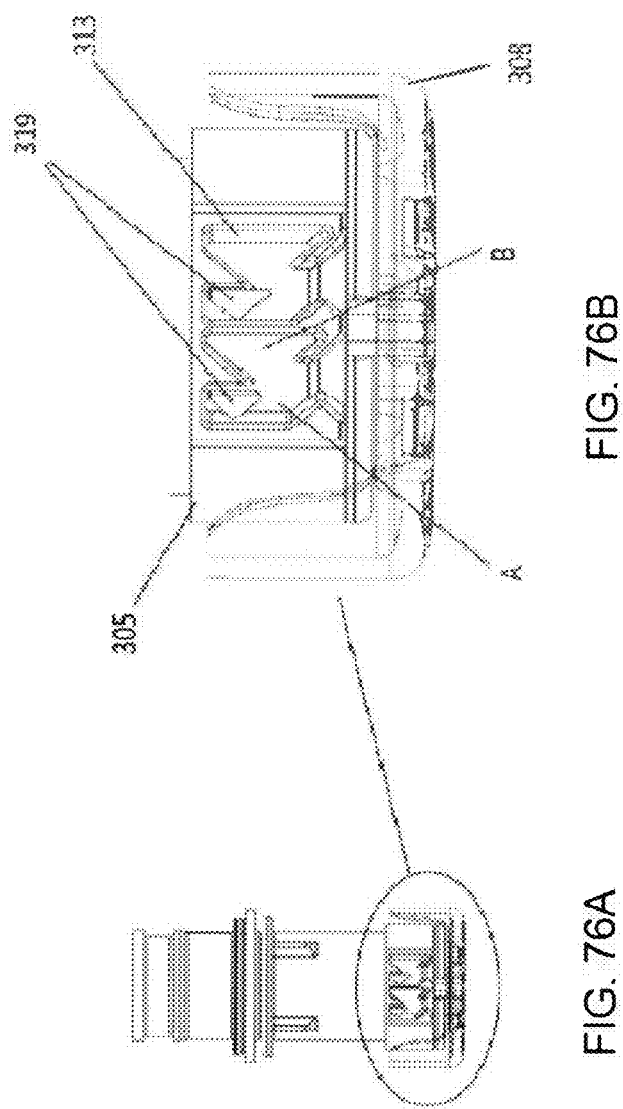
FIG. 75C
FIG. 75B
FIG. 75A
FIG. 76B
FIG. 76A

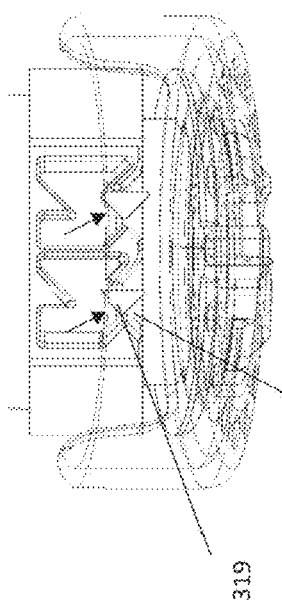
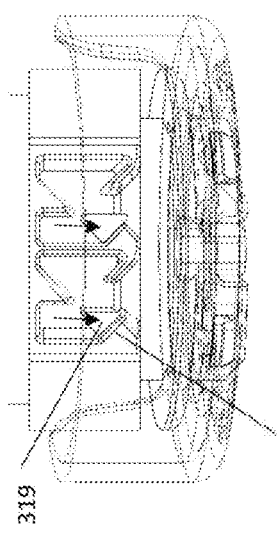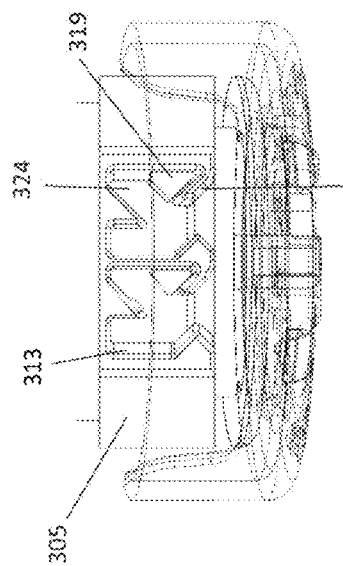
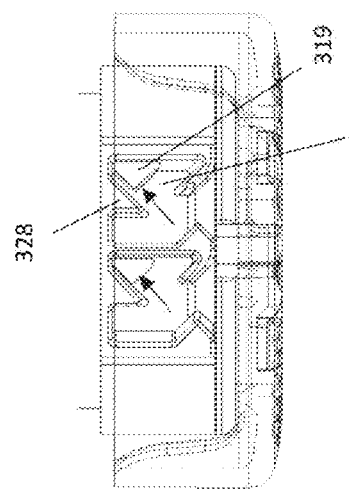
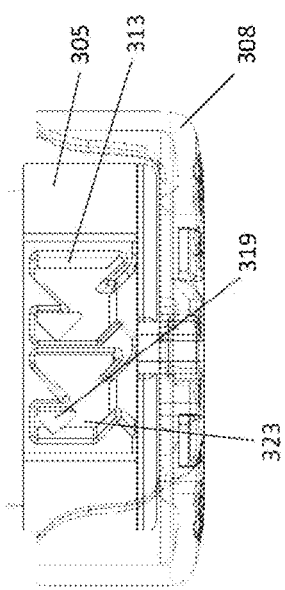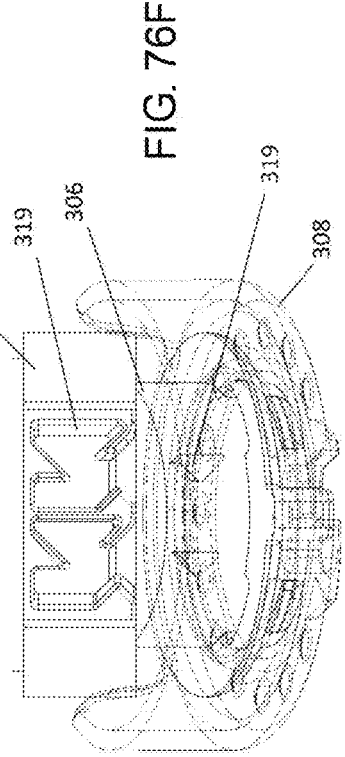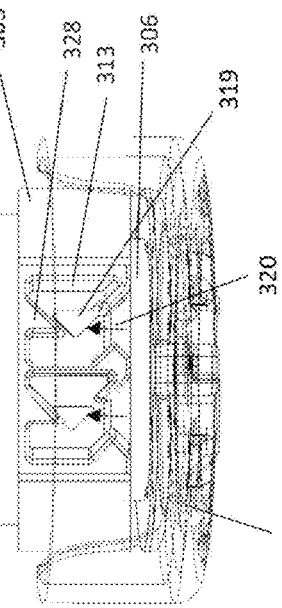

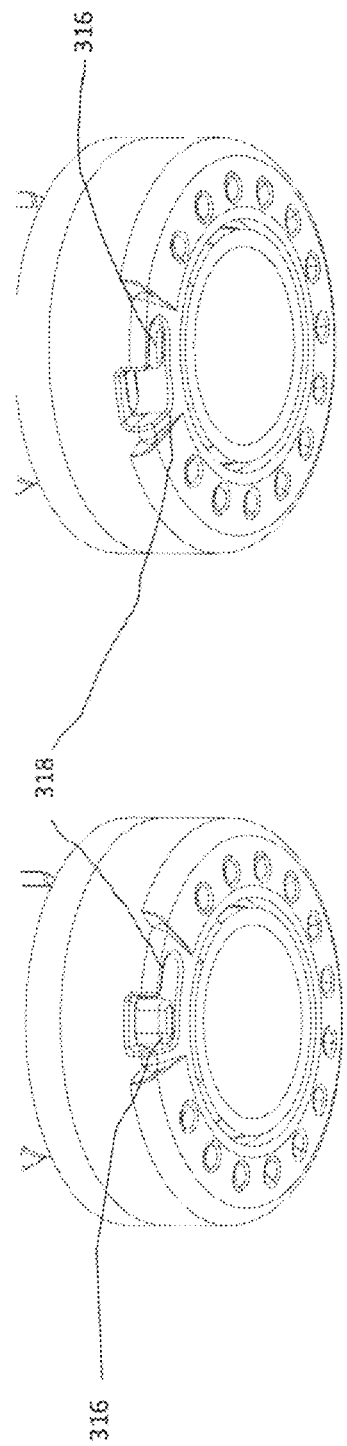

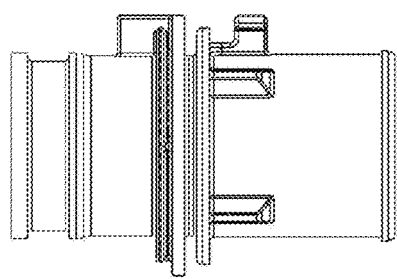
FIG. 79D
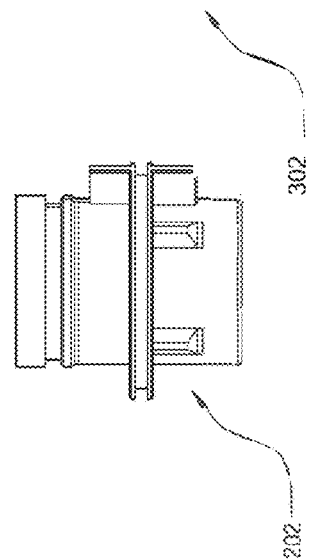
FIG. 79C
FIG. 79B
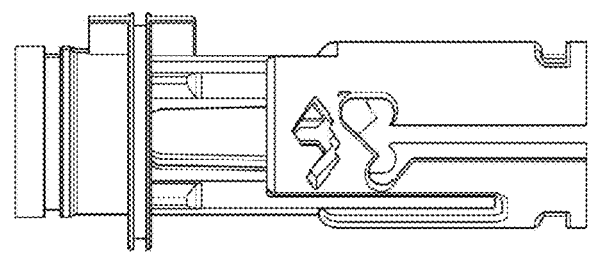
FIG. 79A

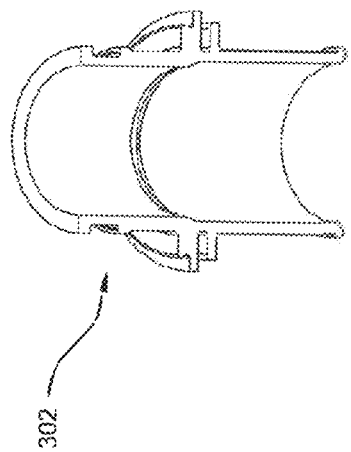
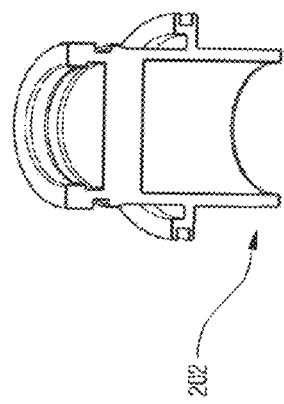
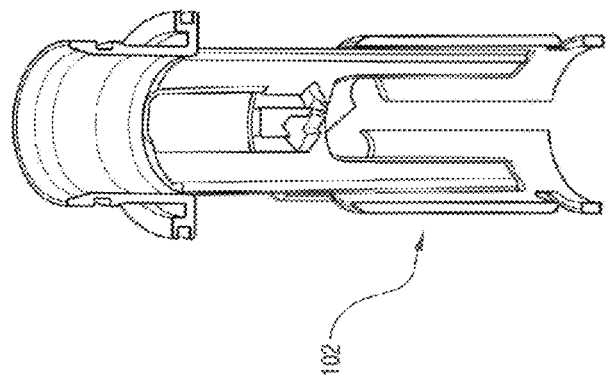
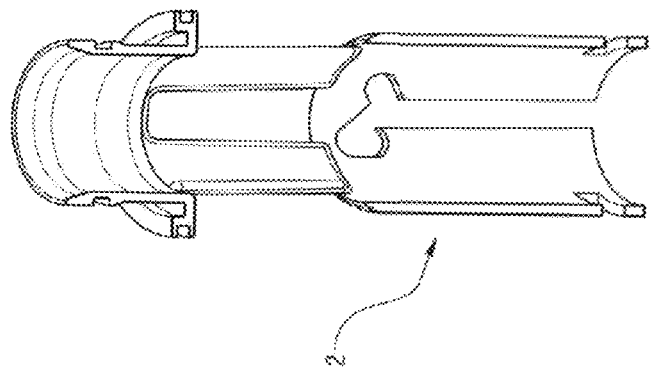
FIG. 80D
FIG. 80C
FIG. 80B
FIG. 80A

SAFETY VALVE FOR RETURNABLE BOTTLE, BOTTLE COLLAR AND PROCESS FOR PLUGGING A RETURNABLE BOTTLE

CROSS REFERENCE TO RELATED APPLICATION

This application claims priority to Uruguayan Application Number 40036, filed Nov. 22, 2022, the disclosure of which is incorporated herein by reference in its entirety.

FIELD OF THE INVENTION

The present invention relates to a security valve designed for use in returnable bottles, a bottle collar to be applied thereon, and a process for plugging a returnable bottle. Bottles can be of the type that is placed on dispensers, or they can be returnable bottles which can be discharged manually or by other means The contents of the bottles can be for human ingestion such as water, juice, or any other drinkable liquid, but alternatively the contents can be any other non-drinkable liquids such as chemicals, caustics, or liquid fuels.

The security valve that in this document will be called VBR Valve (Returnable Bottle Valve) includes three embodiments: a) a valve provided with an automatic actuator; b) a valve provided with a manual actuator and c) a valve not provided with an actuator.

BACKGROUND

EP 2925666B1 relates to a container closure for overhead emptying, which has a closure cap (1) for placing on a container neck, the closure cap having an approximately cylindrical cap jacket (2) and a circular disk-shaped head plate (3) which has a central opening (4), from which an inward directed pipe socket (5), in which a sealing plug (6) is locked, the sealing plug (6) also being able to be brought into locking engagement with a drain pipe and moved into the interior of the container. In order to create a corresponding container closure, which after the first use cannot easily be brought back into (apparently) the same state as it was before the first use, even if a corresponding label is stuck back onto the head plate, it is proposed according to the invention: that in the pipe socket (5) above the plug (6) there is a sealing disk (7) fixed to the pipe socket (5) with a tear-out sealing membrane (8). However, unlike the present invention, the valve is disposable; the container is returned to the factory open with associated risks of contamination or insect entry; the container can be reused by others, since, by placing a new cap, it can be marketed without quality control of the contents.

EP0706952A1 discloses a tamper-evident/non-refillable type of closure for a bottle that comprises a cylindrical tube (G) which fits around and is secured to the outer surface of the neck of the bottle (H), a valve seat (D) which forms a seal with the neck of the bottle (H), a valve (C) which makes a seal with the valve seat (D), two cylindrical spheres or marbles (E) and (F). one located in a lower cavity of the valve seat (D) and the other located above the valve (C), a pourer (B) attached to the tube (G) by ultrasonic welding and extending around the valve seat (D) and accommodating the valve (C), and an internally screw threaded tamper-evident cap (A) which is screwed onto the pourer (R) However, unlike the present invention, the closure is not a reusable one, but rather a disposable closure.

GB2329892A describes a closure for a bottle has an end wall 4, an outer annular wall 5 with an internal bead 7, an inner annular wall 6 for receiving a dispensing tube, and a tamper evident portion 14 which is broken by the dispensing tube when the bottle is inserted in a water fountain type dispenser. The tamper evident portion may be a diaphragm with tear lines 16 and petal shaped parts 15, and may be located in the plane of the end wall. The closure may have a stopper 9 which can be moved by the dispensing tube between a closed position in contact with the inner wall, and an open dispensing position remote from the inner wall. The closure may also have a tear line 17 in the outer wall, to enable removal of the closure after use. and a tamperproof ring 23 attached by bridges 24 to the outer wall. However, unlike the present invention, the valve in the cited document is disposable, the water gallon is returned to the factory and can be reused by unauthorized others.

GB2366287A discloses a tamper-evident anti-refill closure 10 comprises a sleeve 20 and a valve seat body 30, the sleeve being adapted to lie around the mouth 15 of a container and being provided with at least one inwardly projecting resilient means 25 engagable with an outer lip portion of the container mouth whilst the valve seat body is at least partially receivable within the neck portion of the container, the sleeve at least partially surrounding the valve seat body. The sleeve may further comprise a pouring outlet portion 55 which may have an extending lip 60. The closure may further comprise a tubular body 65, a bore of which is closed by an outer face wall 85, the tubular body being connected to the inner surface of the sleeve by webs 75. The tubular body may have a circumferential brim portion 90. The sleeve may be fitted with a plurality of ribs or ridges 100 which co-operate with raised ribs or ridges on the outer surface of the container to prevent the sleeve being rotated about the container neck. The valve seat member may comprise a tubular portion, having one end 120 closed except for a circular aperture, which may have interference means provided to engage with the inside of the container whilst the other end may comprise an annular trough which in use prevents the insertion of foreign objects into the tubular member by providing a non-linear fluid flow path 410 (FIG. 9). A second invention is disclosed comprising a first sleeve and a second, outer sleeve that is rotatable about the first. The first sleeve may be fixed upon the container neck, may further comprise valve means and may be provided with a cap, there being a frangible connection between the two. However the valve of this document cannot be reused because it is disposable, the same as the container.

Document AR056057A1 describes a tamper-resistant lid for returnable water bottles. It consists of a circular portion subdivided into 6 equal portions housed in a central depression. These 6 petals that make up the center of the lid will tear from the center towards the walls in a controlled manner once the lid—placed on the bottle—is pierced by the sword of the dispenser. When this happens the lid will be completely unusable. The lid is concave in shape and contains thin, pronounced and sharp concentric lips throughout its circumference, which is why it adapts to all types of spouts and corrects imperfections that they may have since when the lid comes into contact with the spout of the drum Both snap together and the thin edges of the lid deform, thus guaranteeing a perfect closure. However, in this document the lid is disposable and does not guarantee that the bottle will be returned to the plant with the lid on and does not prevent unauthorized refilling.

As can be seen in the above documents, it can be concluded that in the state of the art there is not a valve with the features and advantages of the present invention.

SUMMARY OF THE INVENTION

The present invention relates to 1) a security valve provided with an automatic actuator, 2) a valve provided with a manual actuator, 3) a valve not provided with an actuator, for plugging a returnable bottle or drum, 4) a compact valve and a bottle collar. The valve with an automatic actuator is designed to plug bottles to be placed on dispensers having a probe that opens the valve to release the liquid contained within the bottle and when removing the valve from the dispenser, the valve remains safely closed. The valve with a manual actuator is designed to be used for bottles to be placed on dispensers without a probe, and the manual actuator is used to open the valve and close it safely. The valve without an actuator, i.e., the actuator-free valve, is designed for returnable bottles and drums containing non-drinking liquids. The compact valve has fewer parts. In the four versions, the valve includes a tamper-proof security mechanism, and the process includes etching an opening code on the outer surface of the valve, where the valve is released for its removal from the bottle through a 3-rotations unlocking maneuver of the security mechanism, with a first rotation in one direction through a first determined number of angular degrees, followed by a second rotation in the opposite direction through a second determined number of angular degrees, and a third rotation in the first direction through a third determined number of angular degrees, and where the three numbers of rotation degrees are known by decrypting said opening code. In one embodiment the opening code is presented as a barcode and in an alternative embodiment as a two-dimensional QR code, both known in the art.

BRIEF DESCRIPTION OF FIGURES

FIGS. 5A, 5B, 5C and 5D illustrate the key disks placed inside the combination box of a VBR valve with an automatic actuator.

FIG. 6 shows a combination box adjusted for the removal of the VBR valve with an automatic actuator.

FIG. 7 shows the mechanism that secures the VBR valve with an automatic actuator inside the bottle.

FIG. 8A shows the lock guides, FIG. 8B shows a VBR valve with an automatic actuator having the locks placed in their guides.

FIGS. 9A and 9B illustrate the movement of the position locks of the VBR valve with an automatic actuator.

FIGS. 10A and 10B are a side view of the arrangement of the position locks in their two states in a VBR valve with an automatic actuator.

FIGS. 11A-11C illustrate in three steps how the key box enters and remains locked in the bottle collar of a VBR valve with an automatic actuator.

FIGS. 15A to 15F show the disassembling sequence of a VBR valve with an automatic actuator.

FIG. 16 shows the sealing elements of the key box of a VBR valve with an automatic actuator.

FIG. 17 shows the main seal of a VBR valve with an automatic actuator.

FIG. 20 illustrates the dispenser cradle of a VBR valve with an automatic actuator.

FIG. 21 shows the opening actuator prior to its insertion into the dispenser for a VBR valve with an automatic actuator.

FIG. 22 shows the drum prior to its insertion into the dispenser (VBR valve closed) of the VBR valve with an automatic actuator.

FIG. 23A illustrates the bottle inserted in the dispenser of an open VBR valve with an automatic actuator.

FIG. 24A shows the security ring and its bolts of a VBR valve with an automatic actuator.

FIG. 24B shows the plunger with its guides and ribs in a VBR valve with an automatic actuator.

FIG. 24C shows the security ring and plunger assembly of a VBR valve with an automatic actuator.

FIG. 33A is a side view; FIG. 33B is a perspective view.

FIG. 35A is an external view, FIG. 35B is an inner view, FIG. 35C is a perspective view, and FIG. 35D is an enlarged view of the modifications.

FIG. 36A shows a perspective view, FIG. 36B shows an external view, FIG. 36C shows an inner view, FIG. 36D shows a detailed view of the CVE channel, FIG. 36E is a side view of the modification made for the operation of the manual actuator.

FIG. 40A shows the closed VBR valve with a manual actuator before use.

FIG. 40B shows the VBR valve with a manual actuator closed with its actuator hidden.

FIG. 40C shows an open VBR valve with a manual actuator with its actuator hidden.

FIGS. 41A-41F shows the operation sequence of a VBR valve with a manual actuator.

FIG. 41A shows a VBR valve with a manual actuator before use.

FIG. 41B shows a VBR valve with a manual actuator after the first operation.

FIG. 41C shows a VBR valve with its manual actuator coming out after the first operation.

FIG. 41D shows the VBR valve with its manual actuator completely out. FIGS. 41E and 41F show side views of the VBR valve with a manual actuator.

FIG. 42A shows the second operation of the VBR valve with a manual actuator.

FIG. 42B shows the VBR valve with a manual actuator already open.

FIG. 42C shows a detailed view of the recess made for manual actuator operation.

FIG. 43A shows the functioning of the sleeve recess as an operation stop for the manual actuator.

FIG. 43B shows a detailed view of the recess in this position.

FIG. 43C shows the functioning of the sleeve recess as a retention point for the VBR valve with a manual actuator open.

FIG. 43D shows a detailed view of the recess in this position.

FIG. 45A shows the VBR valve with a manual actuator when attempting to open the VBR valve for the second time.

FIG. 45B shows what happens when the VBR valve with a manual actuator is released after being operated to open it again.

FIG. 46A shows the tracker before pressing.

FIGS. 46R and 46S show perspective and exploded views, respectively, of a VBR valve with a manual actuator.

FIG. 48 is a side cross-sectional view of the part that replaces the sleeve in its position inside a VBR valve without an actuator.

FIG. 49A is a side view of the part that replaces the sleeve.

FIG. 49B is a bottom view of the part that replaces the sleeve, in a VBR valve without an actuator.

FIGS. 62A to 62C are a cross-sectional view of the bottle with a compact returnable drum valve (VBR_C) on the container.

FIG. 63A is a side cross-sectional view and FIG. 63B is a perspective cross section of the valve, where the key system (303) is the one already described, showing the parts different from the rest of the embodiments forming part of the valve-opening section.

FIGS. 64 and 65 show the parts that make up the opening section (334).

FIGS. 66A to 66D are views of the sleeve (304) of a compact VBR_C valve.

FIGS. 67A to 67E are views of the base of the closing system (305).

FIGS. 68A to 68D are views of the closing plug (306).

FIGS. 69A to 69D are views of the security ring (308).

FIGS. 70A to 70C are views of the valve spring (307).

FIGS. 71A to 71D show the assembling sequence and the relationship between the parts of the opening system (334) and the coupling of the base of the closing system (305) with the sleeve (304).

FIGS. 72A to 72D show the coupling of the closing plug (306) to the closing base (305).

FIGS. 73A and 73B show the coupling of the spring (307) between the closing base (305) and the closing plug (306).

FIGS. 74A to 74D show the coupling of the security ring (308) with the closing plug (306)

FIGS. 75A to 75C show an opening sequence of the VBR_C valve.

FIGS. 76A to 76H show the operation of the labyrinth (313) with respect to the labyrinth trackers (319).

FIG. 77 shows the position of the labyrinth trackers (319) when attempting to open the VBR_C valve for a second time.

FIG. 78A shows the position of the indicator (316) of the valve ready for use.

FIG. 78B shows the hidden indicator (316), evidencing a used valve.

FIGS. 79A, 79B, 79C and 79D show side views of the four VBR valve embodiments.

FIGS. 80A, 80B, 80C and 80D show perspective cross-sectional views of the four VBR valve embodiments.

FIGS. 81A, 81B, 81C and 81D show full side views of the four VBR valve embodiments.

FIGS. 82A, 82B, 82C and 82D show full perspective cross-sectional views of the four VBR valve embodiments.

DETAILED DESCRIPTION

The VBR valve of the present invention has been designed in four different embodiments: a) a VBR valve with an automatic actuator, b) a VBR valve with a manual actuator, c) a VBR valve without an actuator and d) a compact valve.

The VBR valve with an automatic actuator was designed to be used in bottles that will be placed on dispensers that have a central probe in the housing, that normally pierces the bottle lid when placed upside down on the dispenser.

The VBR valve with a manual actuator is designed to be used in bottles that will be placed on dispensers that do not have a central probe.

The VBR valve without an actuator is designed for use in bottles that are not placed on dispensers and contain hazardous liquids (caustic or flammable chemicals) that require a tamper-proof closure.

The VBR_C compact valve was designed in such a way that it comprises fewer parts and more reliable locking when removing the drum from the dispenser.

VBR Valve with an Automatic Actuator

Figure 1:
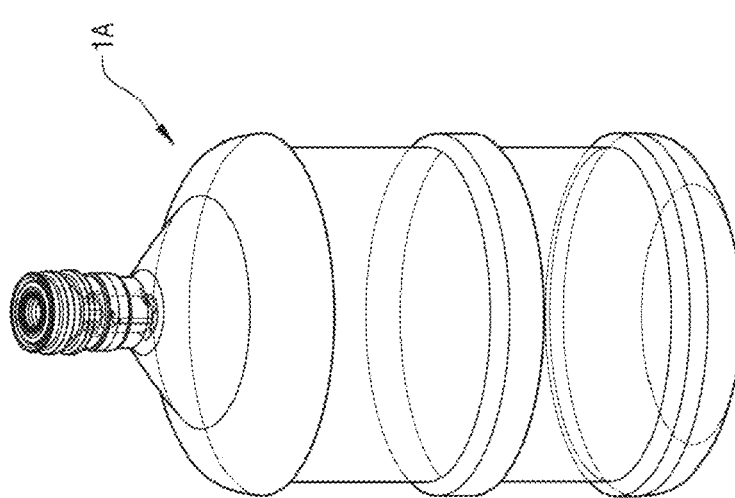
FIG. 1 shows a commercial bottle with a VBR valve with an automatic actuator in place.

FIG. 1 shows the security VBR valve with an automatic actuator of the present invention placed on a returnable bottle that is of the type used in water dispensers.

Problem Solved by the Present Invention

Currently, the bottles are delivered with a disposable lid having an inner closure that opens when the bottle is placed in the dispenser. Its opening is by means of a hollow plastic bolt (probe) present in the dispenser, through which the water flows by gravity.

When the bottle is empty, it is removed from the dispenser and can be left open or partially closed and returned to the factory, where the lid is removed, discarded and after washing and refilling the bottle with treated controlled water, a new lid is placed, and the bottle sent back to the market. So, the disposable lid is not reliable because it is not designed to be tamper-proof after use.

There are several problems present during the useful life of a bottle:

a. The bottle returns to the plant with its lid open or partially closed, which does not guarantee that the container is harmless, with risks of contamination and vermin intrusion. In bottles that contain water for human consumption, safety is very important.

b. The bottle can be easily refilled by any manufacturer, even if they are not the owner.

C. The bottle can be easily refilled by the consumer who, once the original contents of the container have been used, can remove the disposable lid and refill the bottle with tap water, causing issues to the manufacturer, both through loss of sales and contamination of that container at the time the customer returns it.

d. Bottles are stolen by third parties for refilling, perhaps without the necessary water quality control and with an associated risk of contamination of the returnable container at the time the bottler who owns the container recovers it.

e. The customer is not sure of the source of the water provided in a bottle as they are not sure whether it was bottled by the manufacturer listed on its label. This can also discredit the bottler who owns the brand.

f. In case of a bottle recall due to food safety issues, sabotage, or other reasons, when using the prior art disposable lids, there is no concept of container traceability on which the manufacturer can rely on for identifying and individualizing the bottles that need to be recalled, or the affected production lot.

g. Disposable lids produce constant plastic waste, damaging the environment, and a continuous investment in new lids.

These problems are solved by the security VBR valve for returnable bottles of the present invention.

The use of the VBR valve allows the manufacturer to use its entire inventory of bottles, without the need of replacing them with new bottles with a special design where a bottle collar is placed or welded. In this sense, the VBR valve adapts to all current bottle models and sizes found on the market.

Description of the Safety VBR Valve with an Automatic Actuator of the Present Invention The description of the security VBR valve with an automatic actuator for returnable bottles of the present invention will be made by representing the parts as the description of its functions progresses, so if incomplete images are observed it is because the missing part is not necessary for the description in that paragraph.

To overcome the issues of current bottle closures, the security VBR valve was designed to achieve the following objectives:

a. Only the proprietary owner should be able to remove the VBR valve from the bottle, which is achieved through a combination of mechanical elements and computer processing.

b. The lid must be returned closed to the bottling plant for sanitary reasons.

c. The bottle cannot be refilled outside the owner's facilities.

d. The bottle should be returnable and completely sanitizable.

e. The bottle should be traceable and monitored during its useful life and as well as the automatic returnable VBR valve.

f. The VBR valve should be compatible with current bottles and dispensers and its use should be clear to the user.

The present invention assembly is made up of the following two elements:

Bottle Collar:

FIG. 1 shows the returnable bottle with the VBR valve 2 with an automatic actuator of the present invention.

Figure 2A:
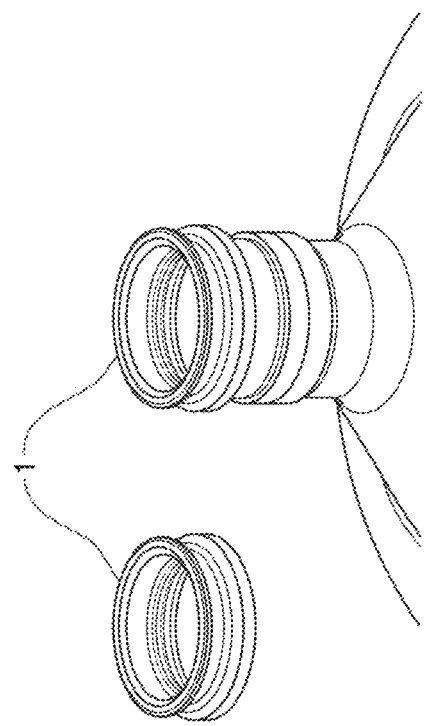
FIG. 2A shows a bottle collar.

FIG. 2A shows the collar 1 that, with the aim of applying any of the valves of the present invention to an existing conventional bottle, is welded to the bottle neck by ultrasound, or alternatively, by laser, high frequency, roto-fusion, or by chemical bonding. On the one hand, the collar allows the VBR valve to be compatible with the different manufacturing tolerances of bottles from different manufacturers, enabling the use of a retaining ring to fix the removable VBR valve to the bottle. In addition, it identifies the bottle with a tracking code 46 (see FIG. 2B), which can be implemented on its outer surface based on different technologies according to the bottler needs or requirements, for example by thermal etching, painting, or erosion. This code is used to trace the bottle throughout its useful life. In one embodiment the code consists of a barcode and in another embodiment, it consists of a two-dimensional QR code, both known in the art.

The bottle with its collar 1 is sanitized using the same methods and steps currently used with the traditional returnable bottles.

In another embodiment, the application of the valves of the present invention to bottles that are manufactured comprising the collar 1 is contemplated without the need to carry out the above described process.

Figure 2C:
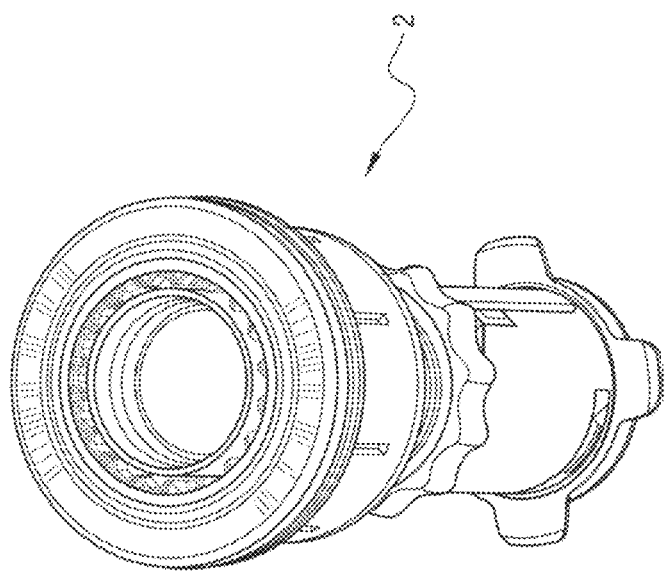
FIG. 2C is a top perspective view of a VBR valve head.
Figure 2B:
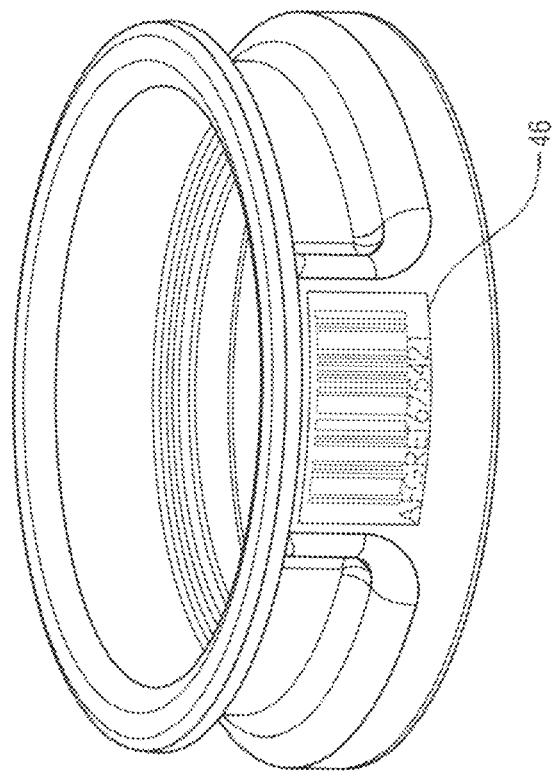
FIG. 2B shows a bottle tracking code.

2—VBR Valve with a Removable Automatic Actuator:

FIG. 2C shows the head of a VBR valve 2 with an automatic actuator.

Figure 3:
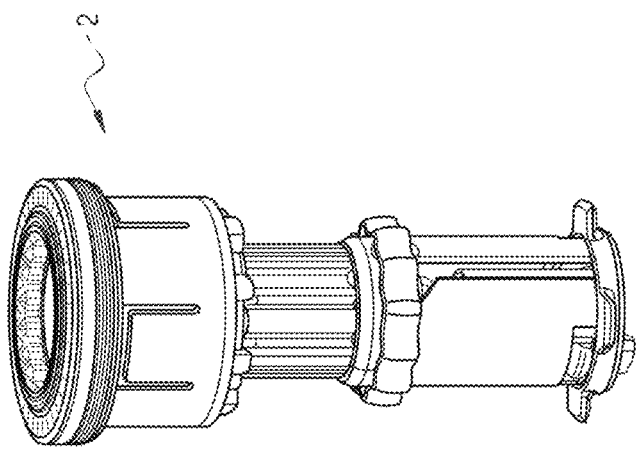
FIG. 3 is a perspective view of a VBR valve with an automatic actuator of the present invention.

FIG. 3 illustrates a removable security VBR valve with an automatic actuator 2 which is removed to fill the bottle and consists of several parts whose functions will be described on the following pages. The security VBR valve 2 includes a security code 51 that is independent of the collar code 1 and serves to identify the VBR valve at the plant and enables its opening. Once the VBR valve 2 is removed and sanitized, it is placed in any already refilled bottle, updating the security database with the VBR valve code of each bottle.

Function of Each Component of a VBR Valve with an Automatic Actuator

Secure Opening of a Bottle with an Automatic Actuator

Figure 4C:
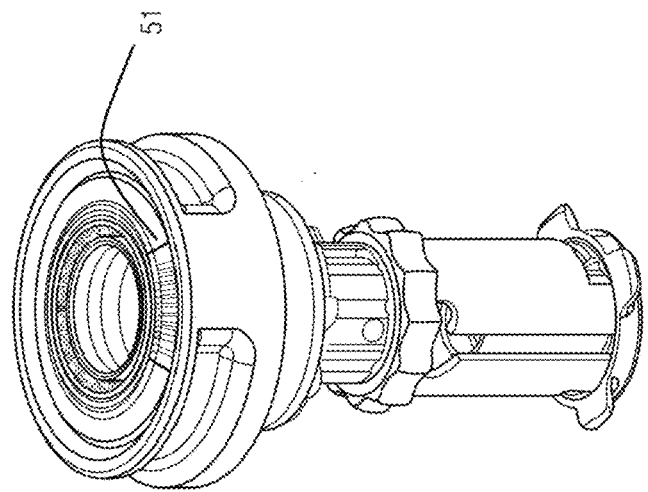
FIG. 4C shows the security code of a VBR valve with an automatic actuator etched on its lid.
Figure 4A:
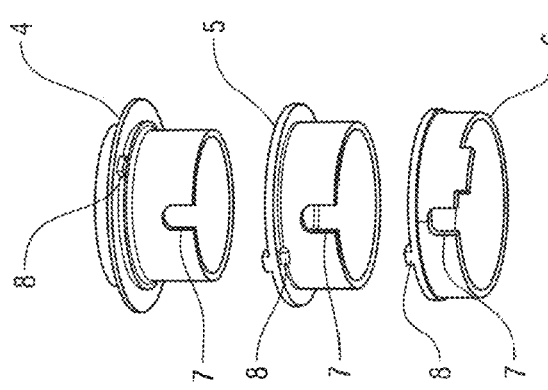
FIGS. 4A and 4B is an exploded view of the key disks of the security VBR valve with an automatic actuator.
Figure 4B:
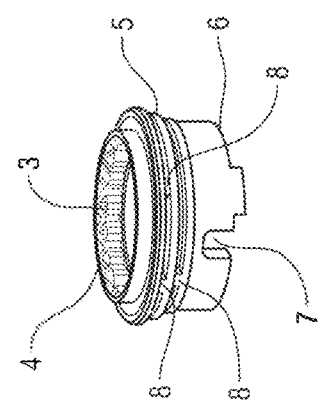

FIGS. 4A and 4B show that a security VBR valve with an automatic actuator comprises a series of cylinders 3 having a single position at which the VBR valve can be removed. This combination is set at the factory with an automatic machine that can combine the cylinders 3 into one of over 42,000 positions. This number of combinations allows the machine to be programmed to assign a unique combination for each customer and different codes to each of their bottles. Once the VBR valve with an automatic actuator 2 is assembled, the machine prints the security code 51 on its outer surface in the form of a barcode or as a two-dimensional QR that is entered in a computer system, which must be queried to know the bottle opening key, since it is inaccessible encrypted. This query is made by the customer's removing machine by reading the key encrypted in the barcode or in the two-dimensional QR code using an optical reader arranged for such purpose and comparing the result with the code database stored on a computer system server adapted for such purpose.

FIG. 4C shows code 51 etched on the lid of a VBR valve with an automatic actuator.

Coded Disks (Key Disks)

FIGS. 4A and 4B also illustrate the safety VBR valve 2 comprising three concentrically located disks 4, 5, 6, which can rotate independently and freely and are actuated from the innermost disk 4. The only disk visible from the outside 4, transmits the rotation to the disk 5 through a step 8 hidden on its outer surface while, through its step 8, disk 5 will transmit the movement to disk 6. The "key" slot 7 that is seen at the bottom of the disks is carved at a given and variable angle with respect to the rotation step 8 of each slot, that is, each "key" slot 7 is carved at a different angle from its click step 8. The three key disks 4, 5, 6 are machine-carved at the time of assembly, and a code identifying the VBR valve is etched on its body registering the access data on the computer system server at that time. This angle is selected by the computer program hosted by the system server and depends on the codes to be assigned according to the customer and the automatically assigned sequence number. The customer number is unique for each customer and the sequence number is random.

The first step is to locate the key disk 4 at a known position, and this is done by rotating the key disk 4 counterclockwise. When moving it in that direction, it will come into contact with the key disk 5 and will rotate it in the same direction, until the key disk 5 encounters the key disk 6 and rotates it in the same direction until the key disk 6 encounters the septum 20 of the sleeve 14, which cannot rotate. In this way, the key disk 4 will not rotate anymore. This will be the starting position to begin placing the keys into position.

In FIGS. 5A to 5D it is observed that the key disks 4, 5, 6 are housed in a key box 6 with a lid 9 which function to space them correctly and isolating them from contact with the exterior, preventing the entry of water and hiding the mechanism. The key disks 4, 5, 6 function to allow the VBR valve 2 to be removed from the bottle.

FIG. 6 illustrates the situation in which the key disks 4, 5, 6 will be in the removing position when the "key" slots 7 of the 3 key disks coincide, which will occur if each disk is placed in its correct position. To place the key disks in the correct position it is necessary to know their code made up of three numbers representing the angle at which the key was etched on each disk. The code is not accessible to anyone as it is etched on the surface of the lid 9 of key box 16 in an encrypted manner, which is unique for each customer. The same cryptography can represent different keys depending on the customer. To unlock the VBR valve 2 for operation, the key disk 6 is first brought into position in a certain rotation direction and angle according to how this "key" slot 7 was carved with respect to its step 8. Then this disk is rotated in the opposite direction by dragging the key disk 5 though a certain angle with respect to its step 8 according to its code, and finally it is rotated in the opposite direction to place the key disk 4 in its correct position. If the process is done correctly, the three "key" slots 7 will be perfectly aligned.

Anchoring Mechanism:

FIG. 7 shows the components involved in the mechanism that secures a VBR valve with an automatic actuator 2 inside the bottle and prevents its disassembly. The anchoring mechanism is formed by the bottle collar 1, the position locks 18, the sleeve 14 and its ribs 15, the key box 16 and a locking basket 17.

The sleeve 14 is the mobile part that moves longitudinally to move the position locks 18 with its ribs 15 outwards when the VBR valve 2 is inside the bottle.

Positioning and Functionality of the Parts

FIG. 8A shows the key box 16, which in its lower portion provides guides 19 that house the position locks 18. Said guides 19 only allow a radial movement of the locks 18, and provide stops 12 at their outer end limiting the outward movement of the position locks 18. FIG. 8B shows the locks 18 in position on the guides 19.

FIG. 9A shows the position locks 18 outwardly moved pushed by the ribs 15 of the sleeve 14.

FIG. 9B shows locks 18 moved towards the center, pushed by the locking basket 17 until they touch the sleeve 14 as it moves upwards along with its ribs 15, which in that position no longer press the locks 18.

In FIG. 10A it can be seen that, with the locks 18 in their radially outward position, they encounter with the lower locking point PBI, thereby preventing the key box 16 that carries the locks 18 from coming out of its position.

FIGS. 11A to 11C show, in three steps, the way in which the locking basket 17 enters and remains locked when the key box 16 enters the bottle collar 1 (for clarity only the essential components are represented). FIG. 11A shows the collar 1, the locking basket 17 and the key box 16 their locks 18 moved towards the center. In FIG. 11B, the locking basket 17 has already entered collar 1 until resting on it.

FIG. 11C shows the entry of the key box 16, and how its tapered walls push the lips L of the locking basket 17 outwards, causing them to prevent the key box 16 from moving when locking it at the PBS point.

FIG. 12 shows in detail that the locking basket 17 has lips L with inner ribs, where the lips L can move outwards due to their elasticity.

Figure 13:
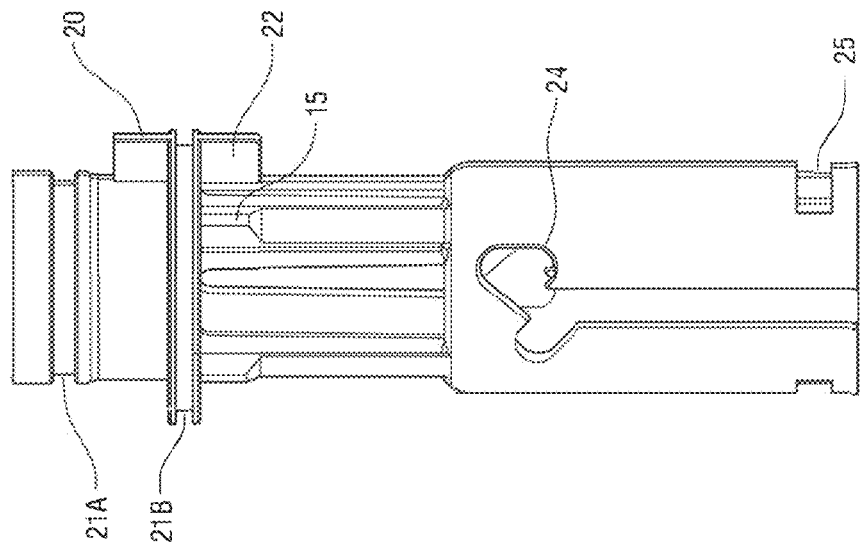
FIG. 13 shows the sleeve and other elements of a VBR valve with an automatic actuator.
Figure 12C:
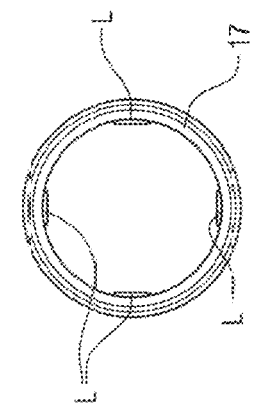
FIGS. 12A through 12D show the lips that will be pushed outwards by the key box to lock the basket against the bottle collar on a VBR valve with an automatic actuator.
Figure 12D:
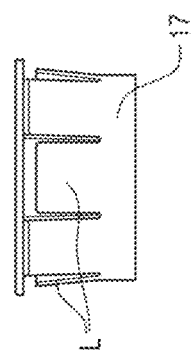
Figure 12A:
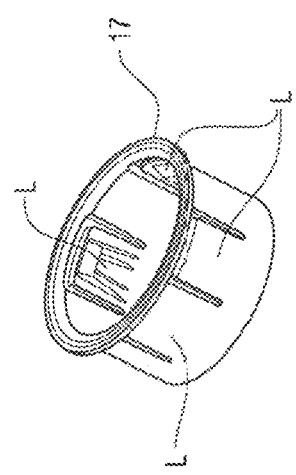
Figure 12B:
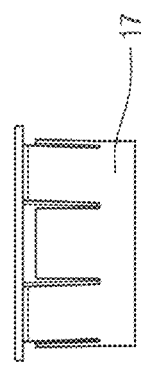

FIG. 13 shows in detail the geometry of the sleeve 14 with its notable elements: the anti-rotation septum 22 and the security septum 20, the seal housings 21A and 21B, the ribs 15, the vertical guide 34 and the horizontal guide 25.

Figures 14A, 14B:
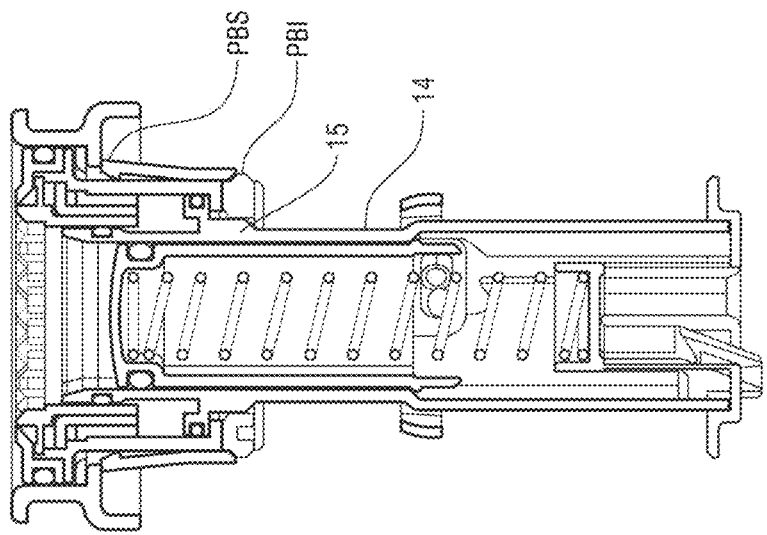
FIGS. 14A and 14B illustrate the two arrangements of a VBR valve with an automatic actuator before and after locking.

FIGS. 14A and 14B show how the key box 16 enters, the outer walls of which are conical, and then, upon reaching its locking position, the key box 16 rests on the upper portion of the locking basket 17, which in turn pushes with its walls the lips L of the locking basket 17, causing them to open to a diameter greater than the bore of the bottle collar 1. So, when trying to remove the VBR valve 2, these lips L will exert forces on the inner surface 13 of the bottle collar at the PBS point. This causes the basket 17 to be trapped externally and internally by the bottle collar 1. The only way to remove the basket 17 is by first removing the key box 16, and it is at that time that the locks 18 come into operation, which, when they are moved outwards by the ribs 15 of the sleeve 14, will rest on the lower edge PBI of the locking basket 17, preventing the VBR valve 2 from being removed.

Relationship Between the Encoded Disks (Key Disks) and the Locking System

FIGS. 15A to 15F illustrate the movements necessary to remove a VBR valve with an automatic actuator from the container. FIG. 15A shows the PBS point where a first locking interference is established, produced by the lips L being moved outwards by the outer tapered faces of the key box 16, preventing the locking basket 17 from being removed from the collar 1. It also shows the PBI point where the second locking interference is generated between the locks 18 and the locking basket 17 when the locks 18 are moved outwards by the ribs 15 of the sleeve 14. Both PBS and PBI points prevent the key box 16 from passing through the interior of the locking basket 17, and therefore prevent disassembling the VBR valve.

The sequence needed for disassembling a VBR valve with an automatic actuator is as follows: FIG. 15B: the sleeve 14 is raised with respect to the key box 16, thus causing the ribs 15 belonging to said sleeve 14 to allow the locks 18 to move radially towards the central geometric axis of the VBR valve. But this movement is not possible if the key grooves 7 of the three key disks are not aligned since the security septum 20 of the sleeve 14 will not be able to rise. Because of this, the key grooves 7 must be first aligned with the locking septum 20 of the sleeve 14, as seen in FIG. 15C. Once the key grooves 7 are aligned, the sleeve 14 can be raised, as seen in FIG. 15D and, in this way, cause the rib 15 of the sleeve 14 to stop pushing the locks 18 outwards. By continuing to pull the sleeve 14 upwards, due to the tapered profile of the locks 18, they move towards the center by exerting a force on the lower edge of the basket 17, also allowing the PBI point to be released. This allows the keys box 16 to pass through the sleeve 14, as seen in FIG. 15E. By continuing this movement, the tapered faces of the key box 16 will stop pushing the lips L outwards of the locking basket 17, which will now stop interacting with the collar 1 at the PBS point, allowing the locking basket 17 to come out of the collar 1, and thereby removing the complete VBR valve with an automatic actuator 2 from the container.

Tightness of the Key Box

FIG. 16 shows the box lid 9 being welded to the key box 16 at the contact surface A. This weld is what keeps the three key disks 4, 5 and 6 in position. The key box 16 must be waterproof sealed and to do so it has a series of elastic rings or O-rings that are detailed below. An O-ring 11 maintains the tightness of the key box 16 with respect to the container exterior, sealing the connection between the key disk 4 and the box lid 9. A second O-ring 26 located between the tight housing 21B of the sleeve 14 and the key disk 4 inner wall maintains the tightness with respect to the exterior. A third O-ring 27 placed between the inner wall of the key box 16 and the tight housing 21A of the sleeve 14 provides tightness of the key box 16 with respect to the container interior.

A fourth O-ring 10 provides tightness of the VBR valve with respect to the container collar 1. O-ring 10 is in the housing B of the box lid 9 and the bottle inner wall of the collar 1.

A fifth O-ring 28 is shown in FIG. 17, which seals the main liquid outlet, and is the one that must be moved with the opening plunger 29. O-ring 28 is in the cavity C of the plunger 29 and the sealing is achieved by contacting against the inner wall of the sleeve 14.

This same FIG. 17 shows the spring 30 of the plunger 29 that maintains the VBR valve sealed, and the stop 31 that maintains the spring 30 in its position.

Water Discharge Mechanism of the VBR Valve with an Automatic Actuator

Figure 18B:
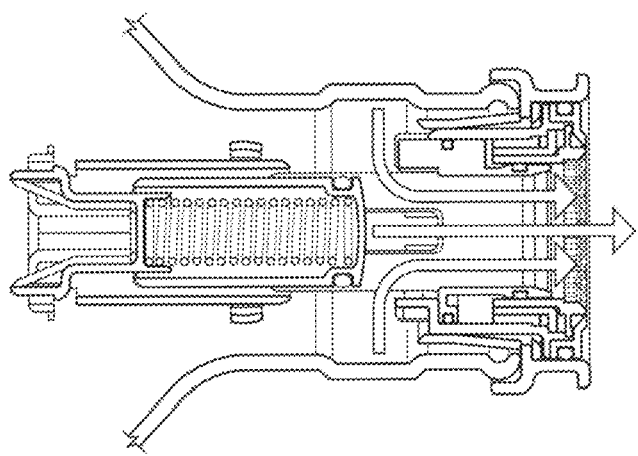
FIGS. 18A and 18B show the liquid discharge system into the dispenser of a VBR valve with an automatic actuator.
Figure 18A:
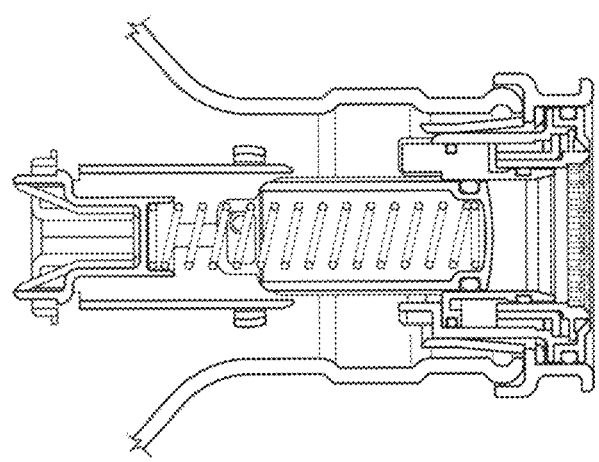

FIG. 18 illustrates the liquid outlet system to the dispenser in the VBR valve with an automatic actuator. In FIG. 18A the VBR valve is closed, in FIG. 18B the VBR valve is open allowing the liquid to come out of the container.

Assembling and Disassembling of the VBR Valve with an Automatic Actuator

Figure 19:
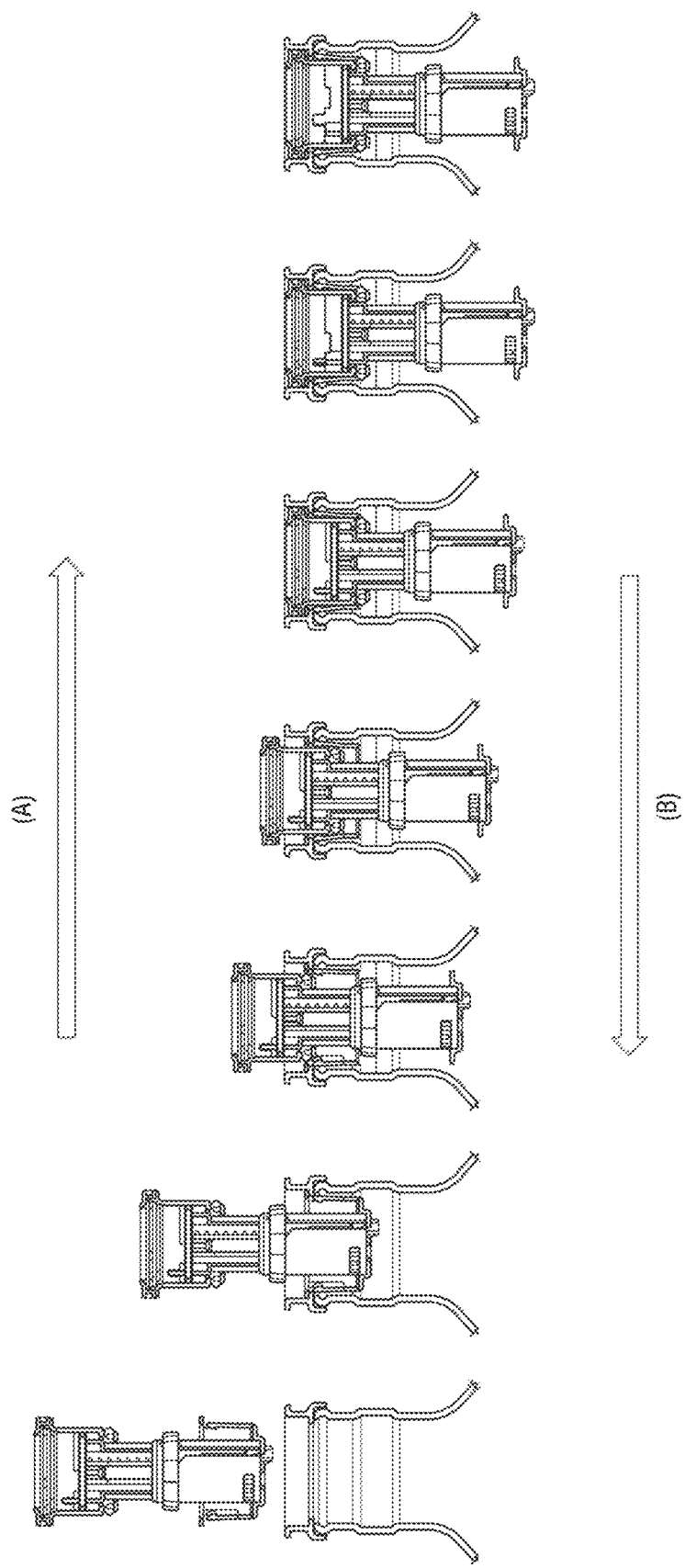
FIG. 19 shows the assembly and disassembling sequences of a VBR valve with an automatic actuator.

FIG. 19 shows from left to right the assembling sequence (A), and from right to left, the disassembling sequence (B) of the VBR valve 2.

The embodiment of the VBR valve with an automatic actuator 2 has been designed for use with dispensers having a probe and it is exclusive for use with bottles since commercial drinking water dispensers have a probe that operates on the VBR valve.

FIG. 20 shows the dispenser cradle or receptacle 32 on which the bottle rests, and FIG. 21 shows the position of the VBR valve 2 with an automatic actuator prior to its insertion into the dispenser cradle 32.

Operation of a VBR Valve with an Automatic Actuator

FIG. 22 is a cross-sectional view of a VBR valve with an automatic actuator 2 before entering the dispenser; FIG. 23A shows the way in which the dispenser probe 33 opens the VBR valve 2 when placing the bottle on the dispenser receptacle 32, thereby allowing the liquid to exit. When the bottle is removed from the dispenser, the probe 33 comes out and the VBR valve 2 closes again.

FIGS. 23B to 23F show the opening operation sequence of a VBR valve with an automatic actuator 2 in a dispenser.

Figures 23B, 23C, 23D:
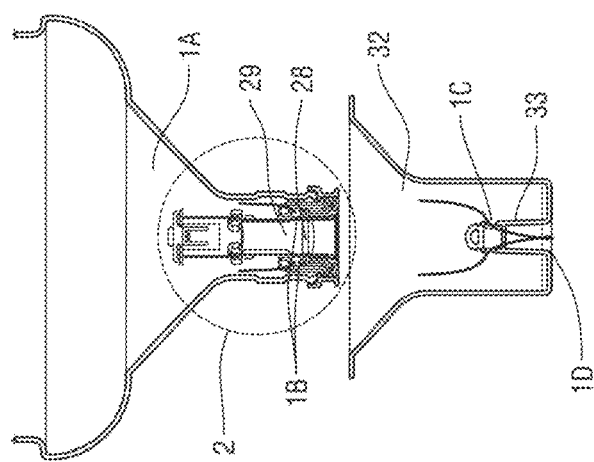
FIGS. 23B to 23F show the opening operation sequence of a VBR valve with an automatic actuator in a dispenser.

FIG. 23B shows the elements of a VBR valve with an automatic actuator before placing the bottle in the dispenser. Valve 2 has two water outlets 1B that, because the bottle 1A has not yet entered the dispenser cradle 32, are locked by the plunger 29 and its closing O-ring 28. The probe 33 has two water inlet holes 1C and the water outlet entry 1D at its base.

FIG. 23C shows the VBR valve with an automatic actuator 2 when the bottle is positioned on the dispenser. Bottle 1A is positioned on the dispenser cradle 32, the VBR valve 2 is closed, and the internal spring maintains the plunger 29 in the closed position.

FIG. 23D shows the VBR valve with an automatic actuator 2 when the bottle begins to descend onto the dispenser. Bottle 1A descends and the dispenser probe 33 begins to enter the VBR valve 2.

Figure 23F:
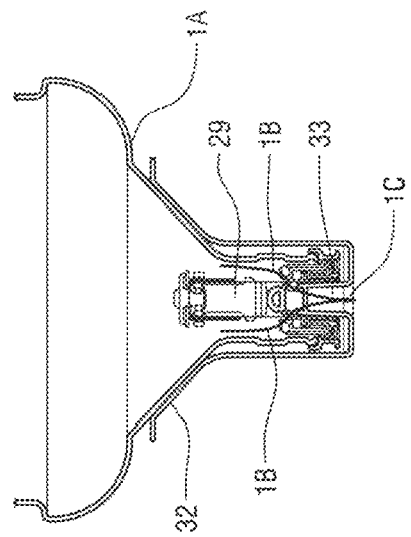
Figure 23E:
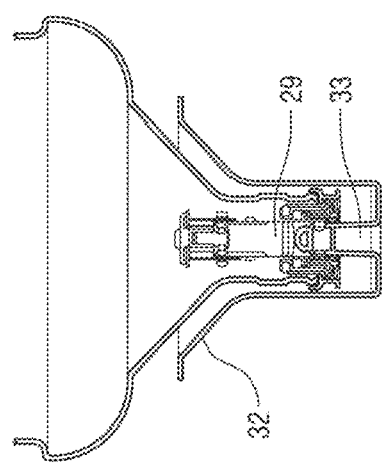

FIG. 23E shows the VBR valve with an automatic actuator 2 when the bottle descends further onto the dispenser. The bottle continues to descend and starts to push the closing plunger of the VBR valve 2 into the bottle.

FIG. 23F shows the VBR valve with an automatic actuator 2 reaching the lowest point inside the dispenser. Bottle 1A continues to descend, the plunger 29 is pushed to its open position, the water outlets 1B are released and enters the probe through point 1C and flows towards the outlet 1D of the dispenser probe 33.

Tamper-Proof System Preventing Refilling by Others

This section describes the mechanism that allows a bottle to be filled and emptied only once, having to return to the bottling plant for refilling.

Figure 24A:
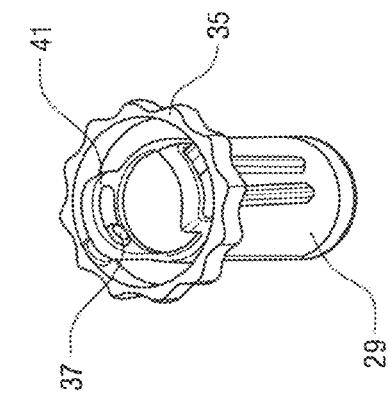
FIGS. 24A-24C show elements of the security system against unauthorized bottle refilling of a VBR valve with an automatic actuator.
Figure 24B:
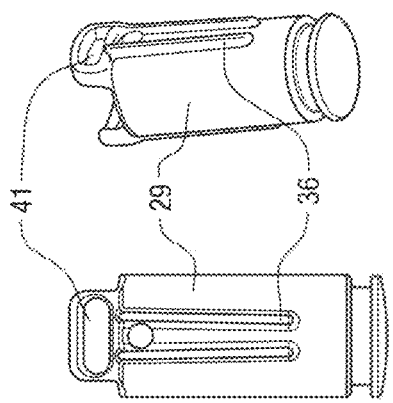
Figure 25:
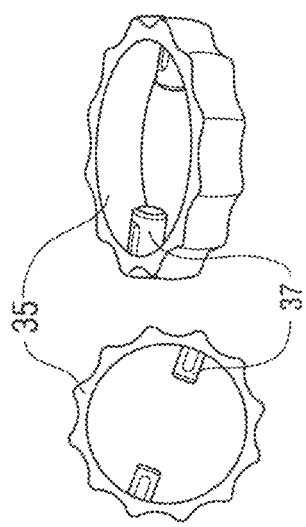
FIG. 25 shows details of the sleeve, guide, and guides of a VBR valve with an automatic actuator.
Figure 24C:
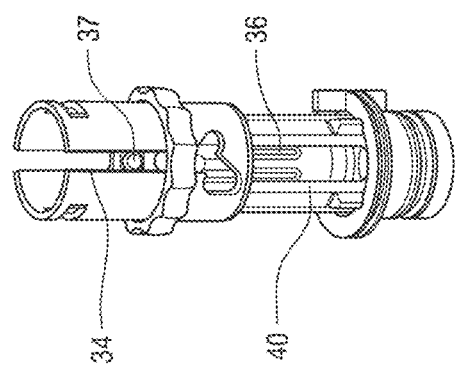
Figure 26:
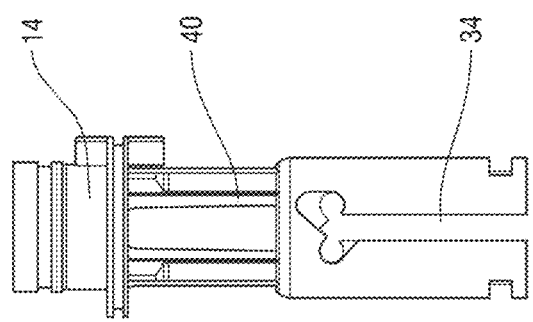
FIG. 26 shows the security ring and plunger assembly inside the sleeve of a VBR valve with an automatic actuator.

FIG. 24A shows the security ring 35 with its bolts 37; said bolts 37 will engage with the plunger 29 when moving within the guides 41 of the plunger 29 shown in FIG. 24B. Due to the limited shape and length of the guides 41, the security ring 35 can only rotate on the plunger 29 at a certain angle, as can be seen in FIG. 24C. In turn, when placing the plunger 29 inside the sleeve 14, the ribs 36 of the plunger 29 will be located within the internal longitudinal guide 40 of the sleeve 14 shown in FIG. 25, preventing the plunger 29 from rotating with respect to the sleeve 14, although allowing it to move axially with respect to the sleeve. To place the plunger 29 inside the sleeve 14, the bolts 37 of the security ring 35 must be positioned inside the vertical guide channel 34 of the sleeve 14, as shown in FIG. 25. This combination of the three parts can be seen in the FIG. 26.

Figure 27:
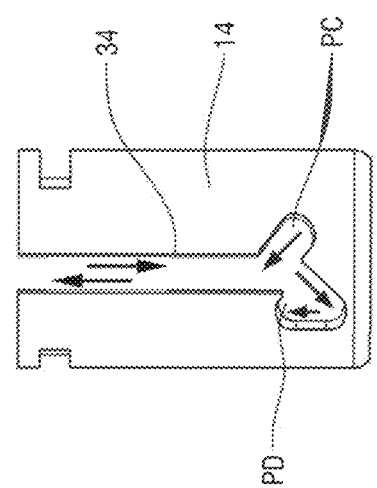
FIG. 27 shows a vertical cross-sectional view of an open VBR valve with an automatic actuator, where the arrows indicate the possible path of the security ring bolts.

The possible movements of the bolt 37 within the vertical guide channel 34 can be seen in FIG. 27. Point PC is the location of bolt 37 when the VBR valve has not yet been used and is still closed. When the VBR valve opens for the first time, the plunger pushes the bolt 37 of the security ring 35, which can only move towards the vertical section of the vertical guide channel 34. When the VBR valve is closed, the plunger 29 descends and so does the bolt 37 of the security ring 35, but due to the geometry of the channel, it will go to the resting point PD. If an attempt is made to open again the VBR valve 2 again by pushing again the plunger 29, due to the geometry of the vertical guide channel 34, the bolt 37 will not be able to leave the point PD, and therefore the VBR valve will remain closed, thus fulfilling the objective of prevent its reuse or refilling. The way the ring 35 prevents the reopening of the VBR valve is explained below along with FIGS. 30A to 30H.

Figure 28:
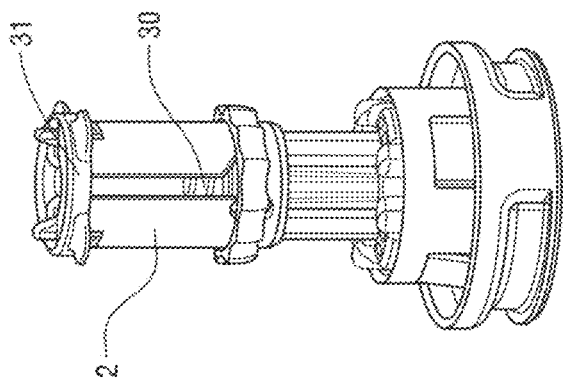
FIG. 28 shows the complete VBR valve with an automatic actuator assembly with the plunger in the closed position pushed by the spring which is held in position by a stop.

FIG. 28 shows the complete assembly of a VBR valve with an automatic actuator 2 where it is observed that the plunger 29 is always pressed by the spring 30 and its stop 31.

Tamper Indication

In order to know if the VBR valve with an automatic actuator 2 mechanism has been operated for any reason, a button 39 on the plunger will make it evident, so the customer can reject the bottle prior to using it. This is also useful when placing the VBR valve in the bottle at the factory to be sure that the valve is enabled for use.

Figure 29:
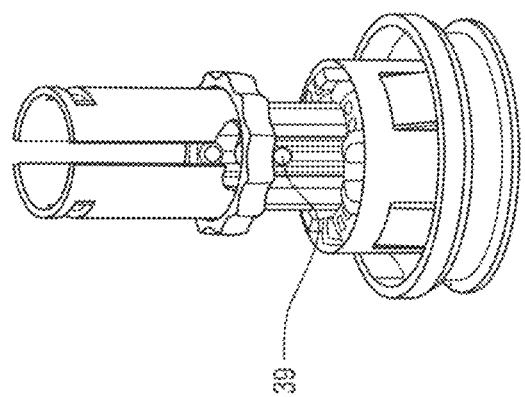
FIG. 29 shows the indicator that is only visible when a VBR valve with an automatic actuator has already been used, indicating that it cannot be used again.

When looking at the channel 34 geometry in FIG. 27, the PD point is at a different level in relation to the PC point. The aim of this geometry is to allow seeing from outside the bottle if the VBR valve has already been used. This is indicated by the indicator button 39 as shown in FIG. 29, which will be visible only when the bolt 37 is in the PD position of the channel 34.

View of the Security Mechanism at Different States of a VBR Valve with an Automatic Actuator
Impossibility to Open from the Outside FIG. 30 shows the opening and closing sequence of the security system.

Figure 30A:
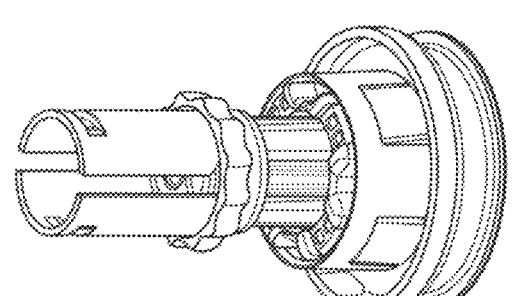
FIG. 30A shows the position of the security ring of a VBR valve with an automatic actuator in its initial position.

FIG. 30A illustrates the VBR valve 2 in the closed estate before operation. The detailed view of FIG. 30B shows the bolt 37 located at point PC.

Figure 30C:
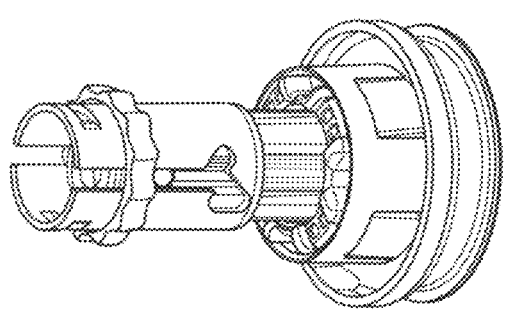
FIG. 30C shows the security ring of a VBR valve with an automatic actuator when the VBR valve is open.
Figure 30E:
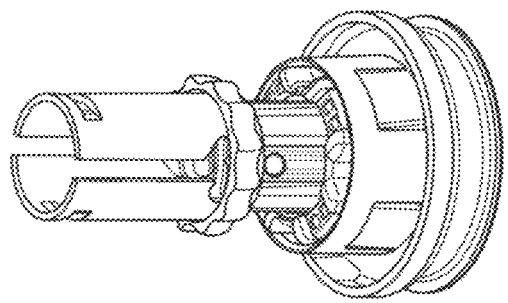
FIG. 30E shows the VBR valve with an automatic actuator after the valve is closed.
Figure 30G:
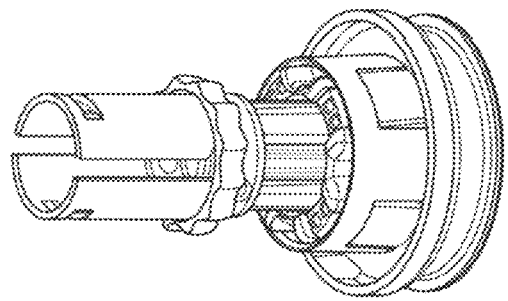
FIG. 30G shows the position of a VBR valve with an automatic actuator when attempting to open it after it has been closed.
Figure 30B:
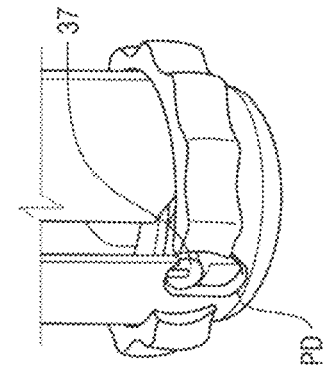
FIG. 30B is a cross-sectional view showing the bolt of a VBR valve with an automatic actuator in the initial position of the security ring.
Figure 30D:
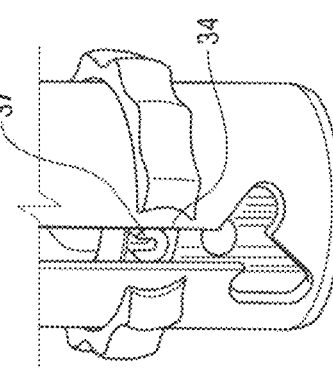
FIG. 30D is a cross-sectional view showing the position of the bolt of the VBR valve with an automatic actuator when the VBR valve is open.

When the VBR valve is opened for the first time, the plunger 29 pushes the ring 35 as shown in FIG. 30C, and so does with the bolt 37 into the vertical channel of guide 34 as shown in FIG. 30D.

Figure 30F:
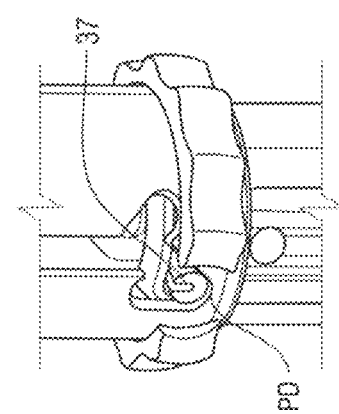
FIG. 30F is a cross-sectional view showing the position of the bolt of a VBR valve with an automatic actuator after the valve is closed.

When closing the VBR valve 2 the plunger takes the ring 35 downwards as seen in FIG. 30E, and the bolt 37 goes down with it towards the PD point as shown in FIG. 30F.

Figure 30H:
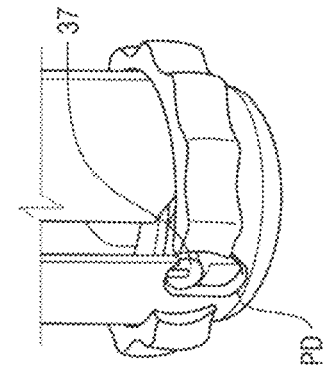
FIG. 30H is a cross-sectional view showing the position of bolt 37 when attempting to open the VBR valve with an automatic actuator after it has been closed.

When attempting to reopen the VBR valve 2, the plunger 29 will push upwards the security ring 35 as seen in FIG. 30G, but the bolt 37 will not be able to go beyond the PD point as shown in FIG. 30H, so the VBR valve 2 will remain closed.

As explained in the previous paragraphs, plunger 29 cannot rotate inside the sleeve 14. However, the ring 35 can rotate to certain angle with respect to the plunger 29 and, since its bolts 37 are inside the channel 34 of sleeve 14, it will only be able to rotate when the bolts are in the portion of the sleeve where channel 34 widens to form the cavities called PC and PD. This allows the bolts to rotate as necessary to move from PC to PD of channel 34. The lack of access from the outside of the container to the interior of the VBR valve prevents access to ring 35 so as to rotate it without removing the VBR valve from the container, thus making it impossible to open the VBR valve. This can only be done when the container returns to the opening-key owner, who can remove the VBR valve and rotate the ring 35 back to PC.

Liquid Flow Circuit

Figure 31B:
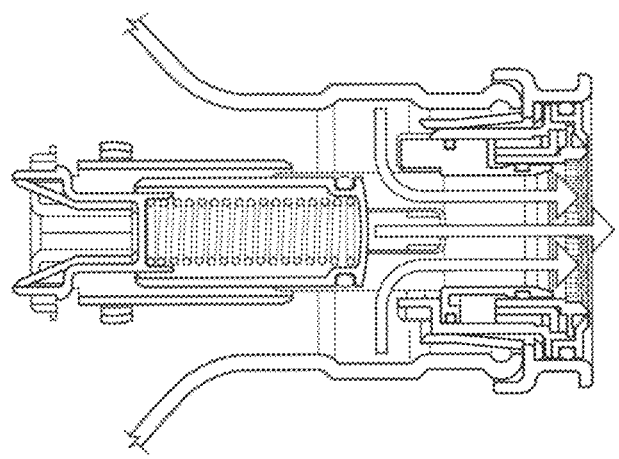
FIGS. 31A and 31B show a vertical cross-sectional view of an open VBR valve with an automatic actuator, where the arrows indicate the channels through which the liquid flows.
Figure 31A:
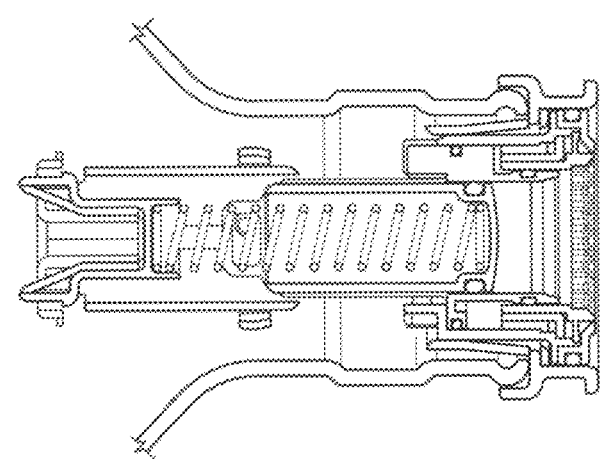

FIG. 31A shows a vertical cross-sectional view of the VBR valve in the closed position while FIG. 31B shows a vertical cross-sectional view of the VBR valve open. The arrows indicate the channels through which the liquid flows.

Figure 32:
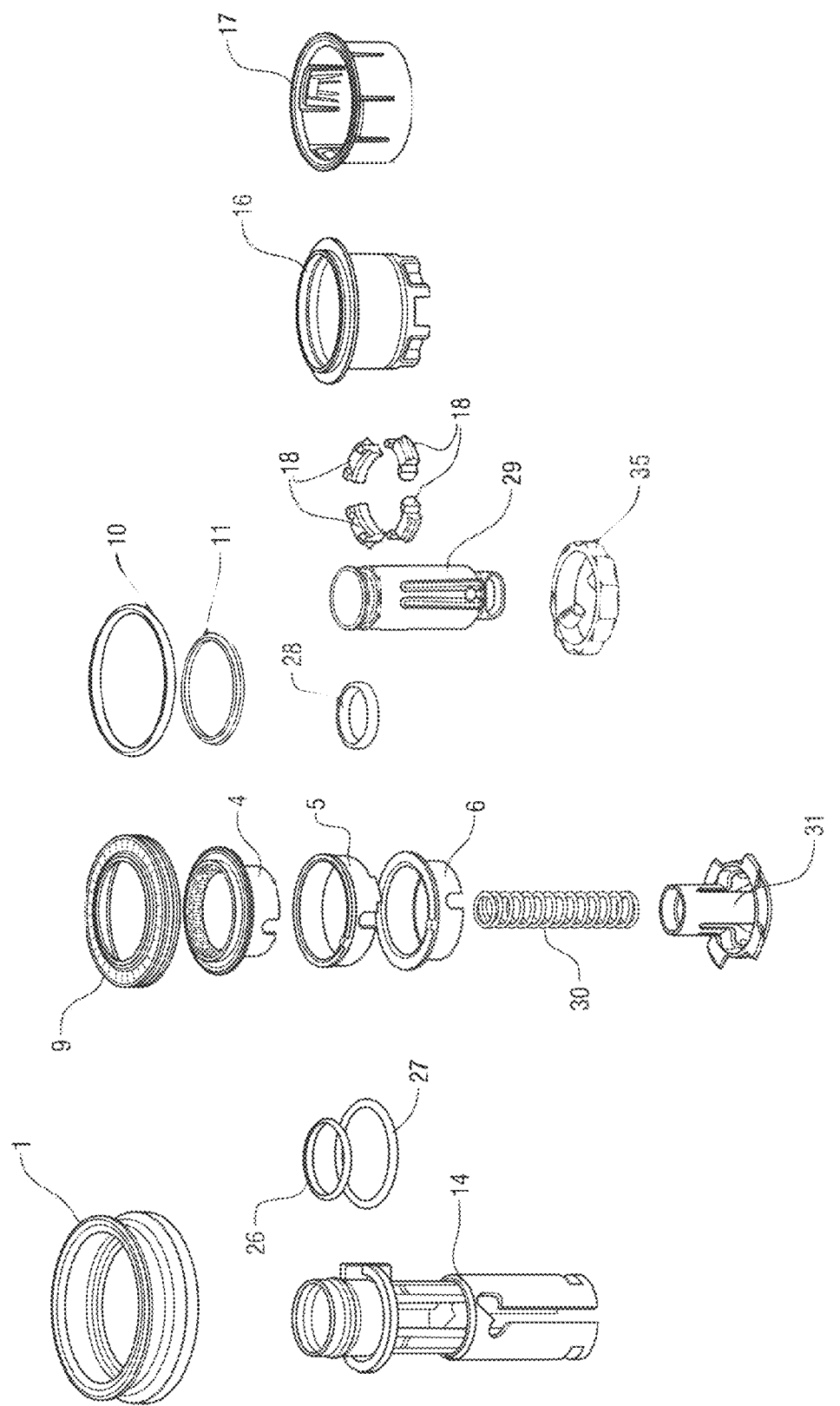
FIG. 32 shows an exploded view of the parts of a VBR valve with an automatic actuator.

FIG. 32 shows an exploited view of the VBR valve 2 parts with their reference numbers.

Manual Opening Actuator

The alternative embodiment of a manual actuator is useful when it is necessary to use the bottles with dispensers not having a probe or to use the bottle without a dispenser.

Figure 33B:
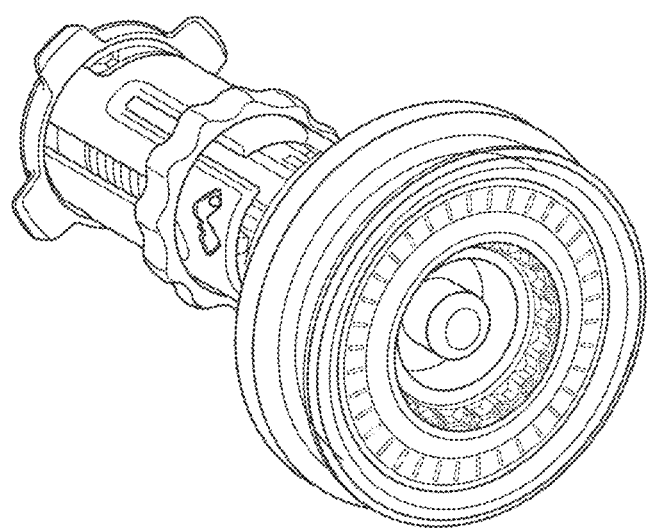
FIGS. 33A and 33B show views of a VBR valve with an automatic actuator.
Figure 33A:
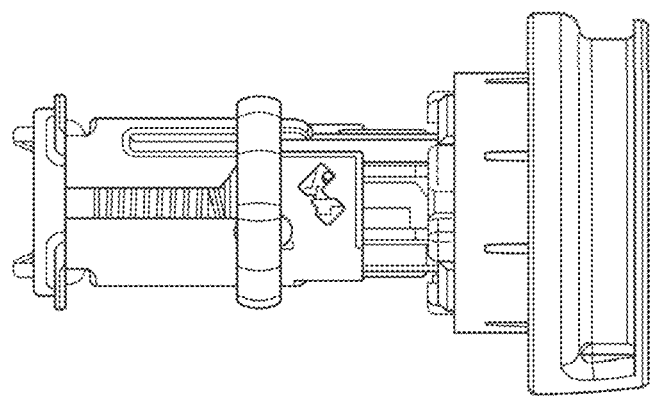

FIGS. 33A and 33B are views of the VBR valve with a manual actuator using the same key mechanism described above and thereby preventing the VBR valve 102 from being removed from the container without knowing the appropriate opening sequence. This embodiment also provides the addition of a central actuator hidden within the VBR valve in place of the dispenser probe function.

Figure 34:
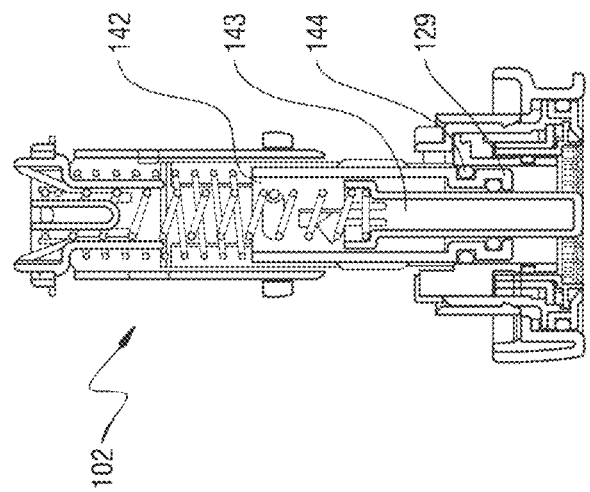
FIG. 34 is a side view of a VBR valve with a manual actuator.

FIG. 34 shows in a vertical cross-sectional view of the VBR valve the spring 143 pushing the actuator 142 inside the plunger 129 and the O-ring 144 sealing the actuator against plunger 129.

Anchoring Mechanism

The components that form part of the security mechanism of a VBR valve with a manual actuator 102 inside the bottle and prevent its disassembly include the bottle collar 1, the position locks 118, the sleeve 114 and its ribs 115, the key box 116 and a locking basket 117.

Sleeve 114 is the mobile part that moves longitudinally to push the position locks 118 outwards with their ribs 115 when the VBR valve 102 is inside the bottle.

Modifications in Parts to be Used with a Manual Actuator

Figure 35B:
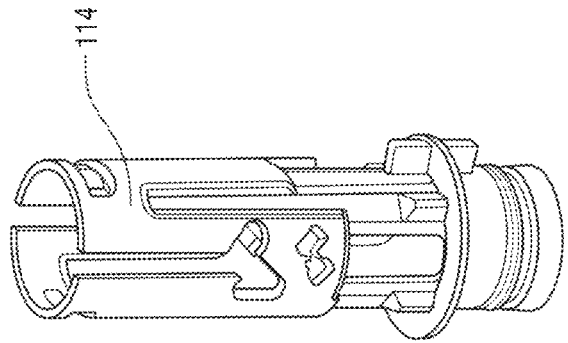
FIGS. 35A-35D show the sleeve with the necessary modifications for a manual actuator.
Figure 35A:
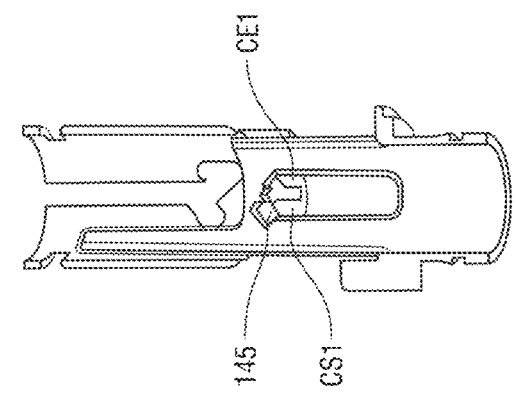
Figure 35C:
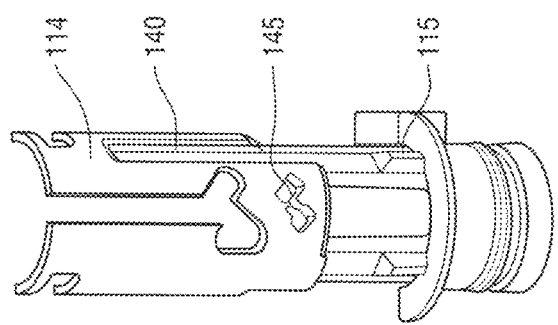

To give functionality to the manual actuator, modifications are made in the sleeve 114 and plunger 129 of the automatic opening actuator. FIGS. 35A to 35C show the sleeve 114 with two recesses 145 made on opposite sides of the sleeve 114 body. FIG. 35A shows an external view of the sleeve 114. FIG. 35B shows an inner view of channels CE1 and CS1. FIG. 35C shows a perspective view of the modified sleeve 114.

Figure 35D:
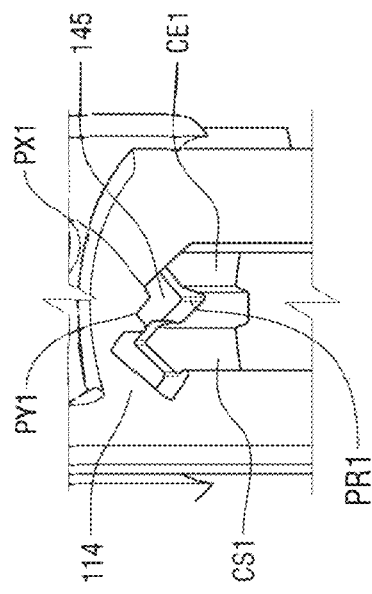

FIG. 35D shows a detailed cross-sectional view of the recess 145 to show the internal face of the sleeve 114 with certain positions of interest that will be described in the manual actuator operation section in the following paragraphs.

FIG. 35E shows in detail the geometry of the sleeve 114 with its main elements: the anti-rotation septum 122 and the security septum 120, the seal housings 121A and 121B, the ribs 115, the vertical guide 134 and the horizontal guide 125.

Figure 36C:
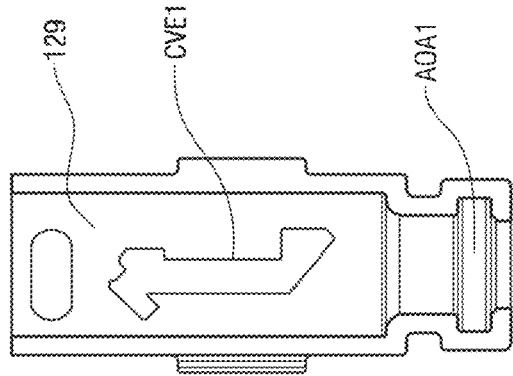
FIGS. 36A-36D show views of the modifications made to the manual actuator plunger.
Figure 36B:
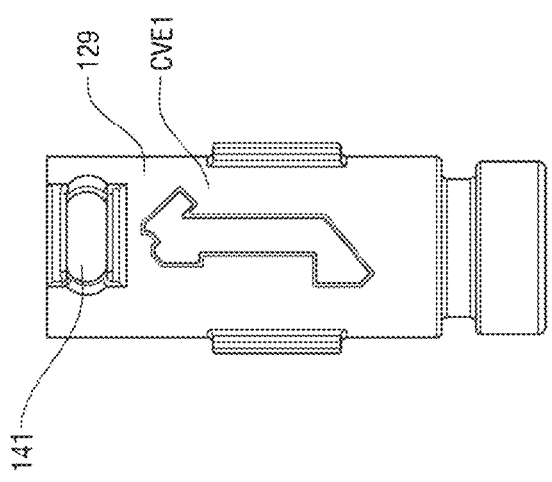
Figure 36D:
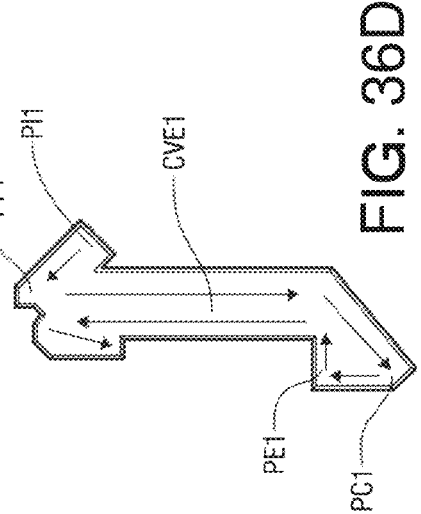
Figure 36A:
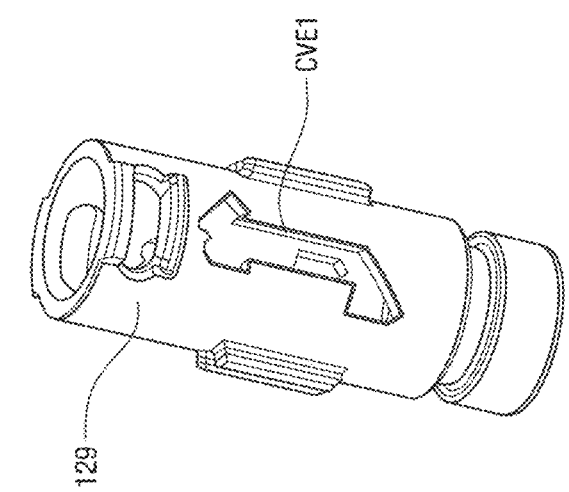

Modifications done to plunger 129 are shown in FIGS. 36A to 36C. FIG. 36A shows a perspective view of plunger 129 with two similar CVE1 channels on opposite sides thereof. FIG. 36B shows an external view of one side of the plunger 129 to appreciate the geometry of the CVE1 channel. FIG. 36C shows an internal view of the plunger 129 with the housing AOA1 where the O-ring 144 will be housed to seal the connection between the actuator 142 and the plunger 129. FIG. 36D shows a magnified view of the complete path of each of the two trackers 147 (see FIG. 37) within each channel CVE1 from an initial position PI1 to a final position PF1, passing through the middle positions PC1 and PE1 when the VBR valve actuator 142 is pressed in sequence and causing the VBR valve actions described below. FIG. 36E shows the indicator button 139 evidencing that the VBR valve 102 has already been opened.

Additional Parts for the Manual Actuator

Figure 37:
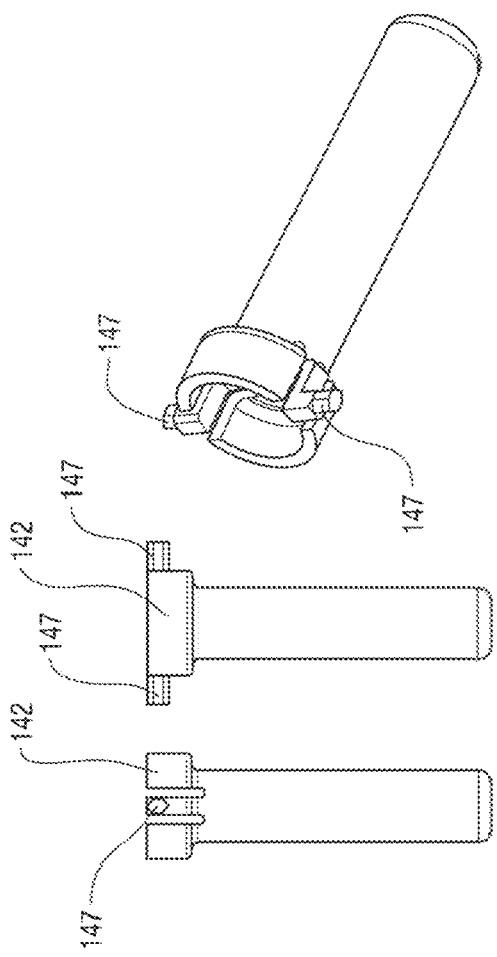
FIG. 37 shows a manual actuator.

An actuator 142 with trackers 147 is shown in FIG. 37.

Figure 38:
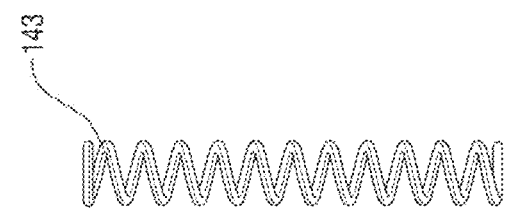
FIG. 38 shows the spring of the manual actuator.

FIG. 38 shows the spring 143 whose function will be to maintain the actuator 142 pressed against the plunger 129.

Figure 39:
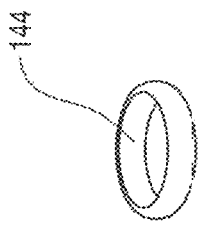
FIG. 39 shows the O-ring of the manual actuator.

FIG. 39 shows the O-ring 144 that will seal the connection between the actuator 142 and the plunger 129.

Figure 40A:
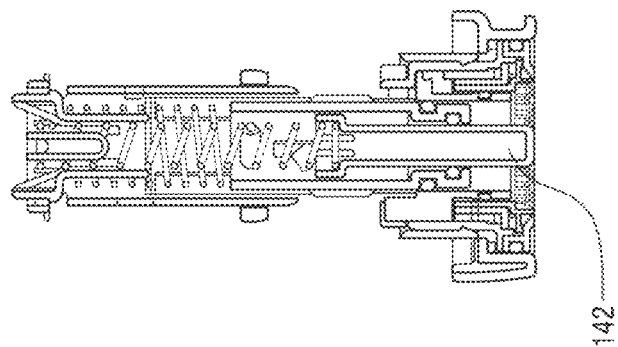
FIGS. 40A-40C show side views to visualize the internal portions of a VBR valve with a manual actuator in three different positions.
Figure 40B:
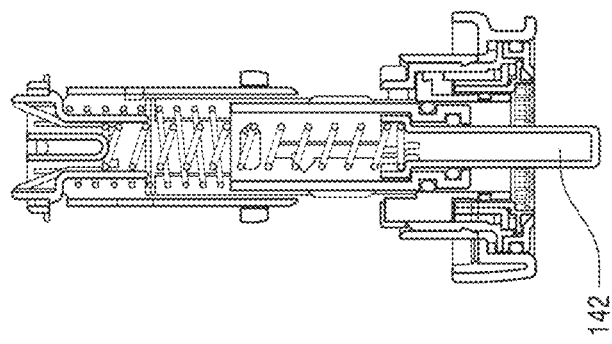
Figure 40C:
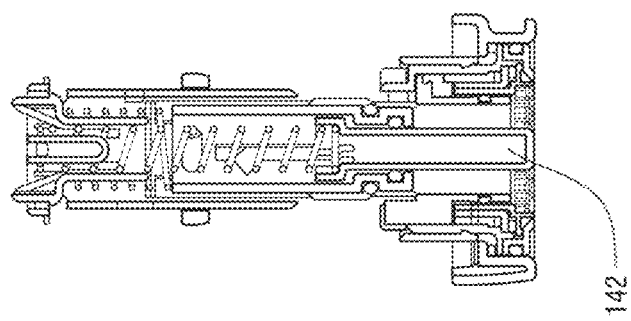

FIGS. 40A to 40C are cross-sectional views of the VBR valve 102 with the manual actuator 142 in 3 possible stationary positions: FIG. 40A shows the VBR valve 102 in the position before being actuated, with its actuator 142 hidden. FIG. 40B shows the VBR valve when it is operated to expose the actuator 142 outside the VBR valve 102. FIG. 40C shows the VBR valve 102 open with its actuator 142 hidden.

Operation

FIGS. 41A to 41D, show the VBR valve 102 is show in a partial vertical cross-sectional view which helps to explain its operation. The parts that are seen are the sleeve 114 and the security removal arrangement of the VBR valve.

To open the VBR valve 102, the following sequence needs to be carried out:

Press actuator 142 once to pull it out;
Press actuator 142 for a second time to open the VBR valve;
Press actuator 142 for a third time to close it after use.

It may occur that actuator 142 is pressed more times to try to open the VBR valve 102 after it has been closed, but this is prevented by the mechanism described in the following paragraphs.

FIG. 41A shows the VBR valve 102 in the closed position with its actuator 142 hidden, where it can be seen that the actuator 142 pushed by spring 143 cannot protrude from the VBR valve because its trackers 147 are resting on the PI point of the plunger 129 CVE channel.

When the VBR valve 102 needs to be opened, the actuator 142 is manually pressed once. FIG. 41B shows that, when pressed (action represented with arrow AM), the actuator 142 moves into the VBR valve 102, whereupon its trackers 147 move to the PF1 position of the plunger 129 CVE1 channel. The design of CVE1 channel forces trackers 147 to move diagonally from point PI1 to point PF1, thereby aligning trackers 147 with the vertical channel of CVE1 channel.

Once the actuator 142 is depressed, the trackers 147 no longer provide support to hold the actuator 142 inside the VBR valve 102, so the actuator 142 slides out of the VBR valve 102 pushed by the spring 143 (FIG. 41C), until the trackers 147 of actuator 142 reach the lower point PC of the CVE1 channel (FIG. 41D).

Figure 41F:
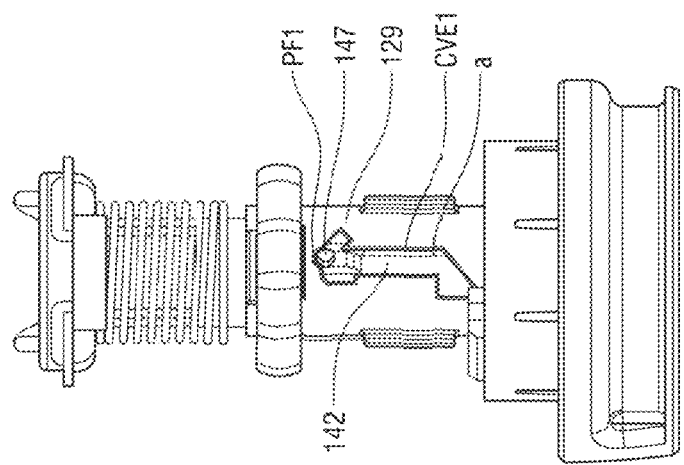
Figure 41E:
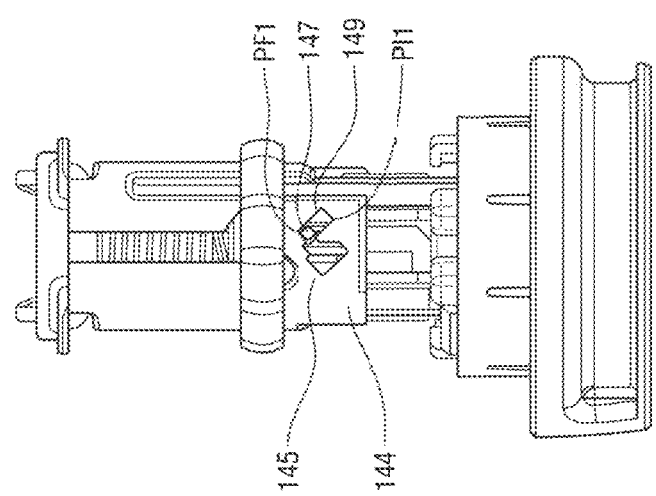

FIG. 41E shows that, when the tracker 147 collides with the slanted wall of the recess 145, slides along it driven by the user's manual pulse on the actuator 142, towards the point PF of the recess 145, where it stops and cannot move further into the VBR valve.

In FIG. 41F, sleeve 114 has been hidden to visualize the CVE1 channel of the plunger 129 and, upon reaching point PF1, the tracker 147 is aligned with the vertical portion a of the CVE1 channel.

Figure 42C:
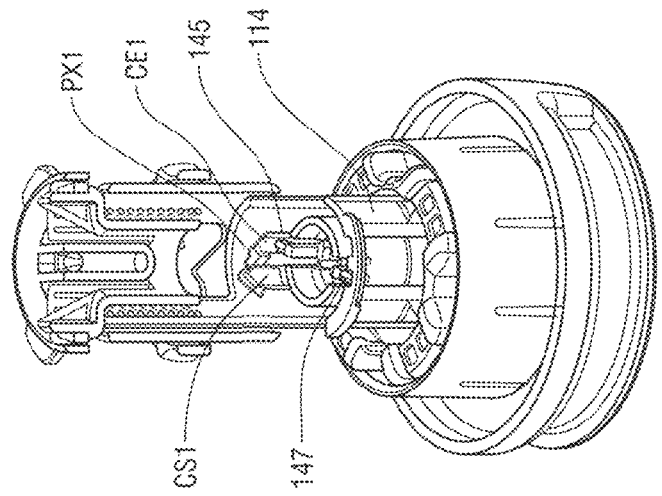
FIGS. 42A-42C show the second operation of the VBR valve with a manual actuator.
Figure 42B:
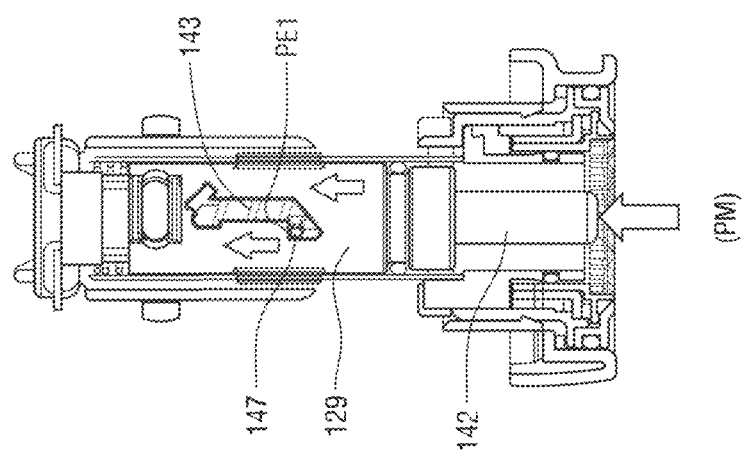
Figure 42A:
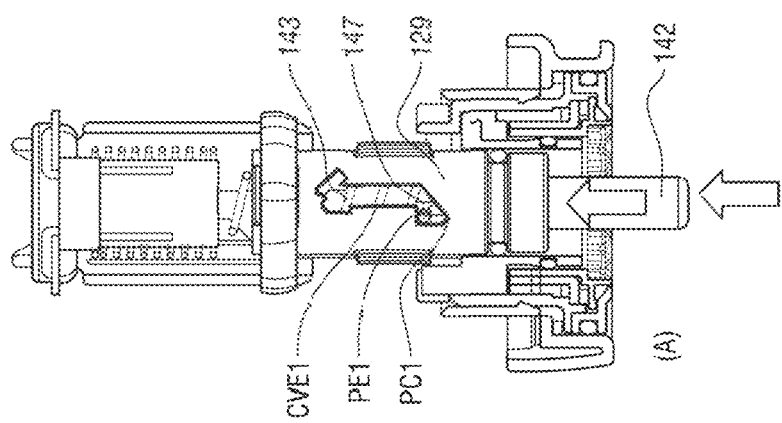

FIG. 42A shows that, due to the geometry of CVE1 channel, point PC1 is misaligned with respect to the vertical channel of CVE1 channel; therefore, when pressing the actuator 142 again, the trackers 147 of the actuator 142 will push the plunger 129 by pressing on the PE1 surface of the CVE1 channel of the plunger 129, transmitting the movement to the plunger 129 in an opening direction (FIG. 42B) until reaching its maximum opening point. FIG. 42C shows a perspective interior cross-sectional view of the sleeve 114 inside which the plunger 129 slides and, as mentioned above, the sleeve has a recess 145. The maximum movement limit of the actuator 142 occurs when the trackers 147 reach the PX1 point, after passing through the CS1 channel of recess 145, moving diagonally due the geometry of the recess 145 of sleeve 114.

FIG. 42C shows that CE1 channel allows the tracker 147 to move within it towards the recess 145 and, longitudinally within it, towards point PX1. CS1 and CE1 channels are necessary because the sleeve 114 bore is smaller than the diametral distance between trackers the 147. In this way, once trackers 147 reach the recess 145, they appear through it and are trapped by it to guide the actuator 142 with a movement that will be explained below.

Figure 43A:
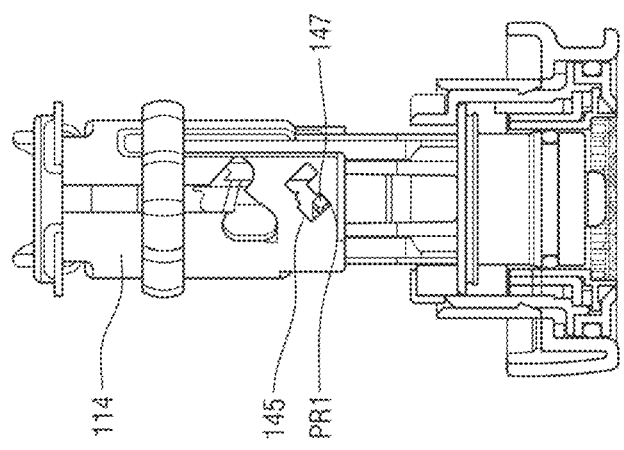
FIGS. 43A-43D continue the operation description of the VBR valve with a manual actuator.
Figure 43B:
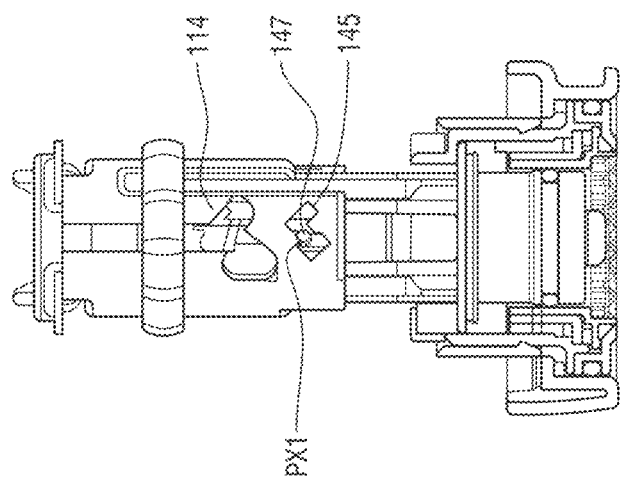

FIG. 43A shows the same arrangement as FIG. 42C where tracker 147 has reached the maximum PX1 point of the recess 145 of sleeve 114. FIG. 43B is an enlarged view of recess 145, and shows that to reach point PX1, tracker 147 rests on the slanted wall 149 of recess 145, which causes that when reaching point PX1, tracker 147 is moved horizontally with respect to the CE1 channel of the sleeve 114 moving longitudinally to reach the recess (see FIG. 35D).

Figure 43C:
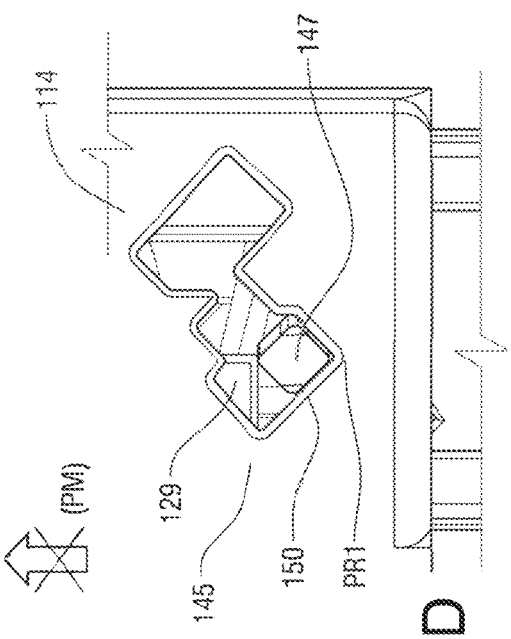
Figure 43D:
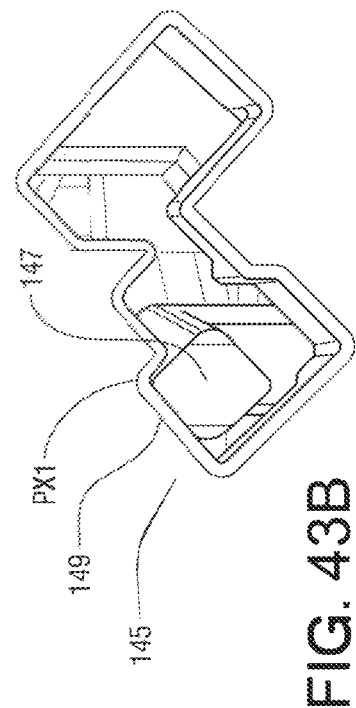

FIGS. 43C and 43D show that as soon as the user stops pressing on actuator 142, this moves vertically pushed by the spring 143, but tracker 147, being displaced horizontally with respect to the CE1 channel, can no longer return by it, but collides with the slanted wall 150 of recess 145 being directed only from point PX1 to point PR1 of recess 145. FIG. 43D shows that the tracker is held at point PR1, keeping the actuator 142 hidden, and the actuator this in turn holding the plunger 129 in the open position.

Figure 44D:
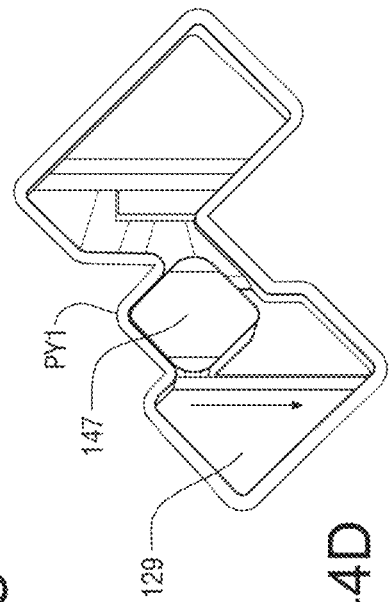
FIG. 44D shows the closing movement of the plunger during the third operation of the VBR valve with a manual actuator.
Figure 44C:
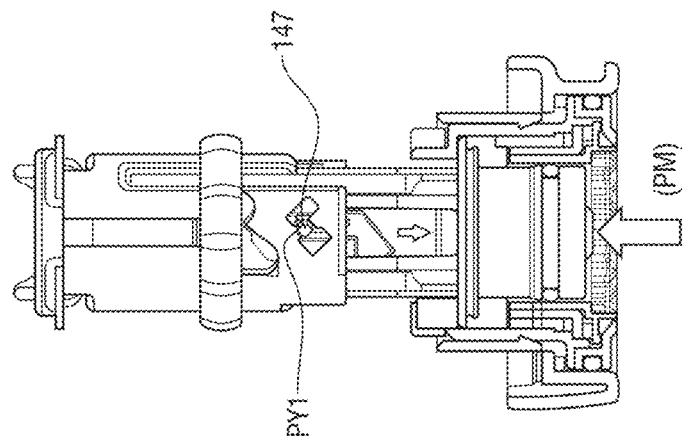
FIG. 44C shows the effect of the third operation.
Figure 44B:
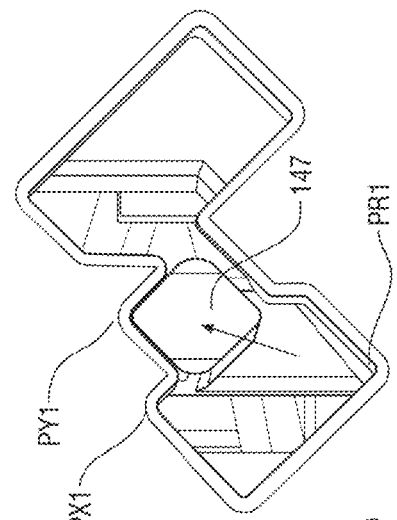
FIG. 44B shows a detail of the movement within the recess when performing the third operation.
Figure 44A:
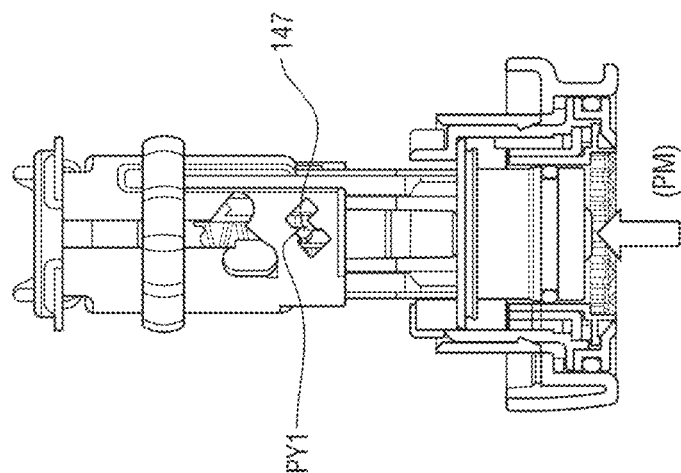
FIG. 44A shows the effect of operating the VBR valve with a manual actuator for the third time.

FIGS. 44A to 44D show the effect produced by pressing again on the actuator 142, after the tracker 147 has reached the PR1 position. From point PR1, the geometry of the recess 145 of sleeve 114 will force the tracker 147 to move diagonally towards point PY1 of recess 145 (FIGS. 44A and 44B). The effect produced will be a rotation of actuator 142, as shown in the enlarged view of this movement in FIG. 44B, which will stop holding plunger 129 after stopping pressure on its surface PE1 (see FIG. 42). Therefore, plunger 129 pushed by spring 130 will be directed to the closed position, as seen in FIG. 44C, and in the enlarged view of FIG. 44D (it is partially seen how plunger 129 slides appearing through recess 145). With this last action, VBR valve 102 will remain closed and its actuator 142 hidden inside.

Figure 45A:
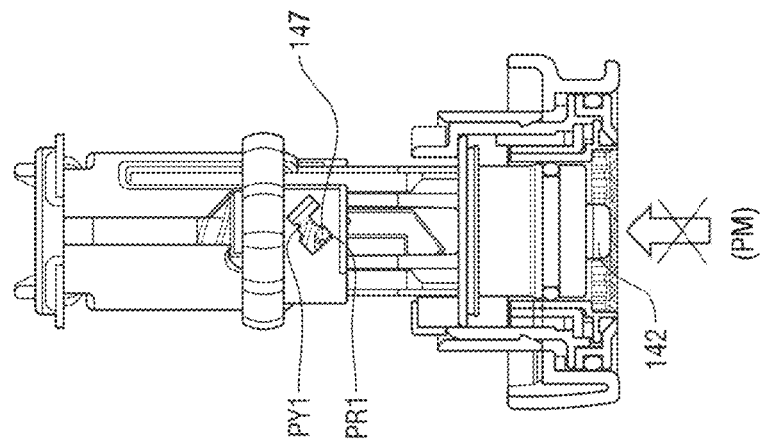
FIGS. 45A and 45B show the effect of attempting to open the VBR valve with a manual actuator for a second time.
Figure 45B:
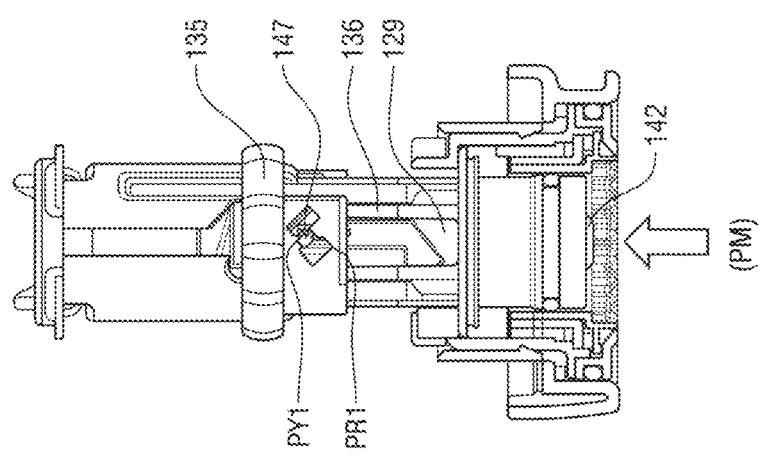
Figure 46A:
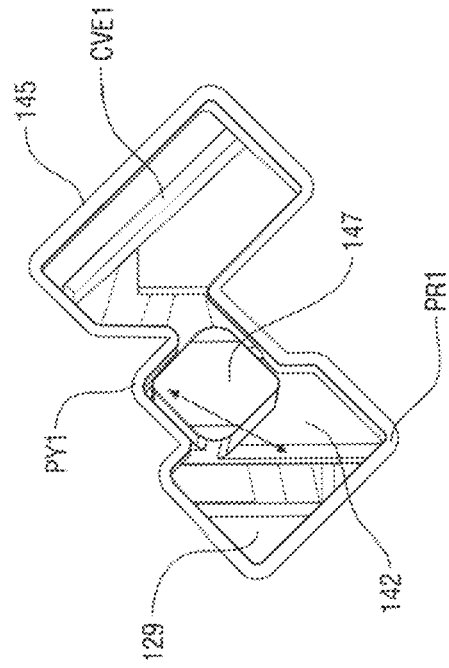
FIGS. 46A-46S show a detailed view of the movement made by the manual actuator tracker when attempting to open the VBR valve for a second time.
Figure 46B:
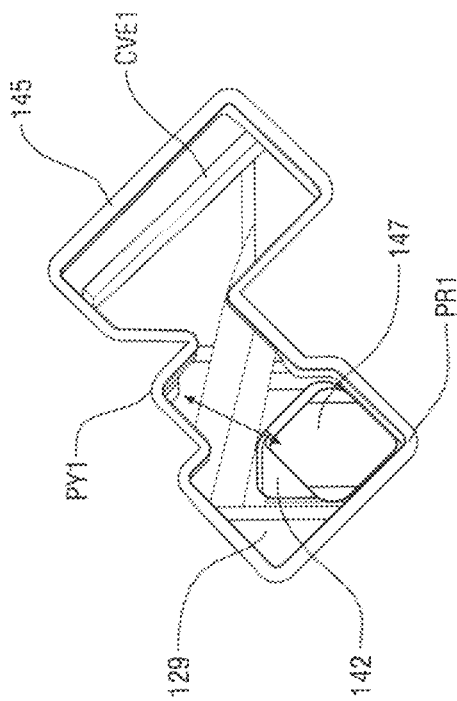
FIG. 46B shows tracker position when the manual actuator is pressed.
Figure 46D:
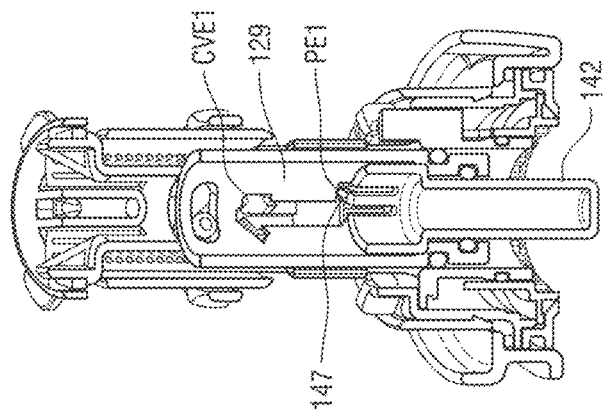
FIGS. 46C and 46D show additional views of the two channels in which the actuator trackers move simultaneously.

As shown in FIGS. 45A and 45B, when actuator 142 is pressed again, trackers 147, being trapped in the recess 145, will not allow the actuator 142 to leave its position, and actuator movement will be limited to the trackers movement from point PR1 to point PY1, as shown in the enlarged views of the recess 145 of FIGS. 46A and 46B. FIG. 46A shows tracker 147 in the resting position PR, FIG. 46B shows tracker 147 when actuator 142 is pressed for a third time. The only possible movement for actuator 142 in this condition is to move as allowed by its tracker 147 up to point PY1, whereby actuator 142 can no longer leave the hidden position, and remains inside the VBR valve.

Figure 46C:
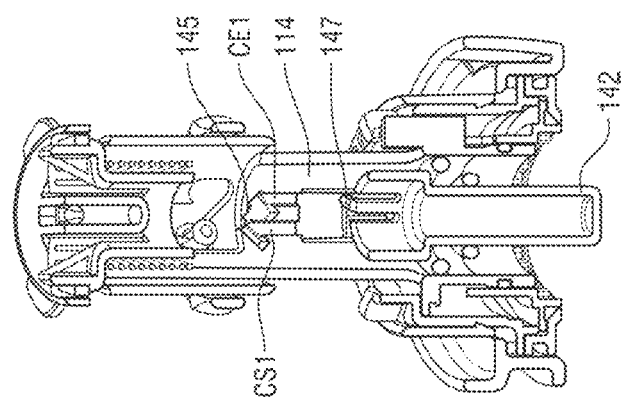

FIGS. 46C (plunger 129 hidden) and 46D (showing plunger 129) present the two channels within which both trackers 147 move simultaneously (only one of them is shown). Recess 145 of sleeve 114 serves as a retention and path limit function for trackers 147 of actuator 142. The CVE1 channel of plunger 129 has the function of allowing the passage of each tracker 147 to move within recess 145 of sleeve 114 and serves as a support point for actuator 142 to keep the VBR valve open by tracker 147 when resting on the PE1 surface of CVE1 channel.

Figure 46F:
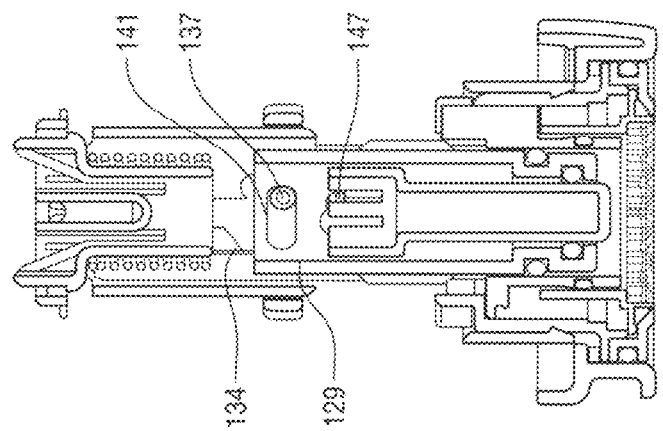
FIGS. 46E and 46F show the action of the security ring when closing the VBR valve with a manual actuator.
Figure 46E:
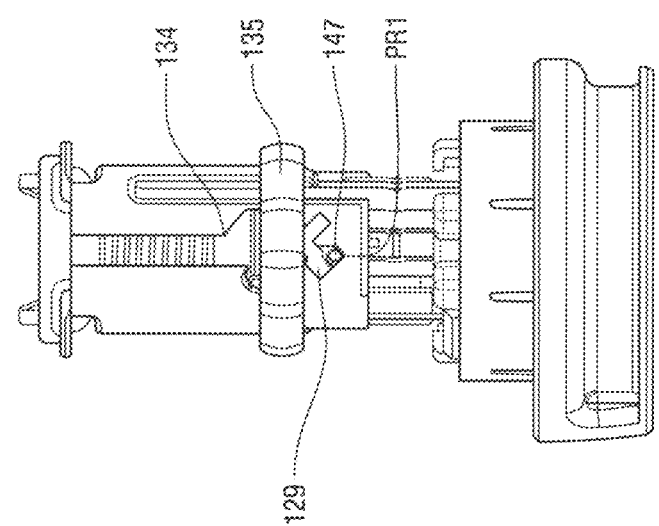

FIG. 46E is a side view of the VBR valve with a manual actuator and FIG. 46F shows a longitudinal cross-sectional view of the same. When the VBR valve closes, bolts 137 of security ring 135 will be directed towards point PD1 of channel 134, where they will be housed. This axial movement of plunger 129 will again bring the tracker 147 of actuator 142 to the point PR1 of recess 145.

Figure 46H:
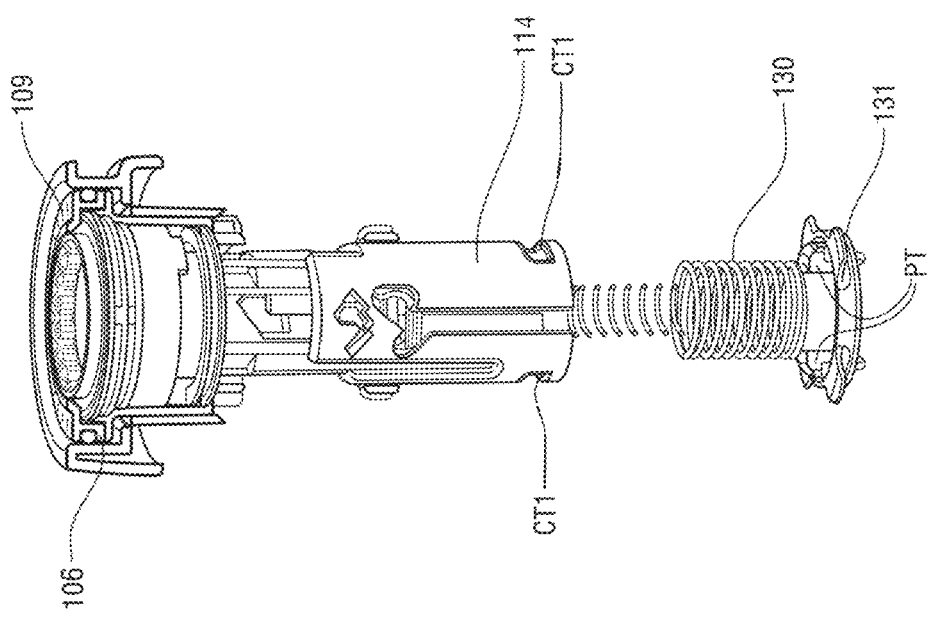
FIG. 46H shows a view of the position of the internal spring stops.
Figure 46G:
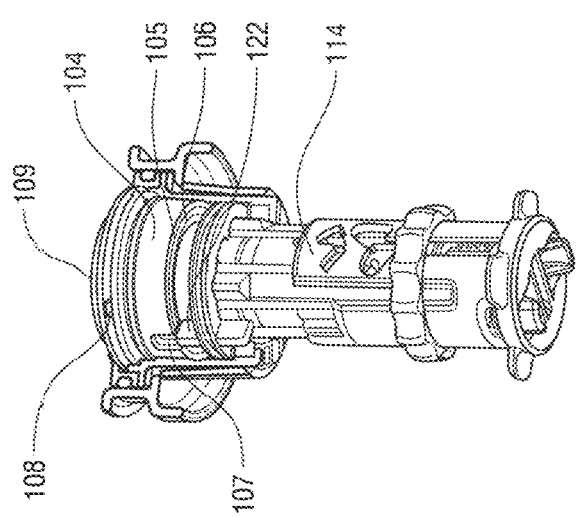
FIG. 46G shows the key system associated to the VBR valve with a manual actuator.

FIG. 46G shows that the key system necessary to remove the VBR valve is the same as already described for the implementation with an automatic actuator, and that it is based on rotating the key disks 104, 105, 106 according to their manufacturing code so as to align "key" slots 107 through the steps 108 of each disk, and thus allowing sleeve 114 to move when pulled outwards. It is observed that in the embodiment with manual actuator the liquid outlet system is the portion that distinguish it with respect to the embodiment with an automatic actuator.

Description of the Security System of VBR Valves with a Manual Actuator

FIG. 46H shows that the key box 106 has a lid 109 welded to it, where the key box 106 has the function of spacing the disks correctly and isolating them from contact with the environment, thereby preventing the entry of water and hiding the mechanism.

FIG. 46H shows that the manual actuator 142 slides inside the plunger 129 and is held in position by the expansion force of the internal spring 143, which is supported on its rear portion by the spring stop 131. This stop 131 is assembled on the sleeve 114 by means of two tabs PT1 in two housings CT1. This means that the force exerted on the actuator 142 is ultimately supported by the sleeve 114.

Figure 46J:
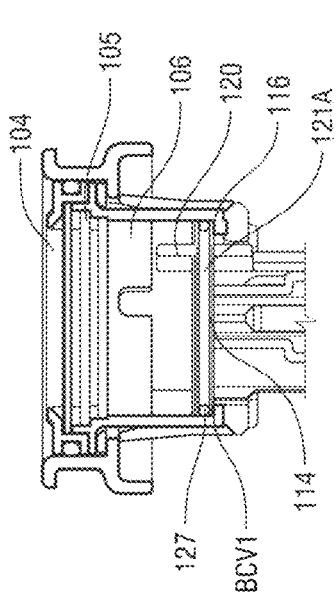
FIG. 46J shows how the sleeve is connected to the key box.
Figure 46K:
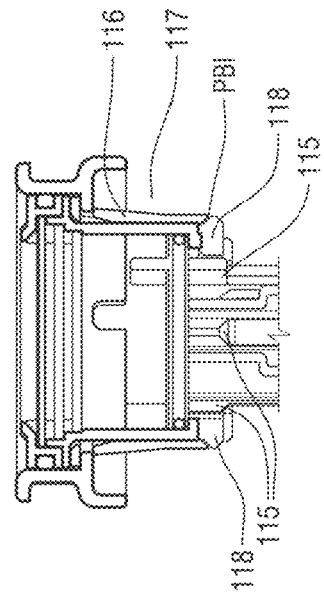
FIG. 46K shows how the key disks lock the axial movement of the sleeve.
Figure 46I:
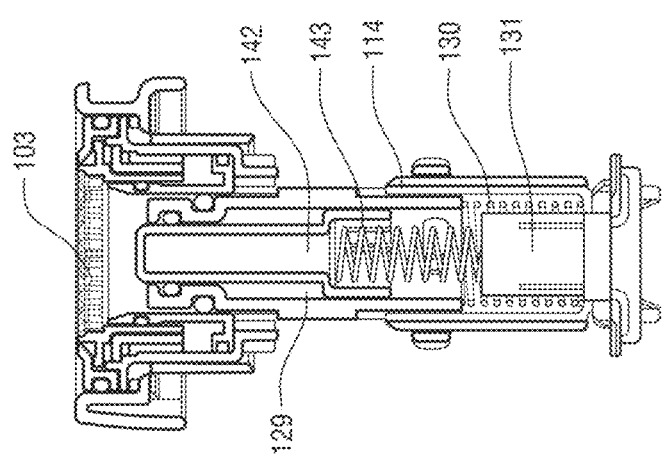
FIG. 46I shows the elements that keep the sleeve in position while the user performs the button operation actions.

FIG. 46I shows the abovementioned elements that keep the sleeve 114 in position while the user performs the operations of actuating the button 142.

FIG. 46J shows the sleeve 114 linked to the key box 116 passing inside it, and having axial movements limited inwardly by the base BCV1 of key box 116 that collides with the housing 121A of the O-ring 127 of sleeve 114, and outwardly by key disks 104, 105, and 106 that lock the axial movement of the locking septum 120 of sleeve 114.

In FIG. 46K it can be seen that, in the same way as in the embodiment of the VBR valve with an automatic actuator, the key disks 104, 105, and 106 will lock the axial movement of sleeve 114 to maintain the septa 115 of sleeve 114 pushing the locks 118 radially outwards, and these in turn lock the axial movement of the basket 117 with respect to key box 116 due to diametral interference at point PBI1.

Figure 46N:
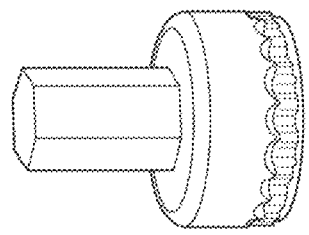
FIG. 46N shows how to unlock the locked VBR valve.
Figure 46O:
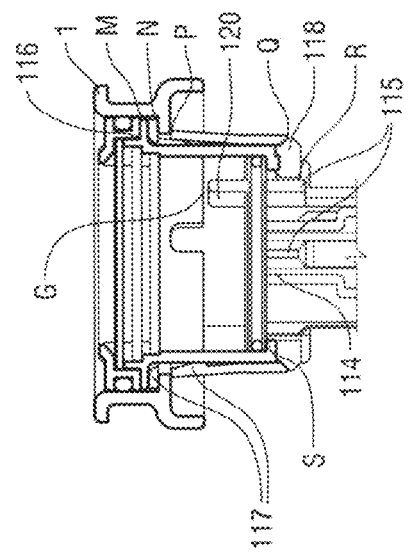
FIG. 46O shows the tool for unlocking the VBR valve.
Figure 46L:
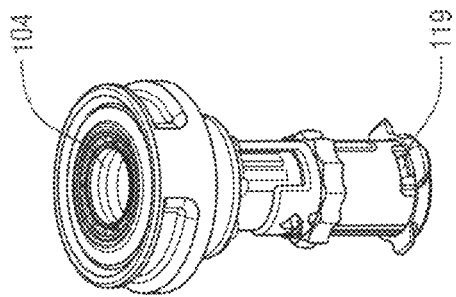
FIG. 46L shows the basket in a locked position.

FIG. 46L shows that the consequence of the basket 117 being axially locked is that the tapered walls of the key box 116 push the lips L1 of the basket 117 radially outwards, this action causing the lips L1 to interfere at points PBS1 with the bottle collar 1 on the surface 13, and with the locks 118 at point PBI1 preventing the basket 117 from leaving the VBR valve 102.

Figure 46M:
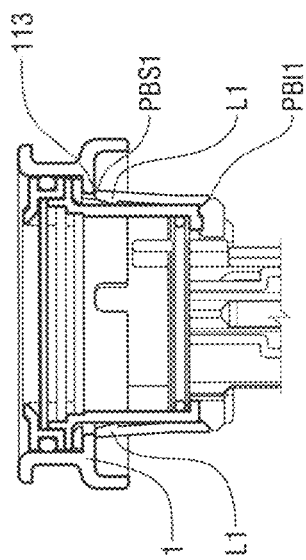
FIG. 46M shows a locked VBR valve.

FIG. 46M shows the VBR valve in a locked position, where:
a.—The key box 116 rests on the basket 117 at point A;
b.—The basket 117 rests on the bottle collar 1 at point B;
c.—The basket 117 interacts with the bottle collar 1 at point C;
d.—The basket 117 interacts with the locks 118 at point D;
e.—The locks 118 are pushed by the ribs 115 of sleeve 114 at point E;
f.—The sleeve 114 rests on the key box base 116 at point F;
g.—The septum 20 of sleeve 114 abuts key disks 104, 105, and 106 at point G;
h.—The key disks 104, 105, and 106 are enclosed in key box 16.

Disassembly of a VBR Valve with a Manual Actuator

FIG. 46N shows that there is only one way to unlock this mechanism and allow the VBR valve 102 to be removed from the container. The only parts that can be accessed from outside the container are the keys, and more precisely the only thing that can be done is to rotate key disk 104. For doing this, the machine that disassembles the VBR valve 102 has a tool like the one shown in FIG. 46O. This tool is operated by a machine and acts on the key disk 104 by rotating it to the right and left according to the designated code and with it the two key disks 105 and 106, aligning the slots 107 of the three key disks with the locking septum 120 of sleeve 114, as also described for the VBR valve with an automatic actuator.

In the same way as the valve with an automatic actuator, the security VBR valve 102 with a manual actuator comprises a series of cylinders 103 having a single position at which the VBR valve 102 can be removed. The process is shown in detail in FIG. 46P as a succession of movements to be carried out by the machine. To ensure the security of the system, the alignment of the slots 107 is not visible from the outside.
a.—Slots 107 of the key disks 104, 105, and 106 are axially aligned with the security septum 120 of sleeve 114 to unlock the VBR valve.
b.—Sleeve 114 is pulled outwards until the security septum 120 enters the cavity 107.
c.—Step b causes the ribs 115 of sleeve 114 to stop pushing the locks 118 axially outward.
d.—When performing step c and continuing the step b, the locks 118 move radially towards the center of the VBR valve pushed by the basket 117 and stop interacting with the basket 117, sliding axially inside it, dragged for the sleeve 114.
e.—The key box 116 carrying the locks 118 housed in it move axially towards the exterior along with the sleeve 114.
f.—When the key box 116 comes out, it stops pushing radially on the lips L1 of basket 117 with its outer tapered faces.
g.—This in turn allows the lips L1 to return to their original position, no longer interacting with the bottle collar 1.
h.—The basket 117 can come out of the bottle collar, whereby only the collar 1 welded to the bottle remains inside it, as shown in FIG. 46Q.

Figure 46R:
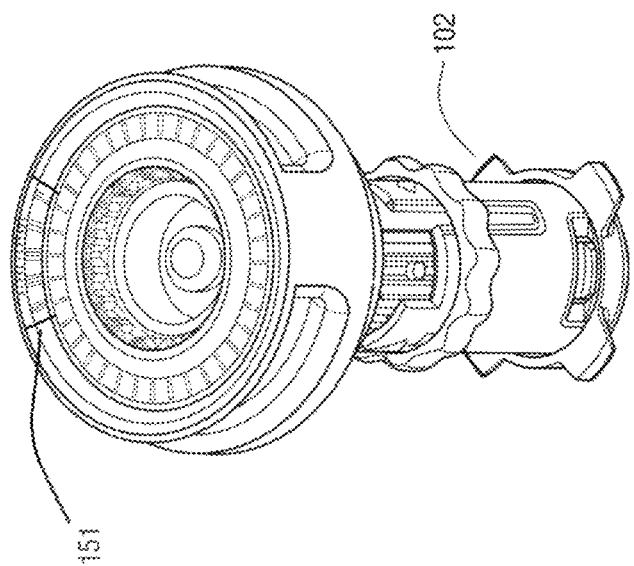
Figure 46Q:
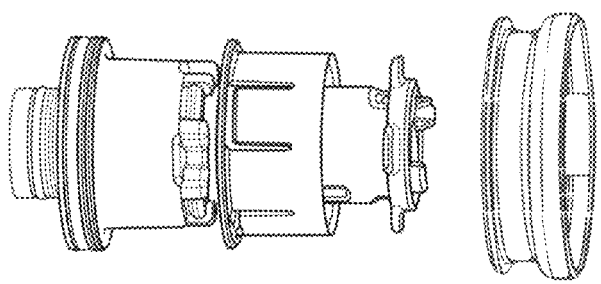
FIG. 46Q shows a disassembled VBR valve.
Figure 46P:
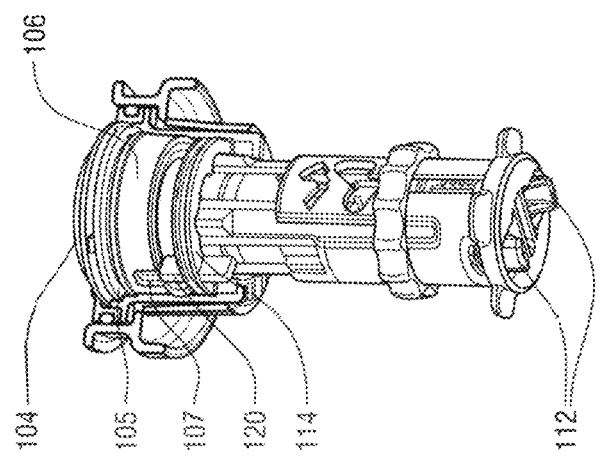
FIG. 46P shows the movements by the machine to unlock the VBR valve.
Figure 46S:
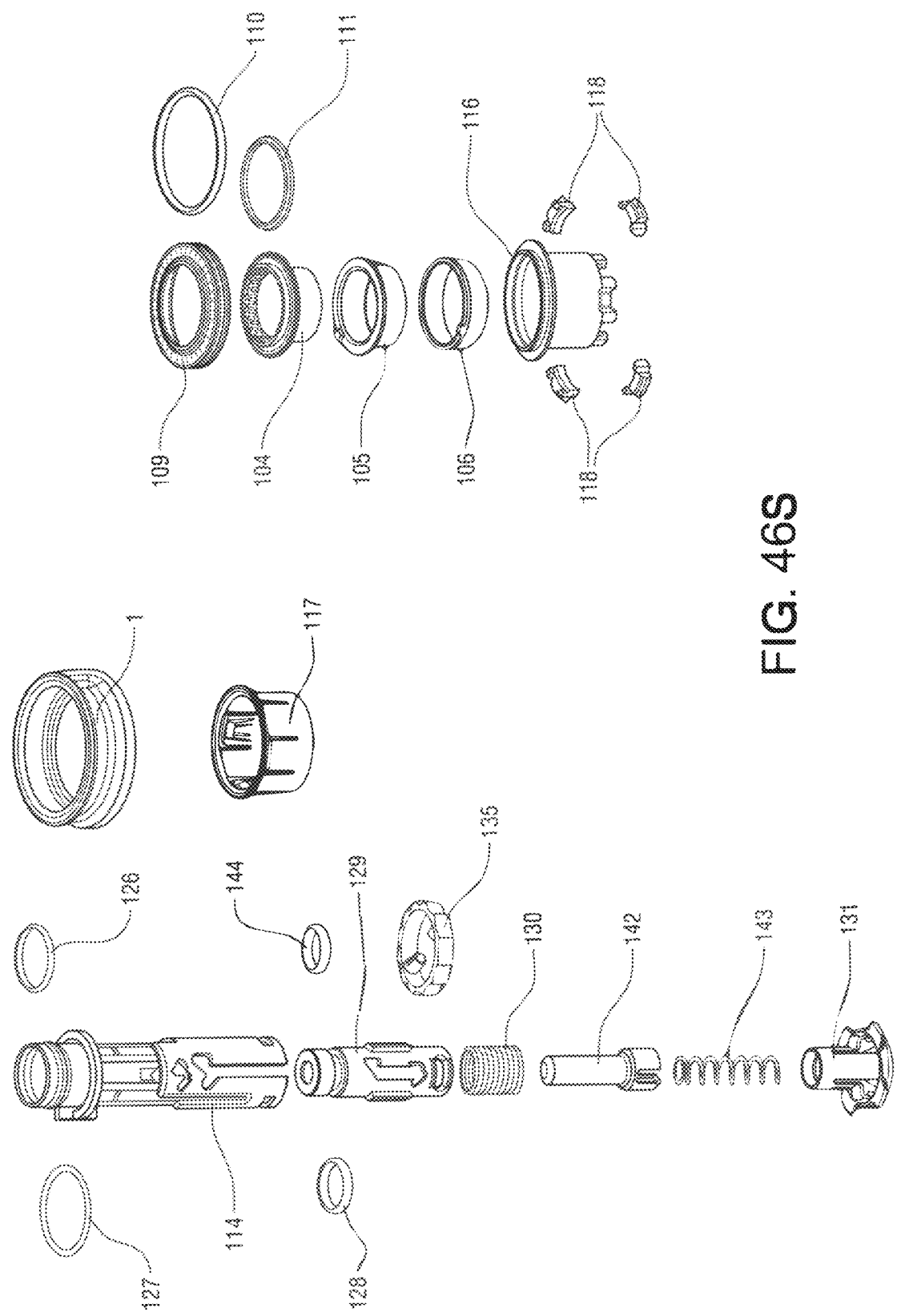
Figure 47C:
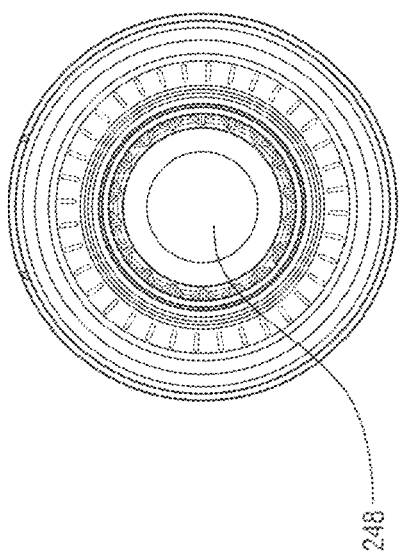
FIGS. 47A to 47D are views of a VBR valve without an actuator, where the part that replaces the sleeve can be seen.
Figure 47D:
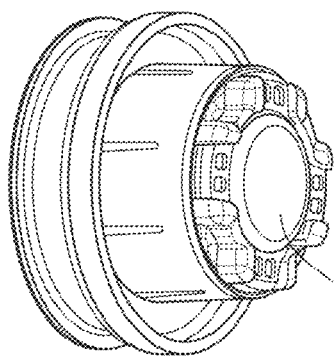
Figure 47A:
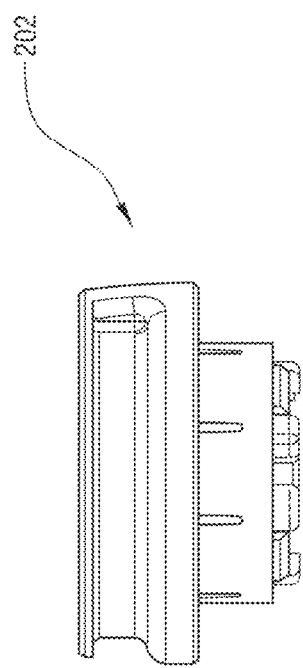
Figure 47B:
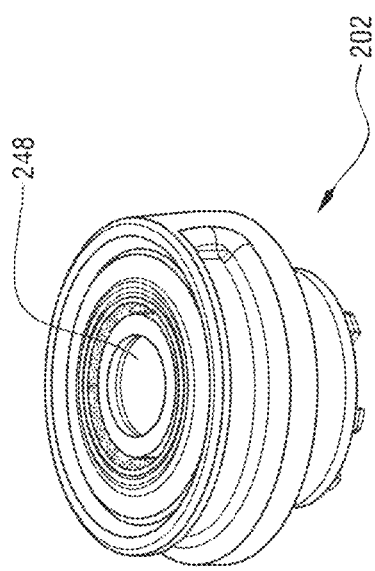

FIGS. 46R and 46S are perspective and exploded views, respectively, of the VBR valve with a manual actuator 102 presenting on its outer surface a first embodiment of the security code 151 in the form of a barcode that is stored in a computer system, which must be queried to obtain the key that opens the bottle, since this key is inaccessible and encrypted. In this version of the valve, the query is also done by the customer's removing machine, which reads the encrypted key in the barcode or in the two-dimensional QR code by using an optical reader arranged for such purpose and comparing the result with the code database stored on a computer system server arranged for such purpose. In an alternative embodiment, the opening code may be a two-dimensional code of the QR type.

VBR Valve without an Actuator

The VBR valve without an actuator was designed for drums, that is, bottles, which typically contain 10, 12, or 20 liters of water. However, this valve can also be applied as an alternative embodiment in the typical 200-liter metal sheet oil drums. In the case that the VBR valve requirements are for maximum security regarding the use of the container contents, the possibility of using the security VBR valve as a coded lid is provided. In the different views of FIG. 47, it is shown that the key system is the same as that described above, where the sleeve is replaced by the central part 248 as shown in FIG. 47.

The components involved in the mechanism securing a VBR valve without an actuator 202 inside the bottle and preventing its disassembly comprise the bottle collar 1, the position locks 218, a central part 248, and its septa 215, the key box 216, and the locking basket 217.

The central part 248 is the moving portion that runs longitudinally to push the position locks 218 outwards with their septa 215 when the VBR valve 202 is inside the bottle.

The VBR valve 202 itself must be removed from the bottle to utilize its contents, so that the customer can use the contents of the bottle only when they have an access code, for example, for chemicals, oils, fuels, in which the customer is, for example, a vendor or a factory, but it is not intended for home distribution or administrative offices.

The central part 248 fulfills the same function as the sleeve 14 with respect to the key system for its removal. Its peculiarity is that it is a blind part, and its function is to prevent flowing out of the contents of the container.

FIG. 48 is a cross-sectional view where the PEXT recess stands out, the function of which being allowing the central part 248 to be taken to remove the VBR valve thereby enabling access to the container contents once the correct keys of the container VBR valve 202 have been entered.

FIGS. 49A and 49B are a side and a bottom view of the central part 248. They show that the referenced portions are the same as for sleeve 14, and this allows the central part to fulfill the same functions as the sleeve 14 with respect to the key box, the security lock actuators, and its O-ring system for achieving the system sealing.

Figure 50:
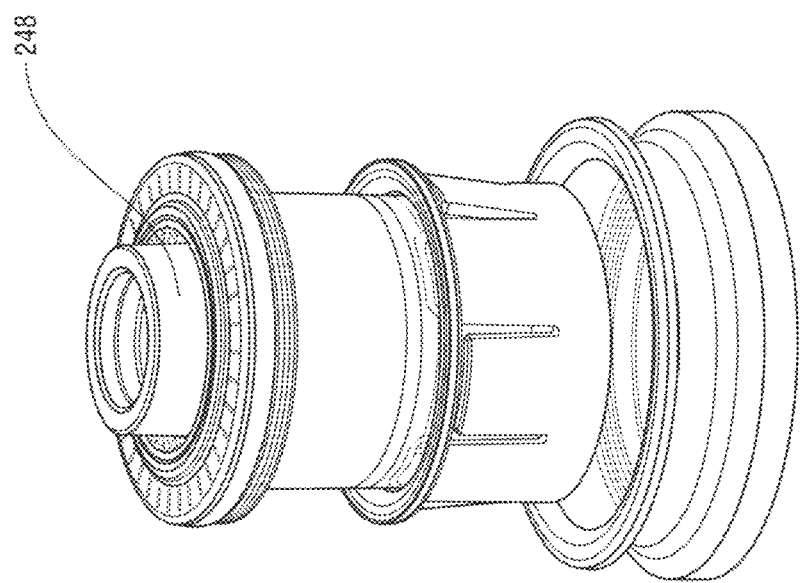
FIG. 50 is a perspective view of a VBR valve without an actuator.

FIG. 50 shows a perspective view of a VBR valve without an actuator.

Figure 51:
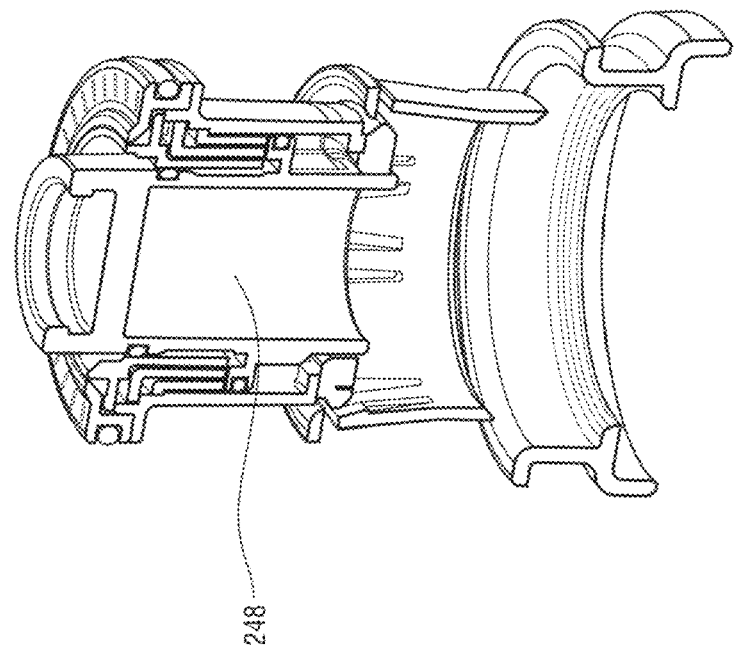
FIG. 51 is a perspective view of a longitudinal section of a VBR valve without an actuator.

FIG. 51 shows a perspective longitudinal cross-sectional view of the VBR valve without an actuator.

Figure 52:
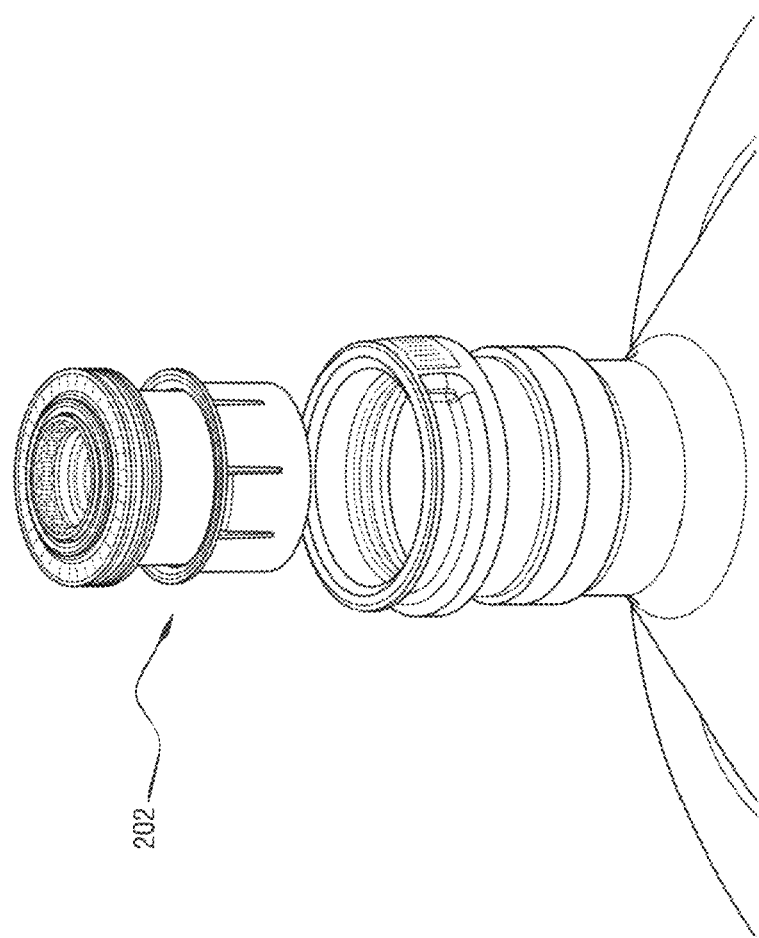
FIG. 52 shows a VBR valve without an actuator entering a bottle.

FIG. 52 shows a bottle with its collar in place and the VBR valve removed from the bottle to access the contents of the container.

Description of the Security System of a VBR Valve without an Actuator

Figure 53:
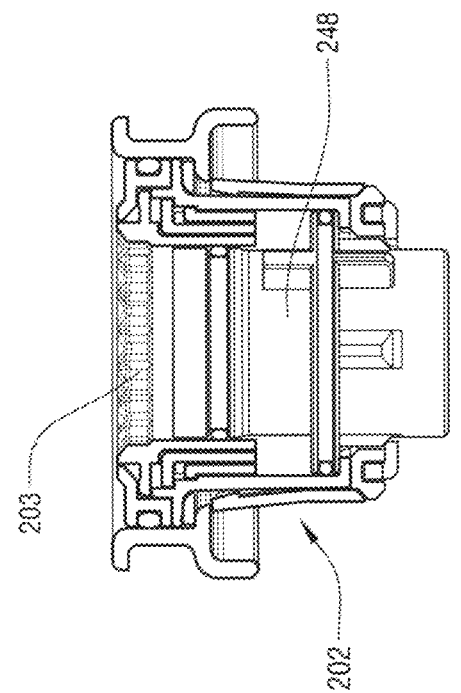
FIG. 53 shows the removal of a VBR valve without an actuator.

According to FIG. 53, the central part 248 fulfills the function of removing the VBR valve 202 from the bottle collar 1 and thus releasing the liquid from the container. If the VBR valve without an actuator 202 is not removed, the contents of the bottle cannot be accessed.

Figure 54:
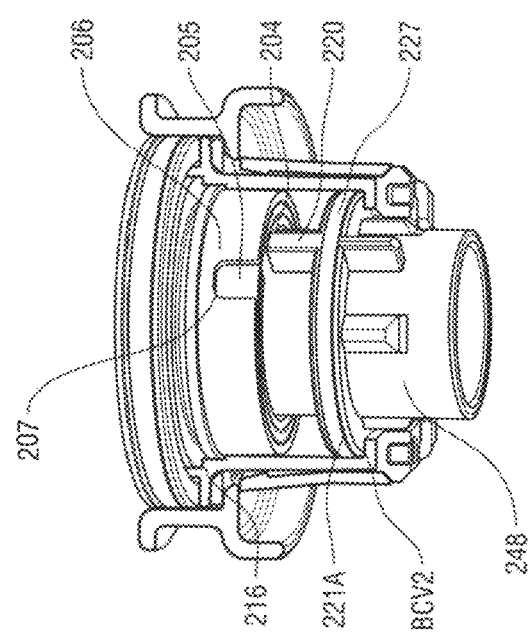
FIG. 54 shows the connection of the key box to the other parts of a VBR valve without an actuator.

FIG. 54 shows that in the VBR valve without an actuator 202, the central part 248 is connected to the key box 216, passes through it and has axial movements limited inwardly by the base BCV2 of key box 216 which collides with housing 221A of the O-ring 227, and outwardly by the key disks 204, 205, and 206 that lock the axial movement of the central part 248 locking septum 220.

Figure 55:
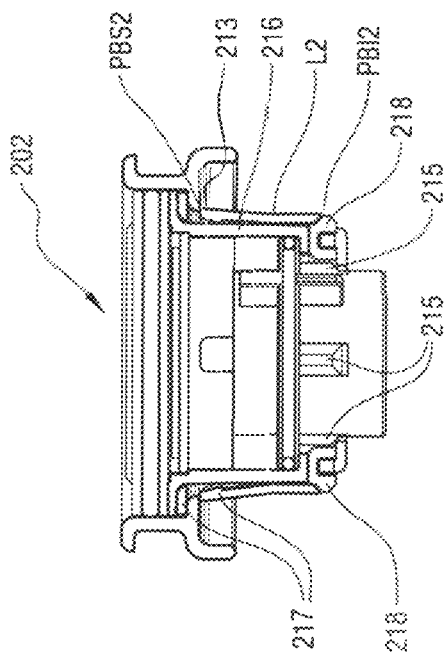
FIG. 55 shows how the key disks lock a VBR valve without an actuator.

FIG. 55 shows that the key disks 204, 205, and 206 lock the axial movement of the central part 248 to maintain the septa 215 of the central part 248 radially pushing the locks 218 outwards, so that these in turn lock the axial movement of the basket 217 with respect to the key box 16 due to diametral interference at point PBI2. The consequence of the basket 217 being locked is that the tapered walls of the key box 216 radially push the lips L2 of the basket 217 outwards, this action causing the lips L2 to move away from the center and axially interfering at point PBS2 with the bottle collar 1 on the surface 213, which prevents the basket 217 from coming out from the VBR valve.

Figure 56:
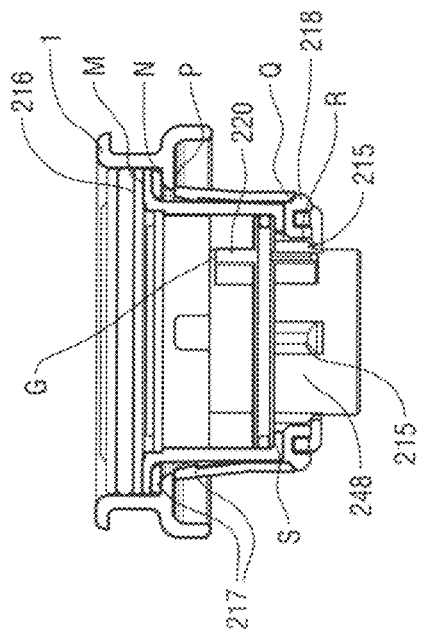
FIG. 56 shows how a VBR valve without an actuator remains locked.

As can be seen in FIG. 56, the entire system is locked:
a.—The key box 216 is supported on the basket 217 at point M.
b.—The basket 217 rests on the bottle collar 1 at point N;
c.—The basket 217 interacts with the bottle collar 1 at point P;
d.—The basket 217 interacts with the locks 218 at point Q;
e.—The locks 218 are pushed by the ribs 215 of central part 248 at point R;
f.—The central part 248 rests on the key box base 216 at point S;
g.—The septum 220 of central part 248 abuts the key disks 204, 205, and 206 at point G;
h.—The key disks 204, 205, and 206 are enclosed by key box 216.

Removal of the VBR Valve without an Actuator

Figure 57:
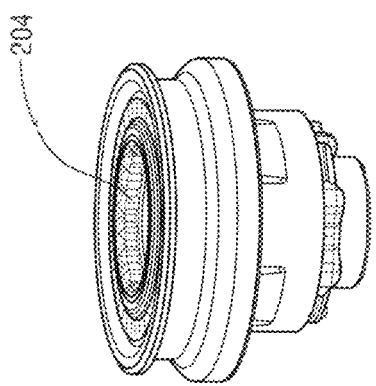
FIG. 57 shows how to unlock a VBR valve without an actuator.

FIG. 57 shows that there is only one way to unlock the VBR valve without an actuator 202 and allow it to be removed from the container. For security reasons, only the key disks can be accessed from the container exterior, and more precisely only the key disk 204 can be rotated. The way to do it is using a tool like the one shown in FIG. 58A. This tool is operated by a machine and acts on the key disk 204. The machine rotates the key disk 204 to the right and left according to the corresponding code and drags the two key disks 205 and 206 according to the corresponding code by aligning the slots 207 of the three key disks with the septum 220 of the central part 248. For security, the slots alignment is not visible from the exterior.

Figure 58B:
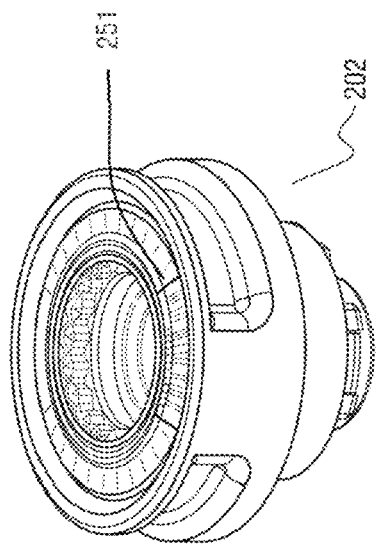
FIG. 58B shows the code etched on the lid of a VBR valve without an actuator.
Figure 58A:
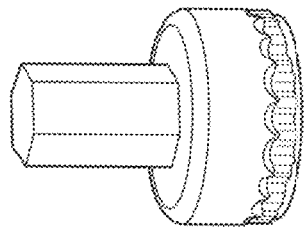
FIG. 58A shows the tool to unlock the VBR valve without an actuator.

FIG. 58B is a perspective view of a valve without an actuator that shows on its outer surface a first embodiment of the security code 251 in the form of a barcode that is stored in a computer system, which must be queried to obtain the key that opens the bottle since this key is inaccessible and encrypted. In this embodiment of the valve, the query is also done by the customer's removing machine by reading the encrypted key in the barcode or in the two-dimensional QR code using an optical reader arranged for such purpose and comparing the result with the code database stored on a computer system server arranged for such purpose. In an alternative embodiment, the opening code may be a two-dimensional code of the QR type.

Figure 60:
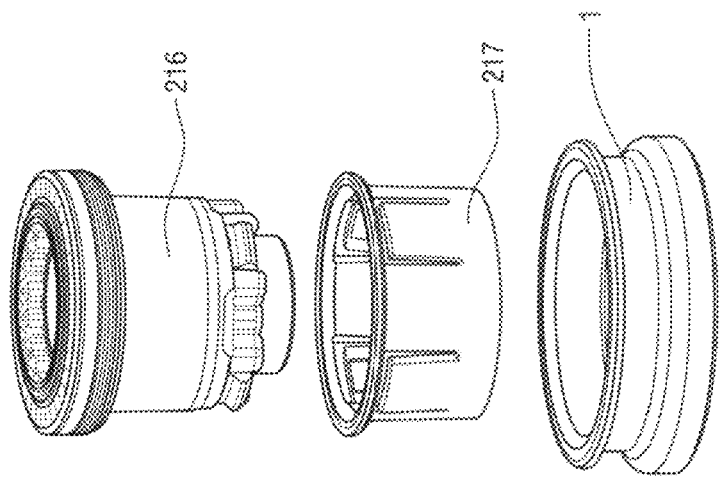
FIG. 60 shows the VBR valve without an actuator coming out of the bottle.
Figure 59:
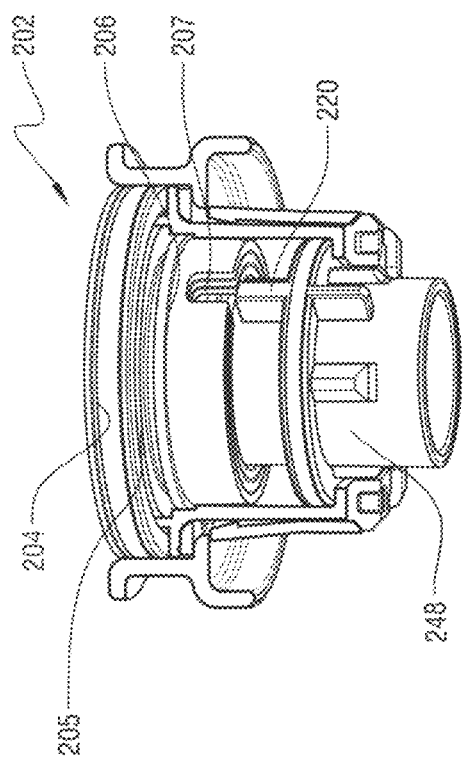
FIG. 59 shows the unlocking procedure in a VBR valve without an actuator.

The process described as a succession of movements is as follows (see FIG. 59):
a.—The slots 207 of the key disks 204, 205, and 206 are aligned with the security septum 220 of central part 248 by rotating the key disk 204 in the appropriate direction, left or right according to the assigned code.
b.—The central part 248 is pulled axially outwards so that the locking septum 220 can enter the slot 207 of key disks 204, 205, and 206.
c.—Step b causes the septa 215 of the central part 248 to stop pushing the locks 218 radially outwards.
d.—When performing step c and continuing the step b, the locks 218 can now move radially towards the center of the VBR valve 202, driven by the basket 217 on the tapered profile of locks 218, so they stop interacting with the basket 217 by sliding inside it.
e.—Then, the key box 216, carrying the locks 218 housed therein, moves outwards pulled by the central part 248.
f.—When the key box 216 comes out, it stops pushing radially on the lips L2 of basket 217 with its outer tapered faces.
g.—This in turn allows the lips L2 to return to their original position, no longer interacting with bottle collar 1.
h.—Therefore, basket 217 can also come out of the bottle collar (see FIG. 60).
i.—Only collar 1 welded to the basket remains inside the bottle.

Figure 61:
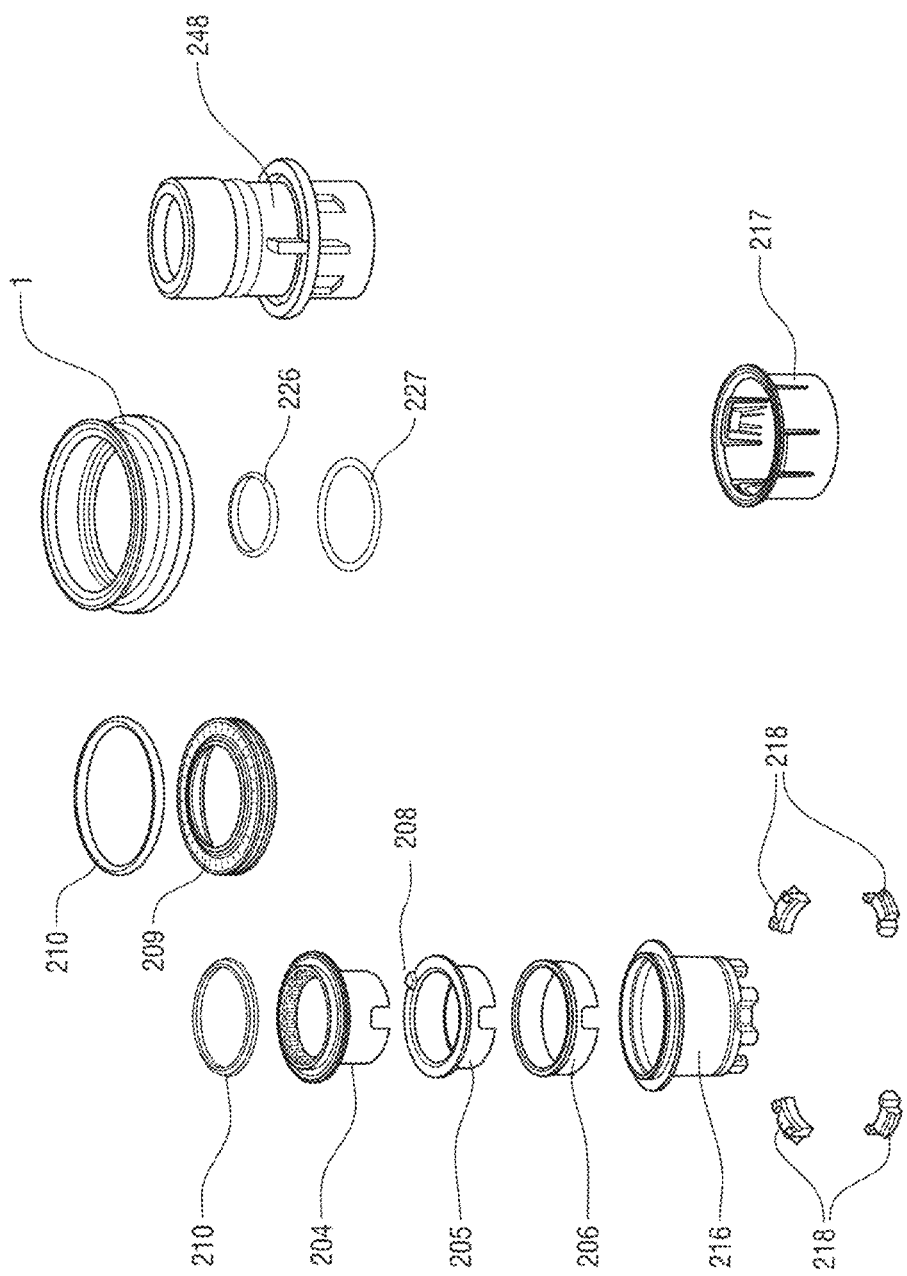
FIG. 61 is an exploded view of a VBR valve without an actuator.

FIG. 61 shows an exploded view of the VBR valve without an actuator 202.

The fact that the basket 217 can be removed together with the rest of the VBR valve without an actuator 202 allows better cleaning of the assembly before refilling the bottle, which is particularly important if it contains a liquid for human consumption, such as drinking water or juice. However, in an alternative embodiment of the VBR valve without an actuator 202, for cases in which the bottle is used to contain other liquids that are not for human consumption, and even caustic or dangerous for handling, the basket 217 is not an independent part, but is welded to collar 1.

VBR_C Compact Valve

In this embodiment of the valve 302, the same security system described in the embodiments of the previous paragraphs is used to prevent the valve from being removed from the bottle, that is, a key box with coded cylinders.

The difference with the other versions lies in the opening mechanism of the valve 334 for removing the contents of the bottle 301.

The valve 302 is also intended for use in dispensers that comprise an actuating male or probe 33, which when placing the bottle 1A in position opens the VBR_C valve.

o

FIGS. 62A to 62C are perspective views of the valve placed in bottle 1A (with only the upper portion represented).

FIG. 62C shows that the key box 16 is the same, and FIG. 62B shows the inner portion of the valve 302.

Figure 62F:
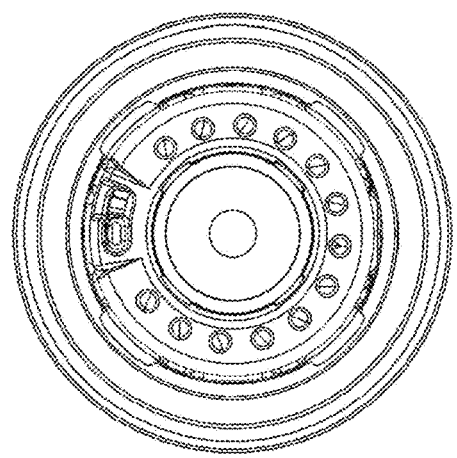
FIG. 62F is a bottom view of the valve.
Figure 62E:
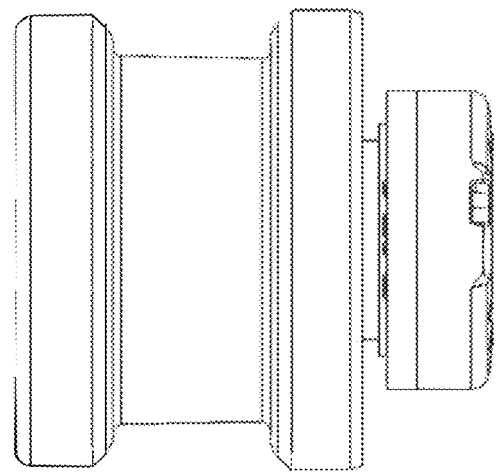
FIG. 62E is a side view of the valve.
Figure 62D:
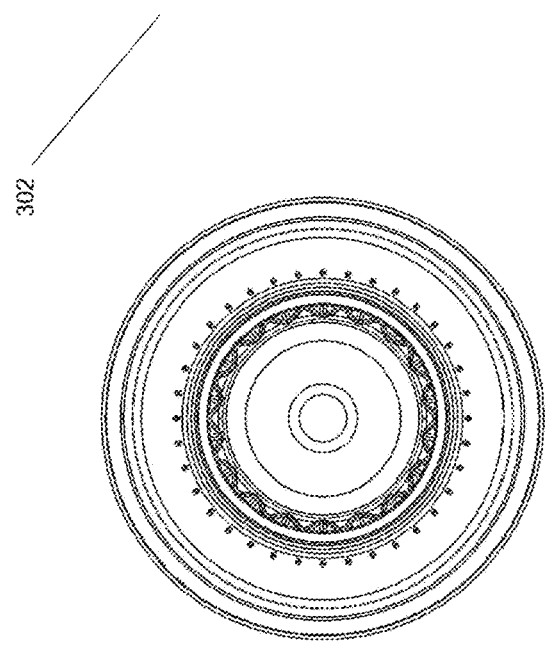
FIG. 62D is a top view of the valve.

FIG. 62D is a top view, FIG. 62E is a side view, and FIG. 62F shows a bottom view of the valve.

Figure 62H:
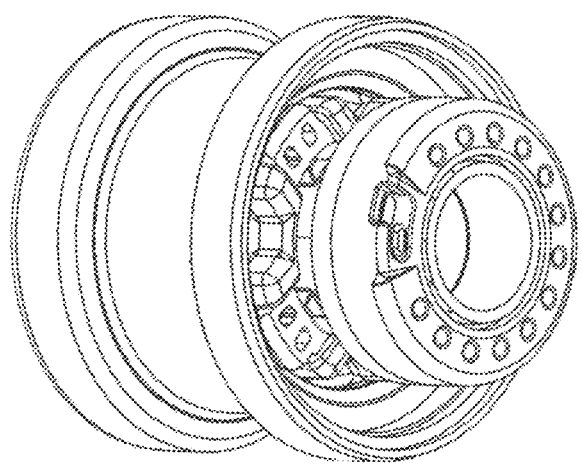
FIGS. 62G and 62H are a perspective view of the valve.
Figure 62G:
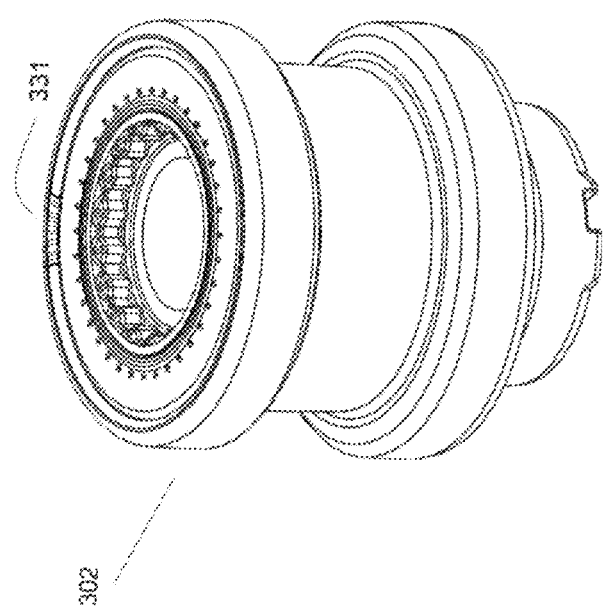

FIGS. 62G and 62H show perspective views of the valve where the encrypted opening code is observed.

Description of the VBR_C Compact Valve

FIG. 62G is a perspective view of the compact valve that shows on its outer surface a first embodiment of the security code 331 in the form of a barcode that is stored in a computer system, which must be queried to obtain the key that opens the bottle, since this key is inaccessible and encrypted. In this embodiment of the valve, the query is also done by the customer's removing machine, which reads the encrypted key in the barcode or in the two-dimensional QR code using an optical reader arranged for such purpose and comparing the result with the code database stored on a computer system server arranged for such purpose. In an alternative embodiment, the opening code may be a two-dimensional code of the QR type.

As shown in FIGS. 63A and 63B, the valve 302 comprises a sleeve 304, a closing base 305, the closing plug 306, a spring 307 and a security ring 308. Additionally, they show the assembly 333 (of the key system described in previous paragraphs).

Figures 64, 65:
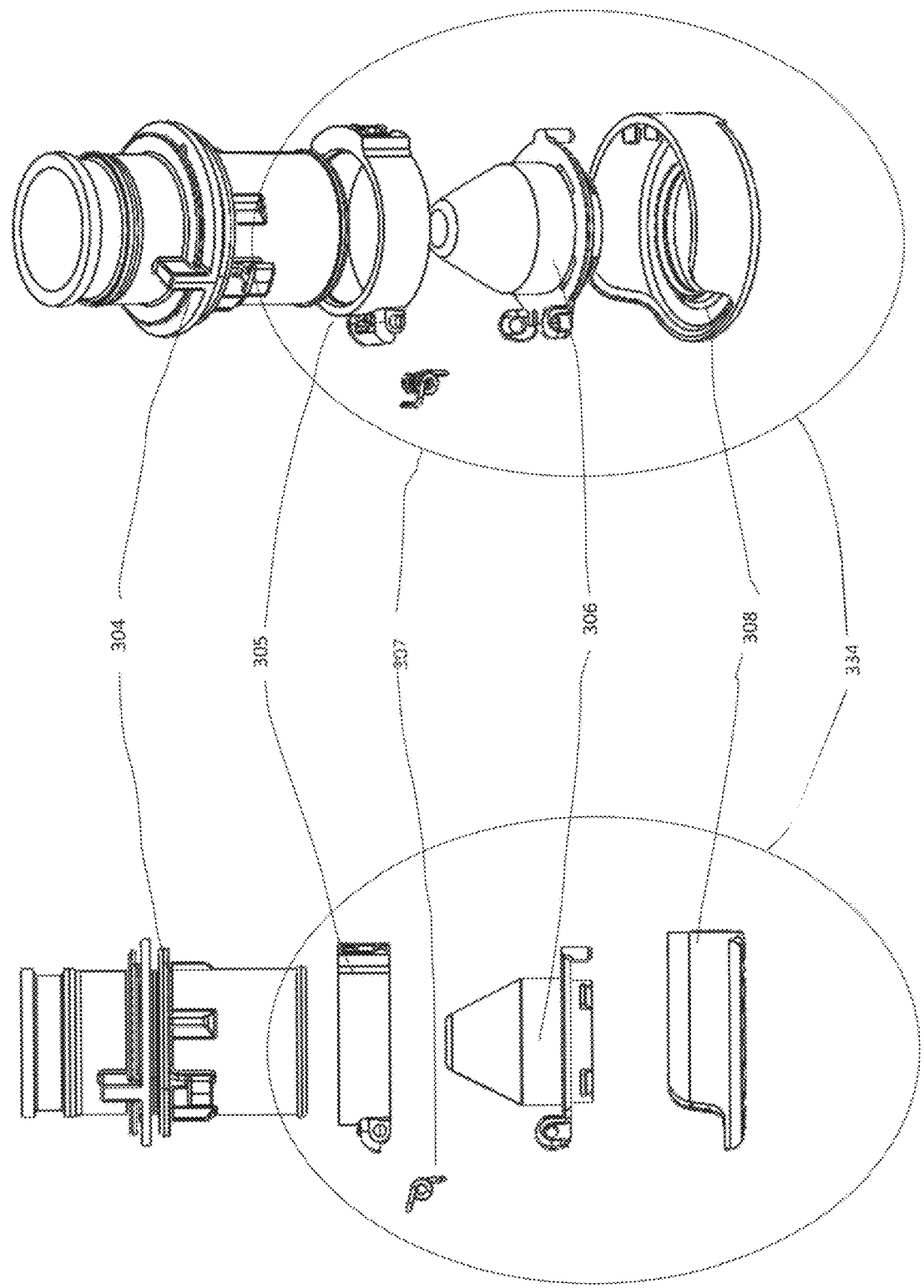

The elements of the opening assembly 334 are shown separately in FIGS. 64 and 65.

Each part and its specific function in this embodiment variant are described below.

FIGS. 66A to 66D show the sleeve 304. This part serves as the outlet probe for the bottle's contents.

In the following paragraphs, the portions and functions of the parts that have been modified in the sleeve 14 described in FIG. 13 will be described to transform it into the sleeve 304 of the VBR_C model.

FIGS. 66B and 66C show the portion marked as CL, which fulfills the same functions described with respect to the operation of the key system described above in the section of this document under the heading "Secure opening of a bottle with an automatic actuator".

The surface 310 of this sleeve 304 on which the outlet of the bottle will be closed by means of plug 306 is shown. Also, the sleeve retainer 309 consisting of a lip with an outer diameter larger than the sleeve 304 diameter, which will serve to limit the movement of the closing base 305 during the operation of the valve.

FIGS. 67A to 67E show the closing base 305 composed of a ring containing the following elements: a male hinge 311, a cavity 325 and a labyrinth 313 which will fulfill the function of allowing a single opening of the bottle during use.

FIG. 67E shows labyrinth 313 consisting of two channels, channel A 323 and channel B 324. When selector 319 is in channel A, it can move downwards exiting the labyrinth 313, and when selector 319 is in channel B, it cannot come out of the channel due to the geometry thereof. The channels are duplicated for better security and separate selectors 319 move in each of them.

Figures 69A, 69B, 69C, 69D:
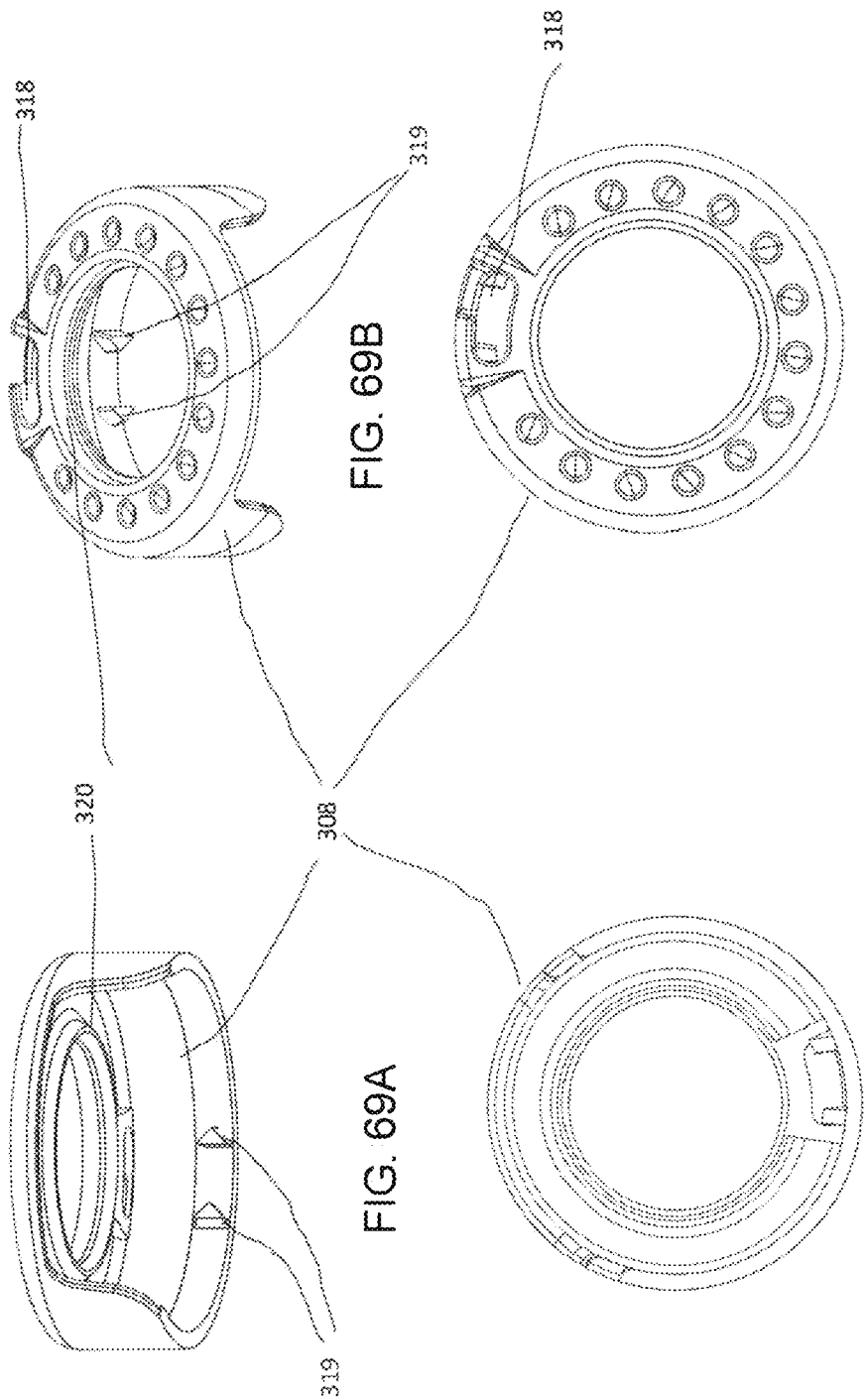

FIGS. 68A to 68D show plug 306. This part is the one that is directly operated by the probe 33 of the dispenser blocking the discharge of the bottle's contents, which occurs when its surface 314 is in contact with the surface 310 of the sleeve 304. In the plug 306 there is also a female hinge 315 which will serve to provide the opening rotation movement with respect to the closing base 305 when engage d on the male hinge 311 (see FIGS. 67A and B). The indicator 316 can also be observed, which will allow the status of the valve to be known by appearing through the indicator window 318 of the security ring 308 (see FIG. 69B). Additionally, the plug retainer 317 is seen, consisting of tabs that will serve to limit the movement of the labyrinth by interacting with the labyrinth retainer 320.

FIGS. 69A to 69D show the security ring 308, in which the labyrinth retainer 320 can be seen, which, when mounted in its position on the plug 306, will have its movement restricted by the plug retainer 317 (see FIGS. 68A and 68B), being able to perform rotation movements only about the axis of the plug 306. They also show the indicator window 318 through which the status of the security valve may be controlled since the indicator 316 comes out through this window, this indicator also limiting the rotation movement of the security ring 308, so that the selectors 319 will move between portions A and B of the labyrinth 313.

FIGS. 70A to 70C show the spring 307 whose function is to return the plug 306 to its position once the bottle is removed from the dispenser. The spring is housed in the cavity 325 of the closing base 305 (see FIG. 73A) and its ends 321, 322 force the closure of the plug 306 with one of its ends 321, while the other end 322 rests on the closing base 305.

Mounting Sequence of the Closing Sector of a VBR_C Compact Valve

Figure 71A:
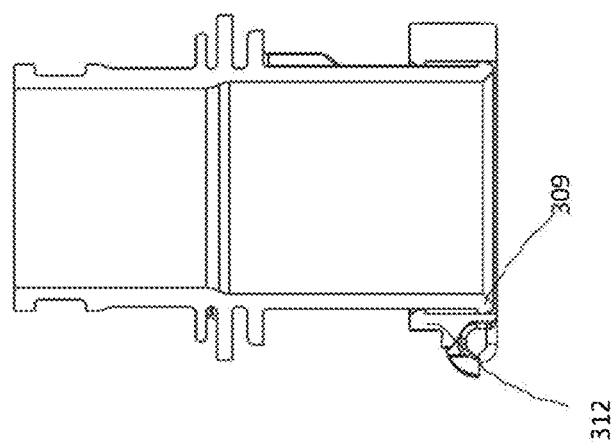
Figure 71B:
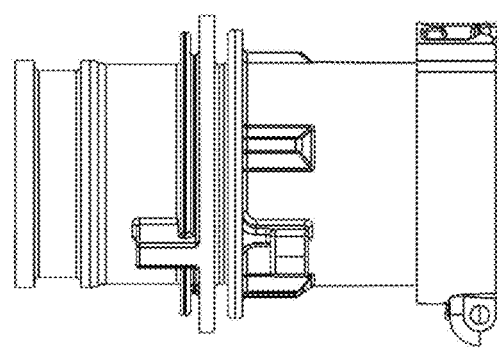
Figure 71C:
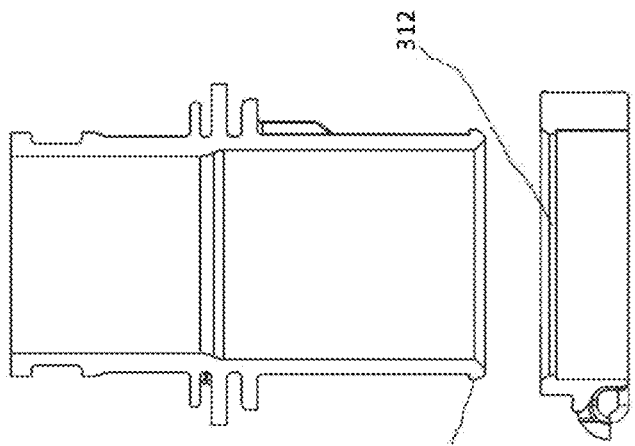
Figure 71D:
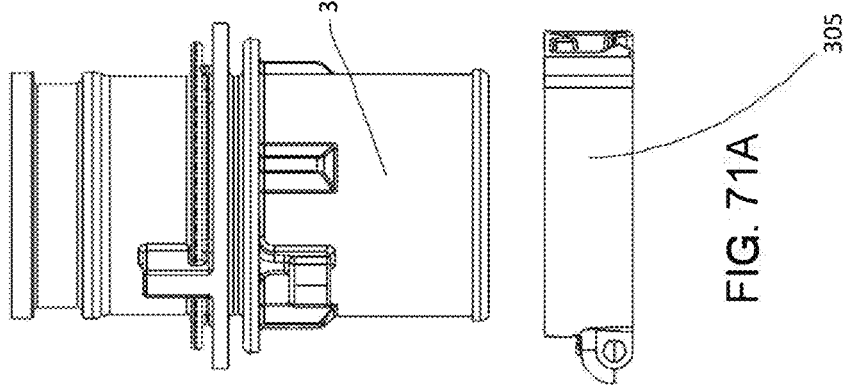

FIGS. 71A to 71D show the coupling between the sleeve 304 and the closing base 305. FIG. 71A shows the two parts to be mounted, the sleeve 304 and the closing base 305. FIG. 71B is a cross-sectional view of these parts showing the retainers 309 and 312 of both parts. The outer diameter of the retainer 309 is larger than the bore of the retainer 312. These two parts are mounted by placing them concentrically, forcing the retainer 312 of the closure base 305 to pass over the retainer 309 of the sleeve 304. As a result, both parts are concentrically attached as shown in FIG. 71D.

FIG. 71C shows the two assembled parts, and FIG. 71D is a cross-sectional view of the parts in the assembled position.

Next, FIGS. 72A to 72D show the assembly of the plug 306 on the closure base 305. The mounting operation is carried out by forcing the male hinge 315 of the plug 305 into the female hinge 311 of the closing base 305, whereby the closing plug 306 has a rotation limitation on the hinge formed by the male 315 and the female 311.

Figure 72D:
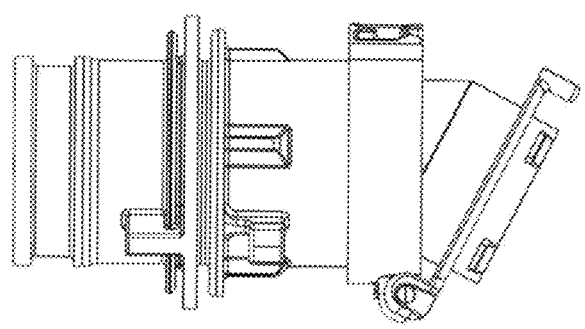
Figure 72C:
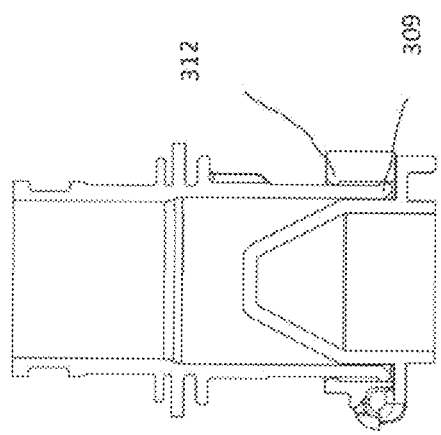
Figure 72B:
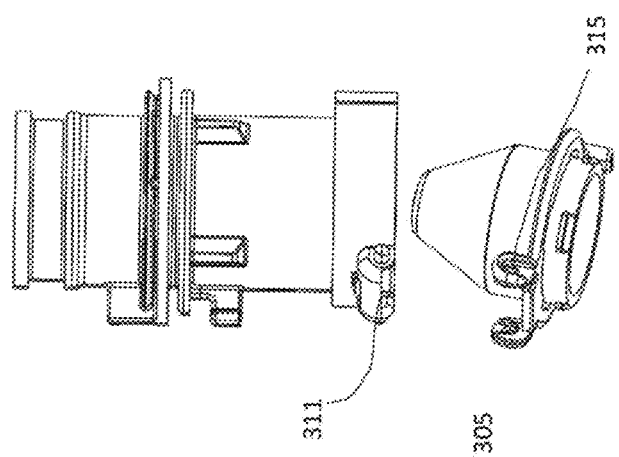
Figure 72A:
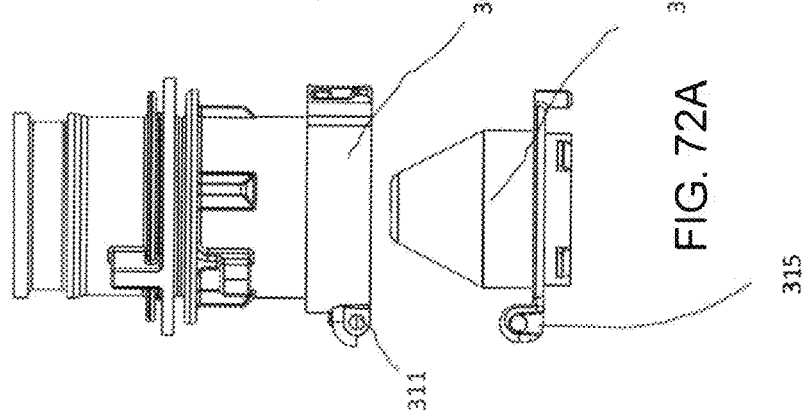

FIGS. 72A and 72B show the parts to be assembled from two points of view. FIG. 72C is a cross-sectional view of the assembled parts; and FIG. 72D shows the opening movement of the plug 306 on the base 305.

Figure 73B:
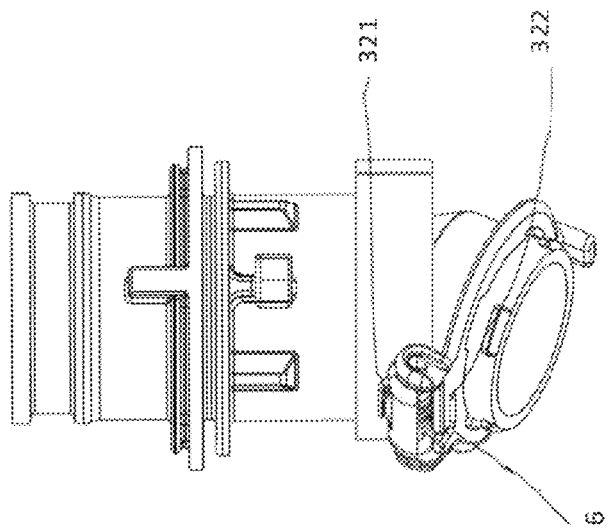
Figure 73A:
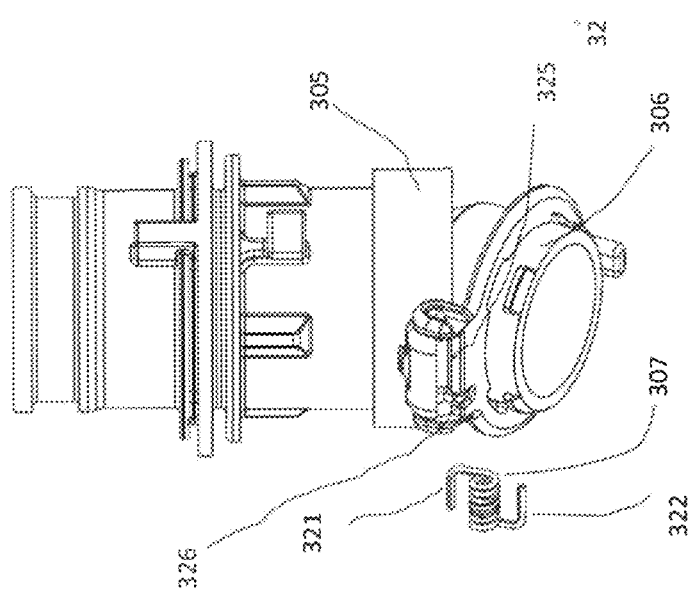

FIGS. 73A and 72B show the assembly of the spring 307 in the cavity 325 of the closing base 305, the end 322 passing through the slot 326 of the plug 306 and the end 321 pressing on the outer wall of the closing base 305.

Figure 74D:
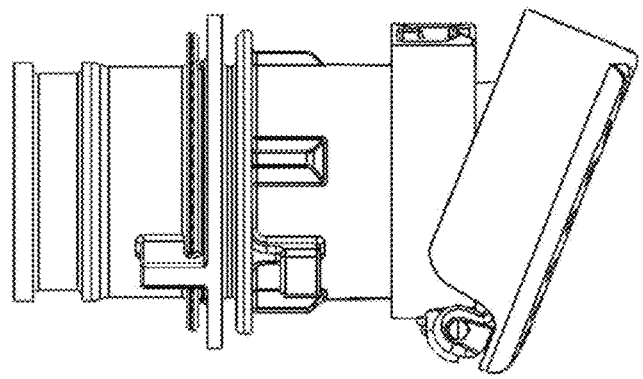
Figure 74C:
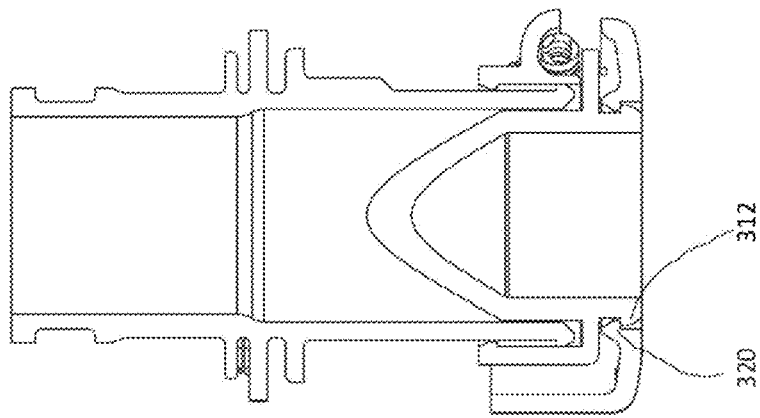
Figure 74B:
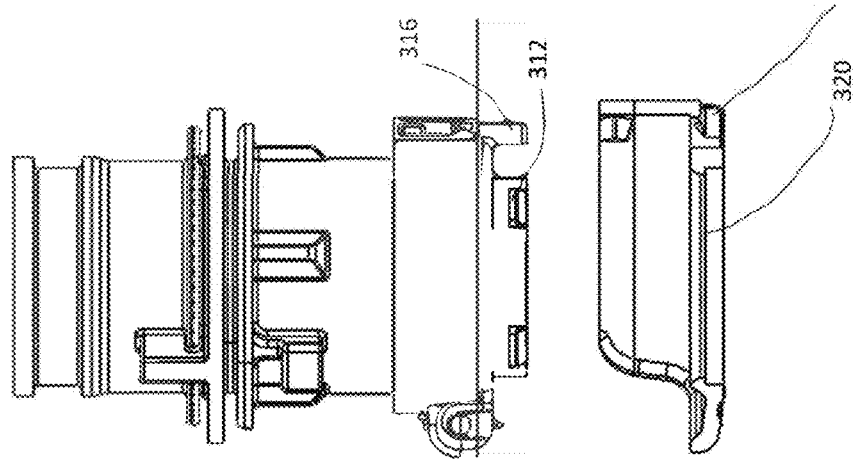
Figure 74A:
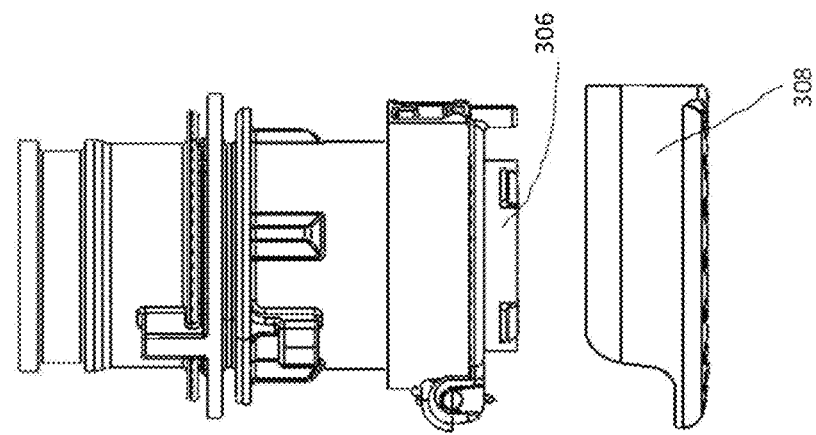
Figure 81D:
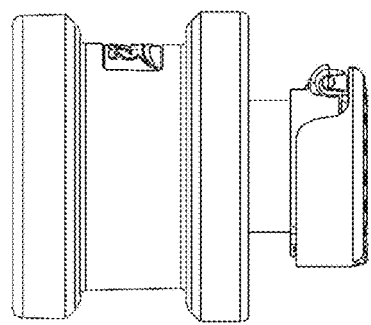
Figure 81C:
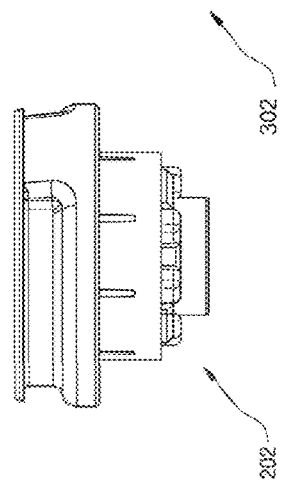
Figure 81B:
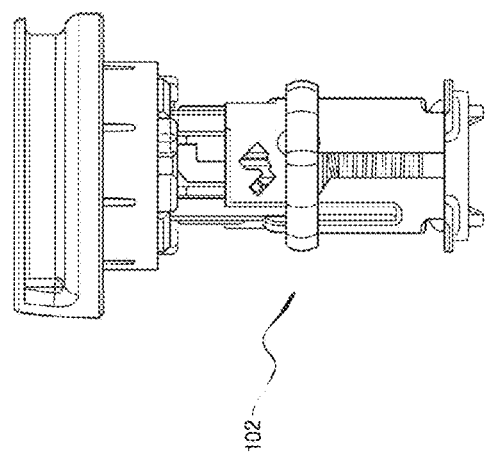
Figure 81A:
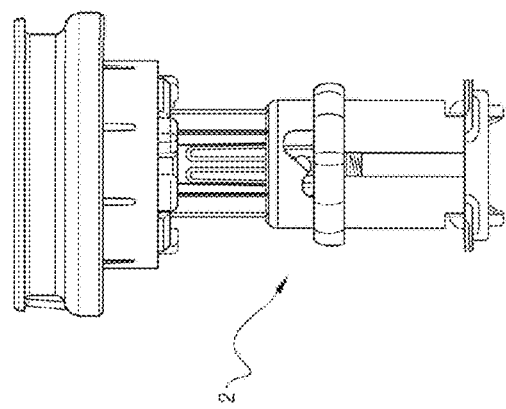
Figure 82D:
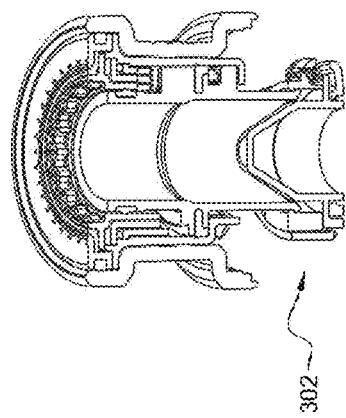
Figure 82C:
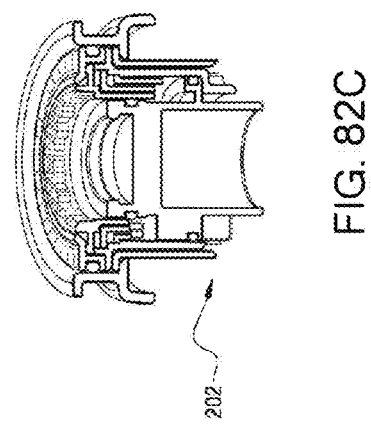
Figure 82B:
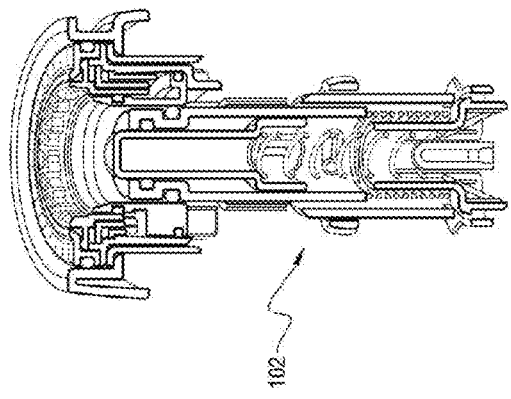
Figure 82A:
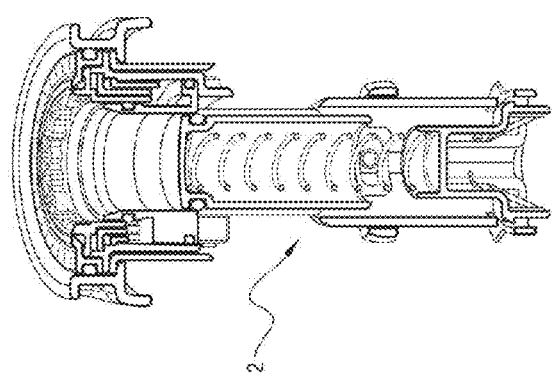

FIGS. 74A to 74D show the assembly of the security ring 308 on the closing plug 306. FIG. 74A shows the components to be assembled, FIG. 74B shows the retainer 312 of plug 306 and the retainer 320 of security ring 308. Assembly occurs by forcing the retainer 312 of plug 306 to pass through the retainer 320 of security ring 308, which results in the passing of the indicator 316 of the plug 306 through the indicator window 318. In this way, the security ring 308 is positioned on the plug 306, without axial movement on the closing plug 306, but with the possibility of rotating on the closing plug 306 an angle allowed by the indicator 316 moving within the indicator window 318.

With the above-described operations, the closing mechanism is assembled.

Closing System Operation of the VBR_C Compact Valve

FIGS. 75A to 75C are a cross-sectional view of the operation of the opening section 334. FIG. 75A shows the closed position of the valve when leaving the bottling plant. Note that closing of the valve is produced by means of the contact between the surface 310 of the sleeve 304 and the surface 314 of the plug 306. For this contact to occur, the closing base 305 is moved upwards. During this operation the closing base 305 is pushed by the closing plug 306 until the plug 306 abuts the sleeve 304.

FIGS. 75B and 75C show what happens when the closing plug 306 is pushed to open the VBR_C valve. First, the plug 306 moves axially, since its wall 314 moves along the wall 310 of the sleeve because the only thing that retains the plug 306 in its position inside the sleeve 304 is the friction between both, when the plug 306 moves, it will also move the closing base 305 until its retention 312 stops on the retention 309 of the sleeve 304. Then, the closing plug 306 continues its movement, but now it rotates on the hinge formed between the closing base 305 and the closing plug 306, thereby opening the discharge of the bottle contents through the valve.

In FIG. 76A, the security ring 308 is depicted as transparent to visualize the operation of the labyrinth trackers 319 within the labyrinth 313.

FIG. 76B to FIG. 77 show an enlarged view of this portion to visualize the operation of the labyrinth trackers 319 within the labyrinth 313.

FIGS. 76C to 76E also show the operation of the security ring 308. FIG. 76C shows its position when leaving the factory, that is, with the labyrinth selectors 319 of the security ring 308 in separate channels A 323 of the closing base 305 labyrinth 313.

FIG. 76D also shows what happens when the plug 306 stars the rotation movement during the opening action. Locking ring 308 is attached to plug 306 (see assembly). To be able to rotate the plug 306, the labyrinth selectors 319 must necessarily be caused to exit the labyrinth 313 of the closing base 305, and due to the geometry of the labyrinth 313 (see FIG. 70E) this exit can only be carried out if the labyrinth trackers 319 are in channels A 323 of labyrinth 313.

As shown in FIG. 76D, upon exit, the labyrinth selectors 319 collide with the stop 327 of channel A 323 and the security ring 308 rotates enough for the trackers 319 to exit the labyrinth 313 through the labyrinth window 320, as seen in FIG. 76E.

FIG. 76F shows the final position of the plug 306 completely open, with the selectors 319 of the part 308 outside the labyrinth 313 of part 305.

FIG. 76G shows what happens when the plug 306 is closed. In this case, the labyrinth selectors 319 of the security ring 308 will enter the labyrinth 313 of the closing base 305 through the window 320 and upon reaching the wall 328 of the labyrinth 313 they will cause the labyrinth selectors 319 to rotate the security ring 308, whereby the trackers 319 will now be located on channel B 324, as represented in FIG. 76H.

FIG. 77 shows that the labyrinth trackers 319 of the security ring 308, when located in channel B 324 of the labyrinth 313 of part 305, can no longer leave this channel B 324 due to the geometry of the stop 329 of the labyrinth 313, thereby preventing the valve from being opened for a second time.

FIGS. 78A and 78B show the result of the security ring 308 rotation. FIG. 78A shows that the indicator 316 is visible by the indicator window 318, evidencing that the valve has not been used. In FIG. 78B, the indicator is not visible in the indicator window 318 indicating that the VBR_C valve has already been used and cannot be opened.

The entire mechanism can be reset only by removing the VBR_C valve from the bottle, repositioning the plug 306 to its fully closed position and placing the security ring in the "ready for use" position, that is, with the labyrinth trackers in the channel A 323.

Comparison Between the Four Embodiments

FIGS. 79A to 79D show side views of the four embodiments of the VBR valve: on the left the VBR valve with an automatic actuator 2, on the middle-left the VBR valve with a manual actuator 102, on the middle-right the VBR valve without an actuator 202, and on the right the compact VBR_C valve 302.

FIGS. 80A to 80D show perspective cross-sectional views of the four embodiments of the VBR valve: on the left the VBR valve with an automatic actuator 2, on the middle-left the VBR valve with a manual actuator 102, on the middle-right the VBR valve without an actuator 202, and on the right the compact VBR_C valve 302.

FIGS. 81A to 81D show complete side views of the four embodiments of the VBR valve: on the left the VBR valve with an automatic actuator 2, on the middle-left the VBR valve with a manual actuator 102, on the middle-right the VBR valve without an actuator 202, and on the right the compact VBR_C valve 302.

FIGS. 82A-82D show complete perspective cross-sectional views of the four embodiments of the VBR valve with an automatic actuator 2 on the left, with manual actuator 102 on the middle-left, the valve without an actuator 202 on the middle-right, and the compact VBR_C valve 302 on the right.

To facilitate the understanding of the invention, a table is presented below linking each of the elements that constitute the invention with the corresponding reference number and the Figure(s) in which they are shown.

| Reference number | Element | FIG. |
|---|---|---|
| | VALVE WITH AN AUTOMATIC ACTUATOR | |
| 1 | Bottle collar | 2A, 7, 11A, 11B, 11C, 14A, 15A, 15F, 32, 62A-62C |
| 1A | Bottle | 1, 62A-62C |
| 1B | Valve water outlets | 23B |

-continued

| Reference number | Element | FIG. |
| --- | --- | --- |
| 1C | Water inlets on the tube | 23B |
| 1D | Tube water outlet | 23B |
| 2 | Security VBR valve with an automatic actuator | 3, 7, 21 |
| 3 | Cylinders | 4B |
| 4 | Key disk A | 4A, 4B, 5A, 16, 32 |
| 5 | Key disk B | 4A, 4B, 5A, 16, 32 |
| 6 | Key disk C | 4A, 4B, 5A, 32 |
| 7 | "Key" slot | 4A, 4B, 6, 15B, 15C, 15D |
| 8 | Step | 4A, 4B |
| 9 | Key box lid | 5A, 16, 32 |
| 10 | Key box lid large sealing O-ring | 5A, 16, 32 |
| 11 | Key box lid small sealing O-ring | 5, 16, 32 |
| 12 | Position lock stops | 8A |
| 13 | Inner surface of drum collar | 11A, 11C |
| 14 | Sleeve | 7, 9A, 9B, 14B, 15A, 15B, 15C, 15D, 17, 25, 27, 32 |
| 15 | Sleeve ribs | 7, 9A, 10A, 13, 14B, 15A, 15B, 15D |
| 16 | Key box | 7, 8A, 11A, 11B, 11C, 14A, 15A, 15B, 16, 32, 62C |
| 17 | Locking basket | 7, 11A, 11B, 11C, 15A, 15E, 32 |
| 18 | Position locks | 7, 8B, 9A, 9B, 10A, 10B, 11A, 11B, 14A, 14B, 15A, 15B, 15D, 15E, 32 |
| 19 | Locking guides | 8A |
| 20 | Security septum | 13, 15A, 15B, 15C, 15D |
| 21A | Seal housing | 13, 16 |
| 21B | Seal housing | 13, 16 |
| 22 | Anti-rotation septum | 13 |
| 25 | Horizontal sleeve guide | 13 |
| 26 | Inner sleeve O-ring | 16, 32 |
| 27 | Outer sleeve O-ring | 16, 32 |
| 28 | Closing O-ring | 16, 17, 32 |
| 29 | Closing plunger | 17, 24B, 24C, 32, |
| 30 | Repositioning spring | 17, 28, 32 |
| 31 | Spring stop | 17, 28, 32 |
| 32 | Dispenser cradle | 20, 21, 22, 23A |
| 33 | Dispenser tube | 22, 23A, 79A |
| 34 | Sleeve vertical channel guide | 13, 25, 26 |
| 35 | Security ring | 24A, 24C, 26, 28, 32, |
| 36 | Anti-rotation ribs | 24B, 26 |
| 37 | Security ring bolts | 24A, 24C, 26, 30E, 30F, 30G, 30H |
| 39 | Opening indicator button | 29 |
| 40 | Longitudinal inner guide | 25, 26 |
| 41 | Plunger radial guide | 24B, 24C |
| 46 | Bottle tracking code | 2A |
| 51 | VBR valve security code | 4C |
| A | Contact surface | 16 |
| B | Keys box lid housing | 16 |
| C | Plunger cavity | 17 |
| L | Locking basket lips | 11A, 11C, 12, 14A, 15A, 15F |
| PBI | Lower locking point | 10A, 11C, 14B, 15E |
| PBS | Upper locking point | 11C, 14B, 15A |
| PC | Lower end point | 27, 30E-30G |
| PD | Basket end point | 27, 30G, 30H |
| VALVE WITH A MANUAL ACTUATOR | | |
| 102 | Security VBR valve | 34 |
| 103 | Cylinders | 46I |
| 104 | Key disk A | 46G |
| 105 | Key disk B | 46G |
| 106 | Key disk C | 46G |
| 107 | "Key" slot | 46G |
| 108 | Step | 46G |
| 109 | Key box lid | 46H |
| 110 | Key box lid large sealing O-ring | 46S |
| 111 | Key box lid small sealing O-ring | 46S |
| 112 | Position lock stops | 46P |
| 114 | Sleeve | 35A, 35D, 36A |
| 115 | Sleeve ribs | 35A, 46K |

-continued

| Reference number | Element | FIG. |
| --- | --- | --- |
| 116 | Key box | 46J |
| 117 | Locking basket | 46K |
| 118 | Position locks | 46K |
| 119 | Locking guides | 46N |
| 120 | Security septum | 46J |
| 121A | Seal housing | 35E |
| 121B | Seal housing | 35E |
| 122 | Anti-rotation septum | 35E |
| 134 | Vertical guide | 35E |
| 125 | Horizontal sleeve guide | 35E |
| 126 | Inner sleeve O-ring | 46S |
| 127 | Outer sleeve O-ring | 46S |
| 128 | Closing O-ring | 46S |
| 129 | Closing plunger | 34, 36A, 36B, 36C, 41A, 41B, 42A, 46A, 46B |
| 130 | Repositioning spring | 46S |
| 131 | Spring stop | 56S |
| 134 | Sleeve vertical channel guide | 46E |
| 135 | Security ring | 45A |
| 136 | Anti-rotation ribs | 45A |
| 137 | Security ring bolts | 46E |
| 139 | Opening indicator button | 36E |
| 140 | Longitudinal inner guide | 35A |
| 141 | Plunger radial guide | 36B |
| 142 | Manual actuator | 34, 36, 37, 40A, 40B, 40C, 41A, 41C, 42A, 45A, 45B |
| 143 | Actuator spring | 34, 38, 41A, 41B, 41C, 41D, 42A, 42B |
| 144 | Actuator O-ring | 34, 39 |
| 145 | Hidden actuator resting channel | 35A, 35B, 35D, 42C, 43A-43D, 44A-44D |
| 147 | Actuator tracker | 37, 41A-41D, 42A-42C, 43. 46A, 46B |
| 149 | Slanted recess wall 145 | 43B, 43C, 43D |
| 150 | Slanted recess wall 145 | 43D |
| 151 | Security code of VBR valve with a manual actuator | 46R |
| AOA1 | O-ring housing | 36C |
| A | Tracker 147 alignment with CVE channel | 41F |
| CE1 | End channel | 35B, 35D, 42C |
| CVE1 | Vertical channel | 36A-36D, 41C |
| CS1 | Upper channel | 35B, 35D, 42C |
| L1 | Locking basket lips | 46L, |
| PBI1 | Lower locking point | 46L |
| PBS1 | Upper locking point | 46L |
| PC1 | Lower end point | 41D |
| PE1 | CVE upper surface | 42A |
| PEXT1 | Recess | 48 |
| PF1 | Tracker final point, when operation is manual | 36CE, 41B |
| PI1 | Resting point of the plunger vertical guide | 41A |
| PR1 | Resting point of VBR valve open inside the sleeve channel, with manual actuator | 35, 43C, 43D, 46A, 46B |
| PX1 | Recess upper point | 42C, 43A, 43B |
| PY1 | Recess angle point | 44A, 44B, 44C, 46B |
| VALVE WITHOUT AN ACTUATOR | | |
| 202 | Security VBR valve | 48 |
| 203 | Cylinders | 53 |
| 204 | Key disk A | 54, 59 |
| 205 | Key disk B | 54, 59 |
| 206 | Key disk C | 54, 59 |
| 207 | "Key" slot | 54, 59 |
| 208 | Step | 61 |
| 209 | Key box lid | 46H |
| 210 | Key box lid large sealing O-ring | 61 |
| 211 | Key box lid small sealing O-ring | 61 |
| 213 | Interference surface | 55 |
| 215 | Sleeve replacement part septum | 49A |
| 216 | Key box | 54 |
| 217 | Locking basket | 54 |
| 218 | Position locks | 55A, 56, 61 |

| Reference number | Element | FIG. |
|---|---|---|
| 220 | Security septum | 56, 59 |
| 221A | Seal housing | 49A, 54 |
| 221B | Seal housing | 49A |
| 222 | Anti-rotation septum | 49A |
| 248 | Central part, sleeve replacement | 47A-47D, 48-49A-49B |
| 251 | Security code of VBR valve without an actuator | 58B |
| BCV | Box base | 54 |
| G | Disks-septum contact point | 56 |
| L2 | Locking basket lips | 55A |
| M | Locking point | 56 |
| N | Locking point | 56 |
| P | Locking point | 56 |
| Q | Locking point | 56 |
| R | Locking point | 56 |
| S | Locking point | 56 |
| PBI2 | Lower locking point | 55A |
| PBS2 | Upper locking point | 55A |
| VBR C COMPACT VALVE | | |
| 302 | VBR_C valve | 62B, 62C, 62E, 62G, 79D, 80D, 81D, 82D |
| 303 | Cylinders | 62B, 63A |
| 304 | Sleeve | 63, 64, 65; 66 |
| 305 | Closing base | 63, 64, 65; 67; 76B; 76C; 76F; 76G; 77 |
| 306 | Plug | 63, 64, 65; 68; 76F; 76G |
| 307 | Spring | 63, 64, 65; 70 |
| 308 | Security ring | 63, 64 65; 69; 76B; 76C; 76F; 76G |
| 309 | Sleeve retainer | 66B |
| 310 | Sleeve closing surface | 66C |
| 311 | Male hinge | 67 A; 67 B |
| 312 | Closing retainer | 67D |
| 313 | Labyrinth | 67D; 67E; 76B; 76C; 76G; 77 |
| 314 | Plug closing surface | 68A |
| 315 | Female hinge | 68A |
| 316 | Indicator | 68A |
| 317 | Plug retainer | 68A; 68 B |
| 318 | Indicator window | 69B; 69E |
| 319 | Labyrinth selector | 69A; 76B; 76C; 76D; 76E; 76F; 76G; 76H; 77 |
| 320 | Labyrinth retainer | 69A; 69B; 76E; 76G |
| 321 | Spring end 1 | 70B |
| 322 | Spring end 2 | 70B |
| 323 | Labyrinth portion A | 67E; 76C |
| 324 | Labyrinth portion B | 67E; 76H; 77 |
| 325 | Cavity | 67C |
| 326 | Plug slot | 68C |
| 327 | Stop C | 67E; 76D |
| 328 | Stop D | 67E; 76H |
| 329 | Stop E | 67E; 77 |
| 330 | Labyrinth window | 67E |
| 331 | Opening code of VBR_C compact vale | 62G |
| 332 | Dispenser | 79A |
| 333 | Keys arrangement | 63A, 63B |
| 334 | Opening mechanism | 64, 65 |

The invention claimed is:

1. A compact security valve to be used in a dispenser equipped with an opening probe, the compact security valve comprising a tamper-proof security mechanism and an encrypted opening code etched on an outer surface of the valve, wherein the security mechanism comprises a series of cylinders having a single position in which the valve is capable of being removed, and three key disks located concentrically, an inner disk, a middle disk and an outer disk, which are capable of rotating independently and freely, wherein the inner disk has a step on an outer surface of the inner disk that transmits a rotation of the inner disk to the middle disk by pushing a step of the middle disk located on a top surface of the middle disk, while the middle disk transmits a rotation of the middle disk by means of another step located on an outer surface of the middle disk to the outer disk by pushing a step located on a top surface of the outer disk, and wherein each key disk has a key groove that is carved at a given and variable angle with respect to the rotation step of each key disk, wherein the alignment of the key grooves allows the release of the valve for removal and wherein said opening code is formed by three encrypted numbers representing the angle at which the key groove has been etched on each of the three key disks.

2. The compact security valve according to claim 1, wherein the key disks are housed in a key box with a lid.

3. The compact security valve according to claim 2, wherein the opening code is etched on the surface of the lid of the key box.

4. The compact security valve according to claim 3, further comprising a sleeve, a closing base, a closing plug, a spring and a security ring.

5. The compact security valve according to claim 4, wherein said sleeve comprises a surface on which the discharge of the contents of the bottle is closed by means of the closing plug; and said sleeve comprises a retainer comprising a lip with an outer diameter larger than the diameter of the sleeve, limiting the movement of the closing base during operation of the valve.

6. The compact security valve according to claim 4, wherein the closing base is composed of a ring in which a male hinge is fixed, and comprises a cavity and a labyrinth, wherein the labyrinth comprises a pair of channels A and a pair of channels B, wherein a pair of selectors move within said labyrinths, and wherein, when each selector is in a channel A, the selector is capable of moving out of the labyrinth and, when each selector is in a channel B, the selector cannot leave the channel due to a geometry of the selector.

7. The compact security valve according to claim 4, wherein locking of the contents of the bottle occurs when a surface of the closing plug encounters a surface of the sleeve.

8. The compact security valve according to claim 4, wherein the plug comprises a female hinge that allows the opening rotation movement to be carried out with respect to the closing base.

9. The compact security valve according to claim 4, further comprising an indicator part, capable of signaling the status of the valve by appearing through a indicator window of the security ring.

10. The compact security valve according to claim 4, further comprising a spring capable of replacing the plug to a position of the plug once the bottle has been removed from the dispenser and wherein the spring is housed in a cavity formed in the closing base and the ends of the spring force the plug to close with one end of the plug, while another end of the plug rests on the closing base.

11. The compact security valve according to claim 4, wherein the contact between the surface of the sleeve and the surface of the plug is achieved when the closing base is moved upwards and pushed by the plug until the closing base stops on the sleeve.

12. The compact security valve according to claim 11, wherein, when the closing plug is pushed to open the valve, the plug first moves axially and then turns around the hinge formed by the closing base and the closing plug, thereby opening the discharge of the bottle contents through the valve.

13. The compact security valve according to claim 6, wherein each labyrinth comprises a channel A and a channel B, and wherein, in order to rotate the plug the labyrinth selectors leave each labyrinth through a window of the labyrinth of the closing base, and this is only possible if the trackers of the labyrinth are in channel A of each labyrinth.

14. The compact security valve according to claim 13, wherein, when the plug is closed, the labyrinth selectors enter the labyrinth through the window and, upon reaching the wall of the labyrinth, the labyrinth trackers cause the security ring to rotate, whereby the labyrinth trackers are placed in channel B, from where the labyrinth trackers are no longer capable of leaving the channel B due to the geometry of a stop of the labyrinth, thereby preventing the valve from being opened for a second time.

15. A security valve with an automatic actuator to be used for plugging a returnable bottle to be placed on a dispenser equipped with an opening probe, further comprising a tamper-proof security mechanism and an encrypted opening code etched on an outer surface of the valve, wherein the security mechanism comprises a series of cylinders having a single position at which the valve is capable of being removed, and three key disks located concentrically, an inner disk, a middle disk and an outer disk, which are capable of rotating independently and freely, wherein the inner disk has a step on an outer surface of the inner disk that transmits a rotation of the inner disk to the middle disk by pushing a step located on top surface of the middle disk, while the middle disk transmits a rotation of the middle disk by means of another step located on an outer surface of the middle disk to the outer disk by pushing a step of the outer disk located on a top surface of the outer disk, and wherein each key disk has a key groove that is carved to a given and variable angular degrees with respect to the rotation step of each key disk, wherein the alignment of the key grooves allows the release of the valve for removal and wherein said opening code is formed by three encrypted numbers representing the angle at which the key groove was etched on each of the three key disks.

16. The security valve with an automatic actuator according to claim 15, wherein the key disks are housed in a key box with a lid.

17. The security valve with an automatic actuator according to claim 16, wherein the opening code is etched on the surface of the lid of the key box.

18. The security valve with an automatic actuator according to claim 17, further comprising an anchoring mechanism formed by the collar of the bottle, a set of position locks, a sleeve with ribs, the key box and a locking basket, wherein the sleeve is a mobile part that moves longitudinally to move the position locks outwards with ribs of the sleeve when the valve is inside the bottle.

19. The security valve with an automatic actuator according to claim 17, wherein the key box in a lower portion comprises guides for housing the position locks allowing only their radial movement, and the key box at an outer end includes stops that limit the outward movement of the position locks.

20. The security valve with an automatic actuator according to claim 17, wherein, when the position locks are in their radially outward position, the position locks collide against the locking basket at a lower locking point, thereby preventing the key box that carries the locks from leaving a position of the key box.

21. The security valve with an automatic actuator according to claim 17, wherein, when the key box is inside the locking basket, the tapered walls of the key box push out the lips of the locking basket, causing the lips to prevent the key box from moving, locking the key box at a locking point against the collar of the bottle.

22. The security valve with an automatic actuator according to claim 20, wherein, when the position locks are moved outwards pushed by the ribs of the sleeve, the position locks rest on the lower edge of the locking basket, preventing the key box from being removed first to remove the locking basket, thereby preventing the valve to be removed.

23. The security valve with an automatic actuator according to claim 18, wherein the sleeve has a security septum and, to remove the valve, the key grooves of the three key disks must be aligned, whereby the security septum is raised entering the 3 aligned key grooves, whereby the sleeve is raised with respect to the key box and the ribs of the sleeve stop pressing on the position locks, which then move radially towards the central geometric axis of the valve and release the valve.

24. The security valve with an automatic actuator according to claim 23, wherein the position locks have a tapered profile and move towards the center when applying force on the lower edge of the basket, allowing the lower locking point to be released and the key box to slide inside the sleeve.

25. The security valve with an automatic actuator according to claim 18, wherein the box lid is welded to the key box, keeping the three key disks in position, and wherein the key box has a first O-ring that provides tightness with respect to the exterior of the container, sealing the connection between the key disk and the box lid, a second O-ring located between a tight housing of the sleeve and the inner wall of the key disk that provides tightness with respect to the exterior, a third O-ring placed between the inner wall of the key box and the tight housing of the sleeve that provides tightness of the key box with respect to the interior of the container, a fourth O-ring that provides tightness of the valve with respect to the collar of the bottle and a fifth O-ring that seals the main liquid outlet.

26. The security valve with an automatic actuator according to claim 18, further comprising a plunger and a spring that keep the valve sealed, and a stop that keeps the spring in position.

27. The security valve with an automatic actuator according to claim 18, further comprising a security ring that has bolts that engage with the plunger when moving within radial guides of the plunger, and wherein, due to the shape and limited length of said guides, the security ring is only capable of rotating on the plunger to a certain angle.

28. The security valve with an automatic actuator according to claim 27, wherein the plunger has ribs, and the sleeve has an internal longitudinal guide and a vertical guide channel, and wherein, when placing the plunger inside the sleeve, the ribs are located inside the internal longitudinal guide, thereby preventing the plunger from rotating with respect to the sleeve and only moving axially with respect to the sleeve and wherein the bolts of the security ring are positioned within the guide.

29. The security valve with an automatic actuator according to claim 27, wherein the bolts are located in a first resting point when the valve is closed before use, and, when the valve opens for the first time, the plunger pushes the bolts towards a vertical section of the vertical guide channel; when the valve closes, the plunger descends and the bolts also descend to a second resting point; and, when attempting to open the valve again by pushing the plunger again, due to the geometry of the vertical guide channel, the bolt does not move beyond the second resting point, and therefore the valve remains closed.

30. The security valve with an automatic actuator according to claim 27, further comprising a tamper indicator button which is visible when the bolt is in the second resting point.

31. A security valve with a manual actuator to plug returnable bottles to be placed in dispensers without an opening probe, the security valve comprising a manual actuator and a tamper-proof security mechanism, in which the opening of the valve is carried out by pressing said manual actuator for a first time, and wherein the locking of the valve is achieved by pressing said manual actuator for a second time, and wherein the valve comprises a tamper-proof security mechanism and an encrypted opening code etched on an outer surface of the valve, wherein the security mechanism comprises a series of cylinders having a single position in which the valve be is capable of being removed, and three key disks located concentrically, an inner disk, a middle disk and an outer disk, which are capable of rotating independently and freely, wherein the inner disk has on an outer surface of the inner disk a step that transmits a rotation of the inner disk to the middle disk by pushing a step of the middle disk located on a top surface of the middle disk, while the middle disk transmits a rotation of the middle disk by means of another step located on an outer surface to the outer disk by pushing a step of the outer disk located on a top surface of the outer disk, and wherein each key disk has a key groove that is carved at a given and variable angle with respect to the rotation step of each key disk, wherein the alignment of the key grooves allows the release of the valve for removal and wherein said opening code is formed by three encrypted numbers representing the angle at which the key groove was etched in each of the three key disks.

32. The security valve with a manual actuator according to claim 31, wherein the security mechanism comprises a series of cylinders having a single position in which the valve is capable of being removed, and three key disks located concentrically, an inner disk, a middle disk and an outer disk, which capable of rotating independently and freely, wherein the inner key disk has a step on an outer surface of the inner key disk that transmits a rotation of the inner key disk to the middle key disk by pushing a step of the middle key disk located on a top surface of the middle key disk, while the middle key disk transmits a rotation of the middle key disk by means of another step located on an outer surface of the middle key disk to the outer key disk by pushing a step of the outer key disk located on a top surface of the outer key disk, and wherein each key disk has a key groove that is carved at a given and variable angle with respect to the rotation step of each key disk, wherein the alignment of the key grooves allows the release of the valve for removal of the valve and wherein said number of angular degrees is determined by the opening code which is formed by three encrypted numbers that represent the angle at which the key groove was etched in each of the key disks.

33. The security valve with a manual actuator according to claim 32, wherein the key disks are housed in a key box with a lid.

34. The security valve with a manual actuator according to claim 33, wherein the opening code is etched on the surface of the lid of the key box.

35. The security valve with a manual actuator according to claim 32, further comprising an anchoring mechanism formed by a collar of the bottle, a set of position locks, a sleeve with ribs, the key box and a locking basket, wherein the sleeve is a mobile part that moves longitudinally to push the position locks outwards with ribs of the sleeve when the valve is inside the bottle.

36. The security valve with a manual actuator according to claim 35, wherein the key box in a lower portion has guides for housing the position locks and that only allow their radial movement, and at an outer end the key box includes stops that limit the outward movement of the position locks.

37. The security valve with a manual actuator according to claim 35, wherein, when the key box is inside the locking basket, the tapered walls of the key box push out lips of the locking basket, causing the lips to prevent the key box from moving by locking the key box at a locking point against the collar of the bottle.

38. The security valve with a manual actuator according to claim 36, wherein, when the position locks are moved outwards pushed by the ribs of the sleeve, the position locks rest on a lower edge of the locking basket, preventing the key box from being removed first to remove the locking basket, thereby preventing the valve from being removed.

39. The security valve with a manual actuator according to claim 38, wherein the sleeve has a security septum and, to remove the valve, the key grooves of the three key disks are aligned, whereby the security septum is raised entering the 3 aligned key grooves, whereby the sleeve is raised with respect to the key box and the ribs of the sleeve stop pressing on the position locks and these move radially towards the central geometric axis of the valve.

40. The security valve with manual actuator according to claim 35, wherein the position locks have a tapered profile and move towards the center when applying force on the lower edge of the basket, allowing the lower locking point to be released and the key box to slide inside the sleeve.

41. The security valve with a manual actuator according to claim 33, wherein the box lid is welded to the key box, keeping the three key disks in position, and wherein the key box has a first O-ring that provides tightness with respect to the exterior of the container, sealing the connection between the key disk and the box lid, a second O-ring located between a tight housing of the sleeve and the inner wall of the key disk that provides tightness with respect to the exterior, a third O-ring placed between the inner wall of the key box and the tight housing of the sleeve that provides tightness of the key box with respect to the interior of the container, a fourth O-ring that provides tightness of the valve with respect to the collar of the bottle and a fifth O-ring that seals the main liquid outlet.

42. The security valve with a manual actuator according to claim 32, further comprising a plunger and a spring that keep the valve sealed, and a stop that keeps the spring in position.

43. The security valve with a manual actuator according to claim 42, further comprising a security ring that has bolts that engage with the plunger when moving within the radial guides of the plunger, and wherein, due to the shape and limited length of said guides, the security ring is capable of only rotating on the plunger to a certain angle.

44. The security valve with a manual actuator according to claim 42, wherein the plunger has ribs and the sleeve has an internal longitudinal guide and a vertical guide channel, and wherein, when placing the plunger inside the sleeve, the ribs are located inside the internal longitudinal guide, thereby preventing the plunger from rotating with respect to the sleeve and only moving axially with respect to the sleeve and wherein the bolts of the security ring are positioned within the guide.

45. The security valve with a manual actuator according to claim 35, wherein the sleeve comprises two recesses made on opposite sides of the body and comprises two channels.

46. The security valve with a manual actuator according to claim 42, wherein the plunger comprises two similar channels made on opposite faces thereof, and a housing which houses an O-ring that seals the connection between the actuator and the plunger.

47. The security valve with a manual actuator according to claim 42, wherein said actuator comprises two trackers and is held pressed against the plunger by a spring.

48. The security valve with a manual actuator according to claim 47, wherein to open the valve the actuator is pressed once to pull out the actuator; next, the actuator is pressed for a second time to open the valve and the actuator is pressed for a third time to close the valve, after being used, after which the valve is locked.

49. The security valve with a manual actuator according to claim 48, wherein, in the closed position of the valve, the actuator is in a hidden position and is pushed by a spring whereby the actuator does not protrude from the valve because the trackers of the actuator are retained at a point of the channels of the plunger.

50. The security valve with a manual actuator according to claim 49, wherein, by pressing the actuator once, the trackers of the actuator move within the channels of the plunger to allow the actuator to slide out of the valve pushed by the spring, until the trackers of the actuator reach a lower point of the channels.

51. The security valve with a manual actuator according to claim 49, wherein, when actuator is pressed again, the trackers of the actuator push the plunger until reaching a maximum opening point after passing through a channel of the recess of the sleeve, moving diagonally due the geometry of the recess.

52. The security valve with a manual actuator according to claim 49, wherein, when the pressure on the actuator is released, the actuator moves vertically pushed by the spring, but the tracker is retained at a resting point of the recess, whereby the actuator is hidden and holds the plunger in an open position.

53. The security valve with a manual actuator according to claim 49, wherein, when the actuator is pressed again, the tracker moves diagonally to another point of the recess causing a rotation of the actuator, whereby retention of the plunger by the actuator ceases, and the plunger pushed by the spring moves to a closed position, whereupon the valve remains closed and the actuator hidden inside.

54. The security valve with a manual actuator according to claim 52, wherein, when the actuator is pressed again, the trackers are trapped in the recess, and the actuator does not exit a position of the actuator, remaining inside the valve.

55. The security valve with a manual actuator according to claim 54, wherein, when the valve is closed, the bolts of the security ring are directed towards a point of a channel in which the bolts are housed, whereby the axial movement of the plunger again takes the tracker of the actuator to the resting point of the recess.

56. An actuator-free security valve for plugging a returnable container, wherein the valve comprises a tamper-proof security mechanism and an encrypted opening code etched on an outer surface of the valve, wherein the security mechanism comprises a series of cylinders having a single position in which the valve is capable of being removed, and three key disks located concentrically, an inner disk, a middle disk and an outer disk, which are capable of rotating independently and freely, wherein the inner disk has a step on an outer surface of the inner disk that transmits a rotation of the inner disk to the middle disk, by pushing a step of the middle disk located on a top surface of the middle disk, while the middle disk transmits a rotation of the middle disk by means of another step located on an outer surface of the middle disk to the outer disk by pushing a step of the outer disk located on a top surface of the outer disk, and wherein each key disk has a key groove that is carved at a given and variable angle with respect to the rotation step of each disk of key, wherein the alignment of the key grooves allows the release of the valve for removal and wherein said opening code is formed by three encrypted numbers representing the angle with which the key groove was etched on each of the three key disks.

57. The actuator-free security valve according to claim 56, wherein the security mechanism comprises a series of cylinders having a single position in which the valve is capable of being removed, and three key disks located concentrically, an inner disk, a middle disk and an outer disk, which can rotate are capable of rotating independently and freely, wherein the inner key disk has a step on an outer surface of the inner key disk that transmits a rotation of the inner key disk to the middle key disk by pushing a step of the middle key disk located on a top surface of the middle key disk, while the middle key disk transmits a rotation of the middle key disk by means of another step located on an outer surface of the middle key disk to the outer key disk by pushing a step of the outer key disk located on a top surface of the outer key disk, and wherein each key disk has a key groove that is carved at a given and variable angle with respect to the rotation step of each key disk, wherein the alignment of the key grooves allows the release of the valve for removal of the valve and wherein said number of angular degrees is determined by the opening code which is formed by three encrypted numbers that represent the angle at which the key groove was etched in each of the key disks.

58. The actuator-free security valve according to claim 57, wherein the key disks are housed in a key box with a lid.

59. The actuator-free security valve according to claim 58, wherein the opening code is etched on the surface of the lid of the key box.

60. The actuator-free security valve according to claim 59, wherein said returnable container is a bottle.

61. The actuator-free security valve according to claim 60, further comprising a mechanism formed by the collar of the bottle, a set of position locks, a central part, the key box and a locking basket, wherein the central part is a mobile part that moves longitudinally to move the position locks when the valve is inside the bottle.

62. The actuator-free security valve according to claim 61, wherein the central part passes inside the key box and has axial movements limited into the valve by the base of the key box, and wherein the axial movements of the central part are limited outwards by the key disks.

63. The actuator-free security valve according to claim 62, wherein the key disks lock the axial movement of the central part to maintain septa of the central part pushing the locks radially outwards, so that the locks at the same time lock the axial movement of the locking basket with respect to the key box.

64. The actuator-free security valve according to claim 63, wherein, when the basket is locked, the tapered walls of the key box radially push lips of the basket outwards, whereby the lips move away from the center and axially interact with the collar of the bottle, preventing the basket from exiting the valve.

65. The actuator-free security valve according to claim 61, wherein the central part has a security septum and, to remove the valve, the key grooves of the three key disks are aligned, whereby the security septum is raised and enters the 3 aligned key grooves, whereby the central part is raised with respect to the key box and the septa of the central part stop pressing on the position locks and these move radially towards the central geometric axis of the valve.

66. The actuator-free security valve according to claim 62, wherein the box lid is welded to the key box, which maintains the three key disks in position.

67. The actuator-free security valve according to claim 62, wherein said locking basket is welded to the collar of the bottle.

68. The actuator-free security valve according to claim 59, wherein said container is returnable in a sheet metal drum.

69. A bottle collar for use with one of the valves according to claim 1, wherein the bottle collar is welded to the bottle neck by means of a method selected from a group consisting of: ultrasound, laser, high frequency, roto-fusion and chemical bonding.

70. The bottle collar according to claim 69, further comprising a tracking code implemented on an outer surface of the bottle collar by thermal etching, painting, or erosion.

71. A process for plugging a returnable bottle by means of a security valve according to claim 1, to be used in a dispenser provided with an opening probe, said valve being provided with a tamper-proof security mechanism, the process comprising:
  etching on the outer surface of said valve an opening code;
  placing the returnable bottle on the dispenser;
  opening the valve using said probe to release the outlet of the liquid contained within the bottle;
  extracting the contents of the bottle partially or completely; and
  removing the returnable bottle from the dispenser, leaving the valve safely closed;
  releasing the valve for removal of the valve from the bottle by means of an unlocking maneuver of 3 turns of the security mechanism, wherein the unlocking maneuver comprises a first turn in one direction and through a first determined number of angular degrees, followed by a second turn in the opposite direction and through a second determined number of angular degrees and, a third turn in the first direction and through a third determined number of angular degrees, and wherein the three determined number of angular degrees of rotation are known by decoding the reading of said opening code.

72. The process according to claim 71, wherein said opening code is formed by three encrypted numbers representing in an orderly manner the angle of rotation that must be carried out in each of the unlocking maneuvers.

73. The process according to claim 71, wherein said opening code has a barcode or QR code format.

74. A process for plugging a returnable bottle by means of a security valve with a manual actuator according to claim 31, to be used in a dispenser that lacks a dispenser, said valve equipped with a tamper-proof security mechanism, the process comprising:
  etching on the outer surface of said valve an opening code;
  placing the returnable bottle in the dispenser;
  opening the valve by means of said manual actuator to release the outlet of the liquid contained within the bottle;
  extracting the contents of the bottle partially or completely; and
  removing the returnable bottle from the dispenser, leaving the valve safely closed;
  releasing the valve for removal of the valve from the bottle by means of an unlocking maneuver of 3 turns of the security mechanism, wherein the unlocking maneuver comprises a first turn in one direction and through a first determined number of angular degrees, followed by a second turn in the opposite direction and through a second determined number of angular degrees and, a third turn in the first direction and through a third determined number of angular degrees, and wherein the three determined number of angular degrees of rotation are known by decoding the reading of said opening code.

75. The process according to claim 74, wherein said opening code is formed by three encrypted numbers representing in an orderly manner the angle of rotation for each of the unlocking maneuvers.

76. The process according to claim 74, wherein said opening code has a barcode or QR code format.

77. A process for plugging a returnable bottle using an actuator-free security valve according to claim 56, to be used in bottles containing non-drinking liquids, said valve being equipped with a tamper-proof security mechanism, the process being characterized by comprising:

etching on the outer surface of said valve an opening code;

opening the valve by means of said manual actuator to release the outlet of the liquid contained within the bottle;

extracting the contents of the bottle partially or completely; and removing the returnable bottle from the dispenser, leaving the valve safely closed;

releasing the valve for removal of the valve from the bottle by means of an unlocking maneuver of 3 turns of the security mechanism, wherein the unlocking maneuver comprises a first turn in one direction and through a first determined number of angular degrees, followed by a second turn in the opposite direction and through a second determined number of angular degrees and, a third turn in the first direction and through a third determined number of angular degrees, and wherein the three determined number of angular degrees of rotation are known by decoding the reading of said opening code.

78. The process according to claim 77, wherein said opening code is formed by three encrypted numbers representing in an orderly manner the angle of rotation for each of the unlocking maneuvers.

79. The process according to claim 77, wherein said opening code has a barcode or QR code format.

* * * * *